(12) United States Patent
Moredock et al.

(10) Patent No.: US 12,005,384 B2
(45) Date of Patent: *Jun. 11, 2024

(54) AIR QUALITY MONITORING AND CONTROL SYSTEM

(71) Applicant: THE SY-KLONE COMPANY, LLC, Jacksonville, FL (US)

(72) Inventors: Jeffrey L. Moredock, Jacksonville, FL (US); James G. Moredock, Jacksonville, FL (US)

(73) Assignee: THE SY-KLONE COMPANY, LLC, Jacksonville, FL (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/981,886

(22) Filed: Nov. 7, 2022

(65) Prior Publication Data
US 2023/0071376 A1 Mar. 9, 2023

Related U.S. Application Data

(63) Continuation of application No. 17/092,819, filed on Nov. 9, 2020, now Pat. No. 11,517,841, which is a
(Continued)

(51) Int. Cl.
*B01D 46/00* (2022.01)
*B01D 45/16* (2006.01)
(Continued)

(52) U.S. Cl.
CPC ......... *B01D 46/0086* (2013.01); *B01D 45/16* (2013.01); *B01D 46/009* (2013.01);
(Continued)

(58) Field of Classification Search
CPC ............ B01D 46/0086; B01D 46/4245; B01D 46/429; B01D 46/448; B01D 46/2411;
(Continued)

(56) References Cited

U.S. PATENT DOCUMENTS

| | | |
|---|---|---|
| 4,344,356 A | 8/1982 | Casterton et al. |
| 4,531,453 A | 7/1985 | Warman et al. |

(Continued)

FOREIGN PATENT DOCUMENTS

| | | |
|---|---|---|
| AU | 2021 221 799 A1 | 2/2023 |
| CN | 104436911 A | 3/2015 |

(Continued)

OTHER PUBLICATIONS

Nov. 26, 2018 Search Report issued in European Patent Application No. 18180914.6.
(Continued)

*Primary Examiner* — Minh Chau T Pham
(74) *Attorney, Agent, or Firm* — Oliff PLC

(57) ABSTRACT

An air quality system includes an air precleaner, a filter identification component, and a control module. The air precleaner has a precleaner housing and a filter disposed inside the precleaner housing. The filter identification component is positioned within the precleaner housing at a first position and is mounted on the filter. The control module is positioned within the precleaner housing at a second position and is configured to emit an electrical field and communicate with the filter identification component via the emitted electrical field.

18 Claims, 42 Drawing Sheets

Related U.S. Application Data continuation of application No. 16/022,941, filed on Jun. 29, 2018, now Pat. No. 10,850,222.

(60) Provisional application No. 62/527,276, filed on Jun. 30, 2017.

(51) Int. Cl.
  *B01D 46/24* (2006.01)
  *B01D 46/42* (2006.01)
  *B01D 46/44* (2006.01)
  *B01D 46/46* (2006.01)
  *B01D 50/20* (2022.01)
  *B60H 1/00* (2006.01)
  *B60H 3/06* (2006.01)
  *B62D 33/06* (2006.01)

(52) U.S. Cl.
  CPC ...... *B01D 46/2411* (2013.01); *B01D 46/4245* (2013.01); *B01D 46/429* (2013.01); *B01D 46/442* (2013.01); *B01D 46/446* (2013.01); *B01D 46/448* (2013.01); *B01D 46/46* (2013.01); *B01D 50/20* (2022.01); *B60H 1/008* (2013.01); *B60H 3/0608* (2013.01); *B60H 2003/0683* (2013.01); *B62D 33/0612* (2013.01)

(58) Field of Classification Search
  CPC .... B01D 46/009; B01D 46/446; B01D 46/46; B01D 46/442; B60H 3/0608; B60H 2003/0683; B62D 33/0612; G01N 33/0004
  USPC .......... 55/385.1, 306, DIG. 34; 96/417, 420, 96/421
  See application file for complete search history.

(56) References Cited

U.S. PATENT DOCUMENTS

| | | | |
|---|---|---|---|
| 8,657,928 B2 | 2/2014 | Moredock et al. | |
| 8,945,282 B2 | 2/2015 | Moredock et al. | |
| 9,700,828 B2 | 7/2017 | Moredock et al. | |
| 10,850,222 B2* | 12/2020 | Moredock ............ | B60H 3/0641 |
| 11,517,841 B2* | 12/2022 | Moredock ............ | B01D 46/448 |
| 2013/0025454 A1 | 1/2013 | Moredock et al. | |
| 2014/0132395 A1 | 5/2014 | Cunningham et al. | |
| 2015/0257002 A1 | 9/2015 | Miller, II et al. | |
| 2017/0129311 A1 | 5/2017 | Li | |
| 2017/0173505 A1 | 6/2017 | Dhingra et al. | |
| 2018/0117508 A1 | 5/2018 | Paluszewski et al. | |
| 2019/0043332 A1 | 2/2019 | Bublil | |
| 2019/0381863 A1 | 12/2019 | Currle | |
| 2020/0023296 A1 | 1/2020 | Stark et al. | |
| 2020/0031205 A1 | 1/2020 | Johnstone | |
| 2023/0071376 A1 | 3/2023 | Moredock et al. | |

FOREIGN PATENT DOCUMENTS

| | | |
|---|---|---|
| CN | 205523553 U | 8/2016 |
| EP | 2 228 116 A1 | 9/2010 |
| JP | 2001-063345 A | 3/2001 |
| JP | 2002-531237 A | 9/2002 |
| KR | 10-2017-0002537 A | 1/2017 |
| WO | 2000/32298 A1 | 6/2000 |
| WO | 2005/113112 A1 | 12/2005 |
| WO | 2014/077053 A1 | 5/2014 |
| WO | 2015/171571 A2 | 11/2015 |
| WO | 2016/096786 A1 | 6/2016 |
| WO | 2016/189421 A1 | 12/2016 |
| WO | 2022/115920 A1 | 6/2022 |
| WO | 2023/010179 A1 | 2/2023 |

OTHER PUBLICATIONS

Apr. 3, 2019 Office Action issued in Australian Patent Application No. 2018204751.
Jul. 11, 2019 Extended Search Report issued in European Patent Application No. 18180914.6.
Aug. 27, 2019 Office Action issued in Japanese Patent Application No. 2018-124148.
Jan. 8, 2020 Office Action issued in Korean Patent Application No. 10-2018-0076084.
Partial Translation of Jan. 8, 2020 Office Action issued in Korean Patent Application No. 10-2018-0076084.
Mar. 10, 2020 Office Action issued in Japanese Patent Application No. 2018-124148.
Oct. 28, 2020 Office Action issued in Chinese Patent Application No. 201810708762.5.
Apr. 12, 2022 Office Action issued in Brazilian Patent Application No. BR102018013533-3.
Unknown Unknown: "Respa Advisor—Operation manual", Jun. 30, 2021 (Jun. 30, 2021), pp. 1-15, XP093126542, Retrieved from the Internet: URL:https://www.sy-klone.com/mm5/graphics/00000001/PDF_files/Support/PressureSensor/Sy-Klone_RESPA-Advisor+_OperationManual.pdf [retrieved on Feb. 1, 2024] *the whole document*.
Feb. 15, 2024 European Search Report issued in European Patent Application No. 23173897.2.

* cited by examiner

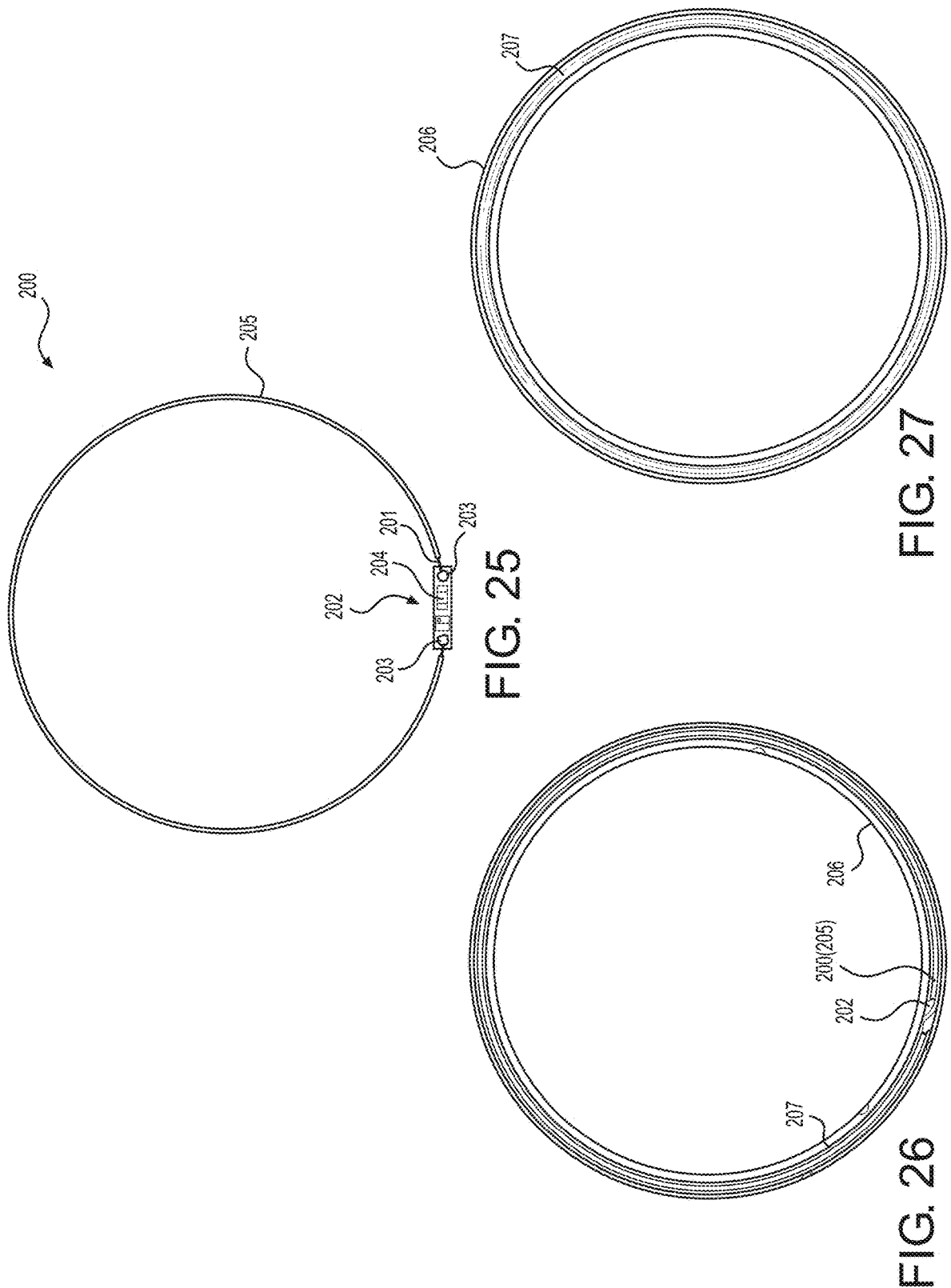

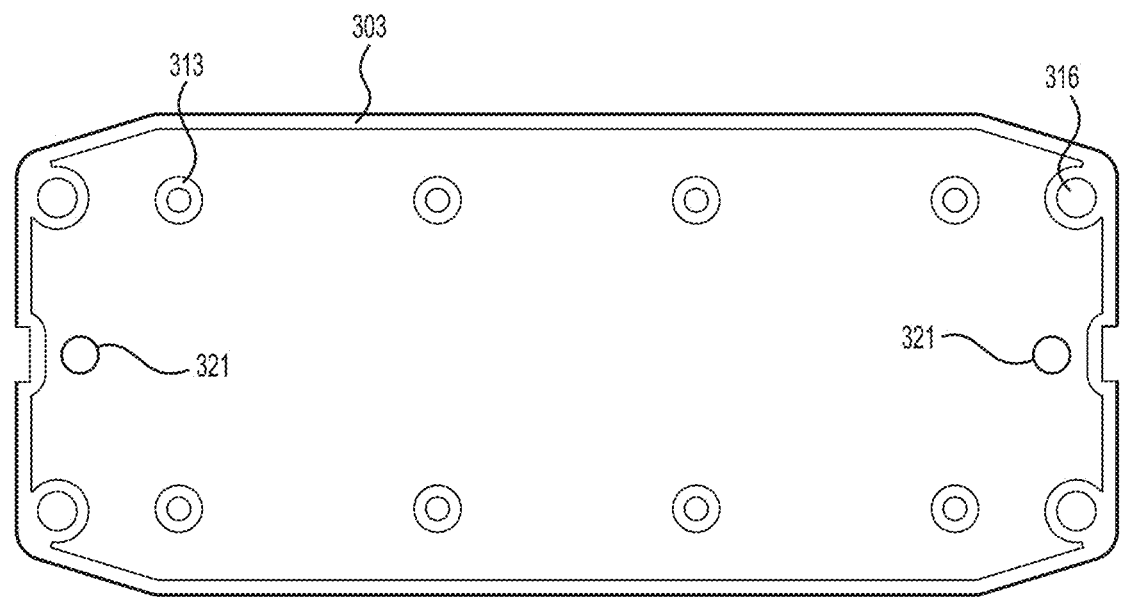
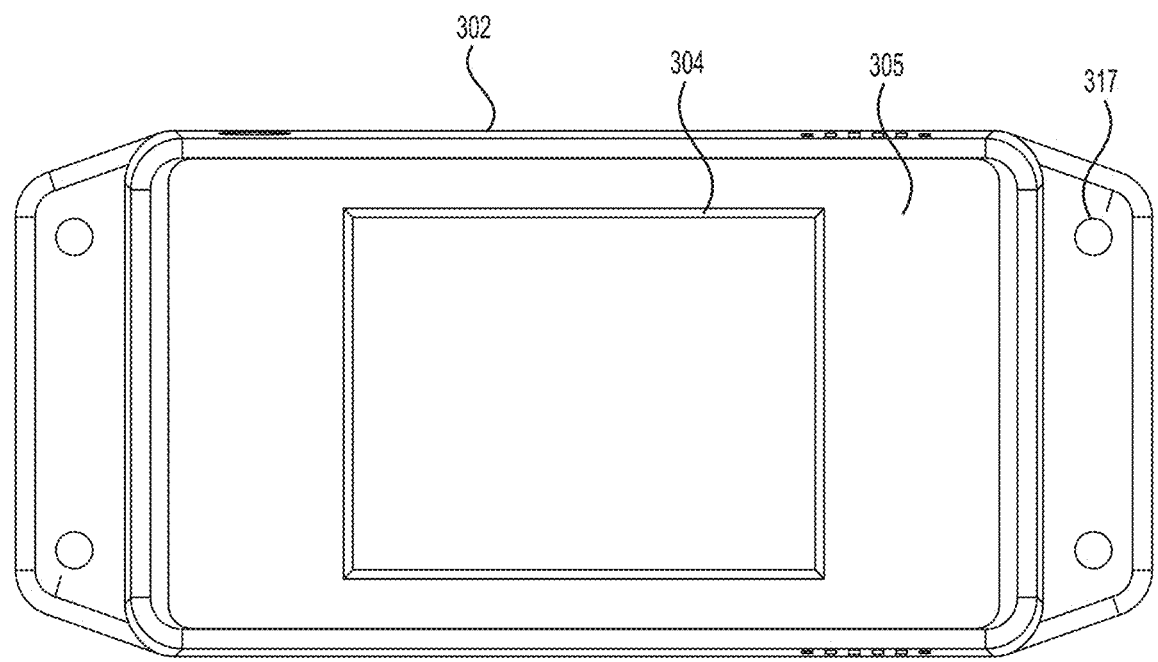
FIG. 35

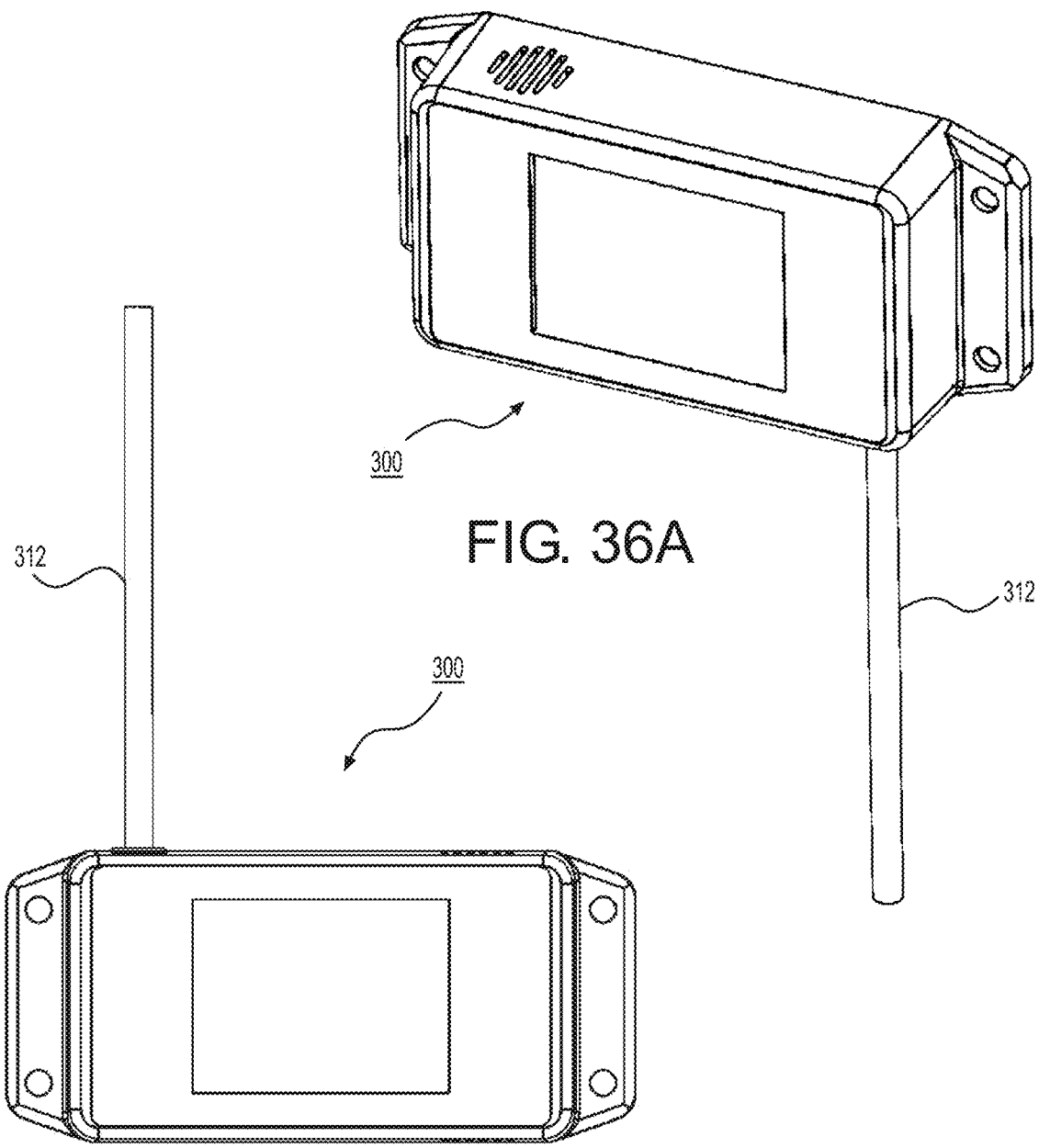
FIG. 36A
FIG. 36B
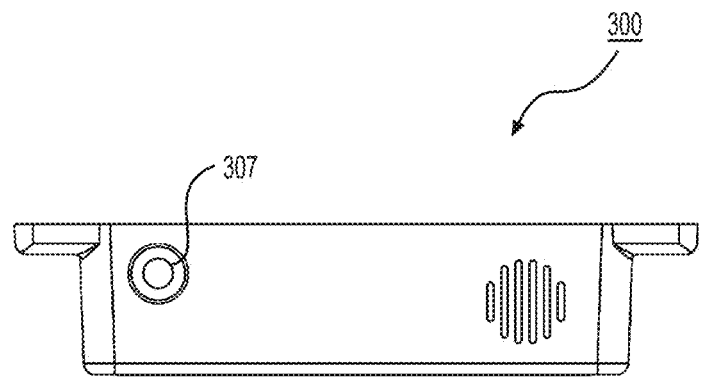
FIG. 36C

AIR QUALITY MONITORING AND CONTROL SYSTEM

This application is a Continuation of application Ser. No. 17/092,819 filed Nov. 9, 2020, now U.S. Pat. No. 11,517,841, which is a Continuation of application Ser. No. 16/022,941 filed Jun. 29, 2018, now U.S. Pat. No. 10,850,222 B2, which claims the benefit of priority from Provisional Application No. 62/527,276 filed Jun. 30, 2017, the entire contents of the prior applications being incorporated herein by reference.

BACKGROUND

The present disclosure relates to an air quality monitoring and control system for monitoring and controlling air quality within an enclosure, such as a vehicle cabin.

To maintain air quality inside an enclosure, certain environmental conditions must be maintained. Conventionally, this has presented problems due to the inability to control certain variables such as $CO_2$ concentrations which come from the exhaling operator of, for example, a vehicle cabin (also referred to as a "cab"). Fresh air intake and cab leakage are additional variables which have been difficult to measure and control. To keep dust out of the cab, the cab must be under continuous positive pressurization. This is difficult to achieve in a static system due to changing variables such as dirt load on an air filter, operator interface with the HVAC blower motor, open doors and windows, and dust on the operator vestments brought into the cab.

Prior attempts at addressing these problems are antiquated and inadequate to address the real-world operating conditions of environmental cabs. Currently pressure sensors, pressure switches, and $CO_2$ sensors are used in cabs. There is currently no integrated proactive comprehensive cab air quality system.

SUMMARY

Exemplary embodiments of the broad inventive principles described herein address the aforementioned problems by providing a comprehensive cab air quality system that proactively monitors and controls devices within and outside the cab such as an air precleaner in order to control parameters such as airflow, cab pressure, gas concentration, and alarm conditions.

It should be understood that the following disclosure is not limited to monitoring and controlling air quality within a cab. Rather, there are many different enclosures and environments to which the following disclosure is applicable, such as air intake into an engine or environmental enclosure. As one non-limiting example, the following disclosure will discuss the disclosed embodiments as applied to a vehicle cab.

The exemplary embodiments disclosed herein can be used with the air precleaner and method associated with the Sy-Klone RESPA® Cab Air Quality System. Additionally, features of the embodiments can be understood with reference to the air precleaners and methods disclosed in commonly owned U.S. patent application Ser. No. 11/877,036 filed Oct. 23, 2007 (now U.S. Pat. No. 8,007,565 issued Aug. 30, 2011) and U.S. patent application Ser. No. 14/536,849 filed Nov. 10, 2014, the entire disclosures of which are incorporated herein by reference.

One solution to the problems discussed above is repeated or continuous monitoring of pertinent environmental data, repeated or continuous reporting of the data, and the ability for the system and its sensors to modify the cab environment while driving cab activity controlled by the system.

The monitoring may produce data and output the data to the owner or manager of a health and safety program so that corrective action can be taken to protect the cab operator from exposure. Essentially, the cab operator or owner instructs the disclosed system how the cab is to perform, and the system uses its sensors to collect the data, analyze the data, and effect the desired outcome, which in the embodiments can be done continuously and instantaneously.

BRIEF DESCRIPTION OF THE DRAWINGS

FIG. 25 is a top view showing a first embodiment of the filter ID ring.

FIG. 26 is a top view showing a modified embodiment with the filter ID ring in a molded ring body.

FIG. 27 is a top view showing the molded ring body without the filter ID ring.

FIG. 35 is a top view showing the advisor housing.

FIGS. 36A to 36C are views showing the advisor module with the advisor housing assembled.

DETAILED DESCRIPTION OF EXEMPLARY EMBODIMENTS

Figure 1:
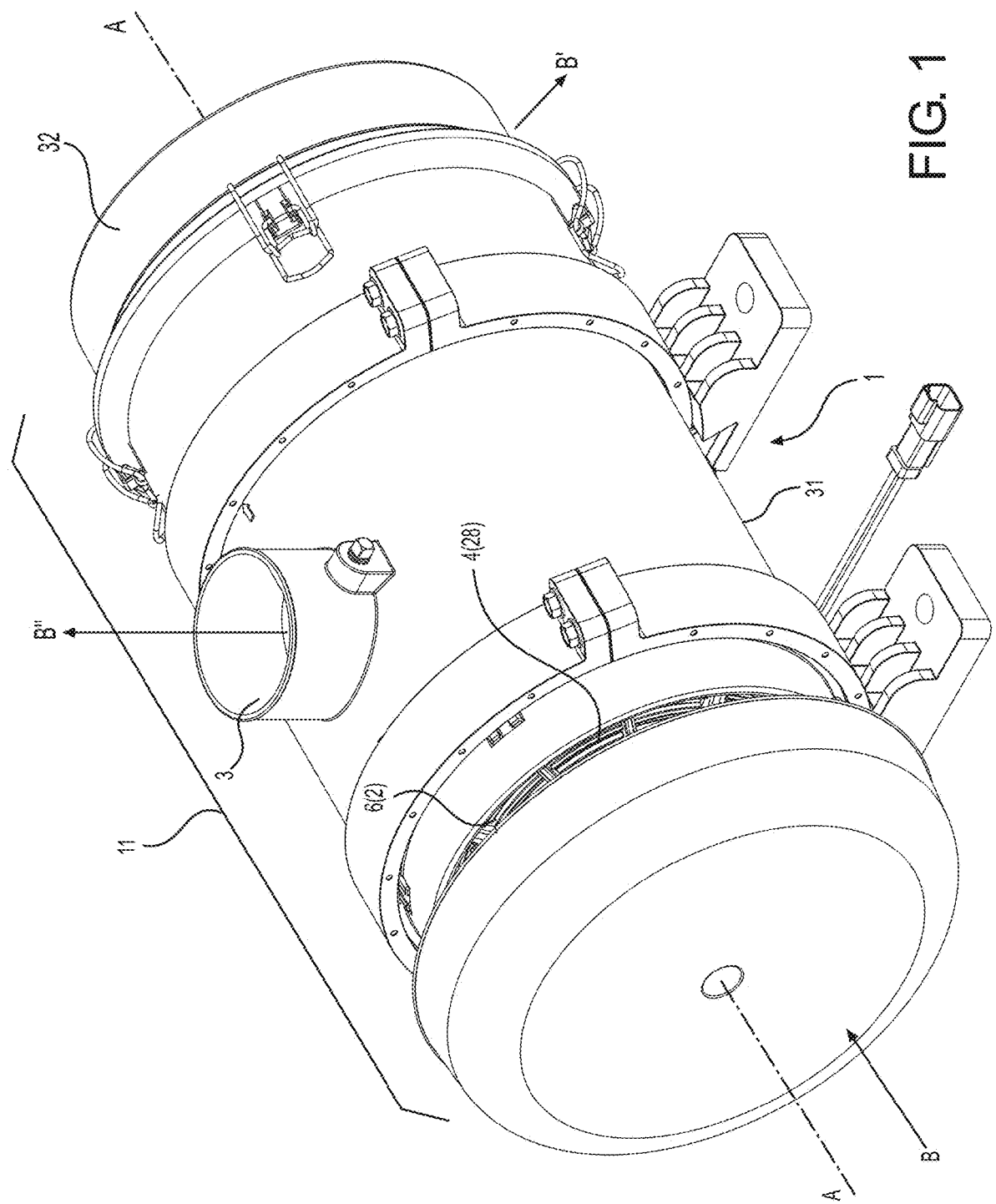
FIG. 1 is a perspective view of an exemplary air precleaner.

Exemplary embodiments of an air quality monitoring and control system are described below in detail.

The air quality monitoring and control system according to one embodiment includes an air precleaner 1, a RESPA control module 100, a filter identification ring 200 (hereinafter, "filter ID ring"), an advisor module 300, a plurality of sensors, and other associated devices which will be discussed below. The RESPA control module 100, the filter ID ring 200, the advisor module 300, and the sensors communicate with each other to effect the repeated monitoring of all pertinent environmental data, reporting of the data, and modification of the cab environment when required. The repeated monitoring and reporting can be continuous or intermittent.

It should be understood that the air precleaner 1 is a device that has precleaning, filtering, and pressurizing capabilities, as described below. In other words, the term "precleaner" does not refer to a device that merely performs precleaning. The precleaner 1 is configured to preclean, filter and pressurize in the manner described below. The air precleaner 1 is a smart, electronically controlled intake system designed to monitor and/or control one or more of airflow, air quality, air temperature, pressure drop on an air filter 7, temperature differential between outside and inside the air precleaner 1, filter life, and other parameters.

The filtration medium (air filter medium) may be selected based on the environment in which it is used. For example, the filtration used in the air precleaner 1 may be self-cleaning synthetic fiber nanotechnology overlay, achieving 0.3 micron filtration.

The air filter 7 may be a smart filter containing a microchip 204 that is powered by the RESPA control module 100 and that contains data regarding the filter 7 and the history of filter use.

(1) Description of Air Precleaner

The air precleaner 1 of one embodiment is similar in some aspects to the air precleaner of U.S. patent application Ser. No. 14/536,849 incorporated by reference above, yet with important structural differences, some of which are discussed below. As mentioned above, the air precleaner 1 is a device that has precleaning, filtering, and pressurizing capabilities. FIGS. 1 to 5 show exemplary embodiments of the air precleaner 1.

Figure 2:
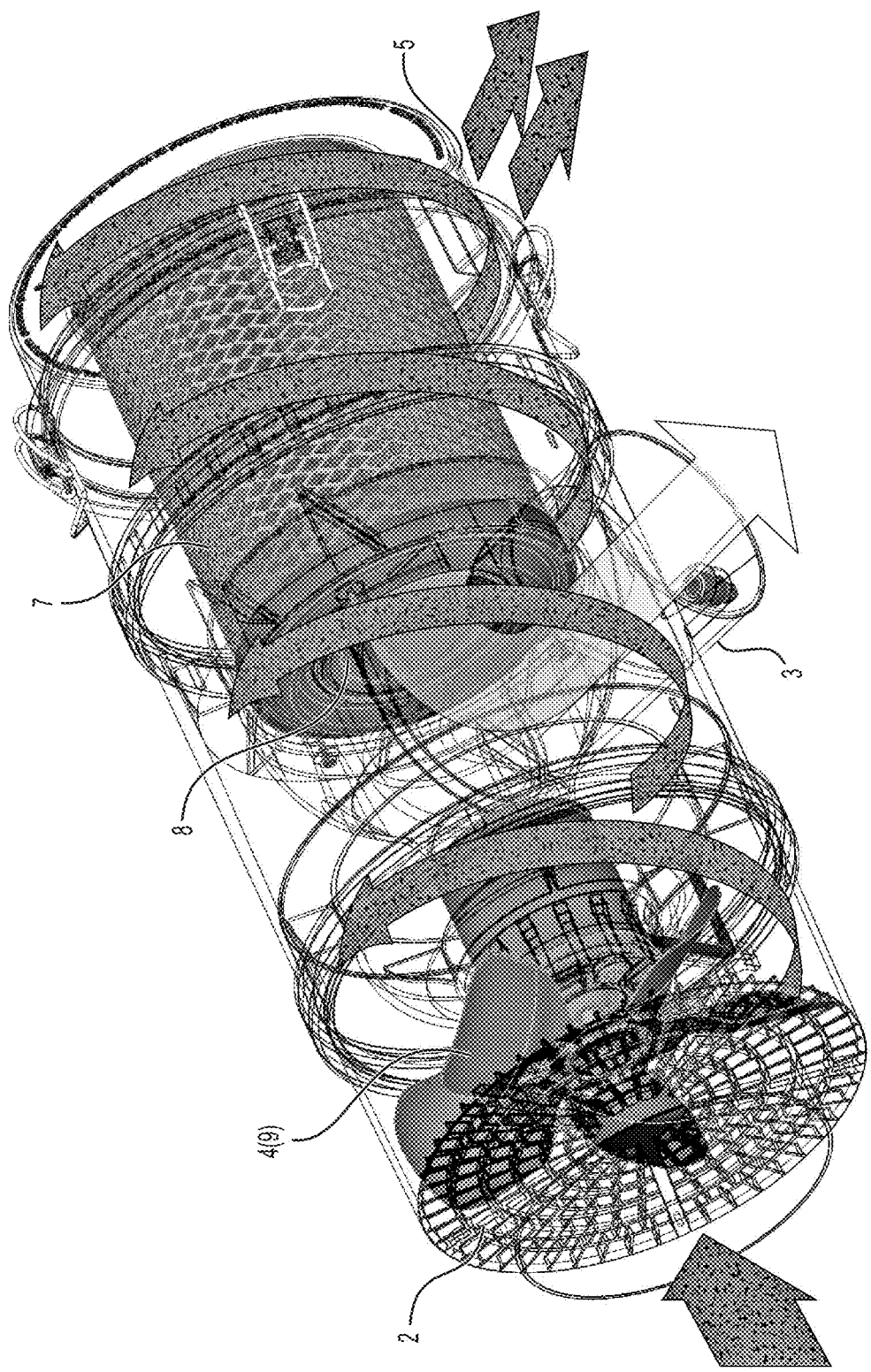
FIG. 2 is a diagrammatic view showing airflow through the precleaner.

As shown in FIGS. 1 and 2, the air precleaner 1 of the disclosed embodiments comprises a flow path (shown by arrows in FIG. 2) extending through the system from an inlet 2 to an outlet 3 of a precleaner housing 11 having a longitudinal axis A-A. A motor-driven fan 4 is located along the flow path to draw particulate debris-laden air into the inlet 2 and rotate it about the longitudinal axis A-A of the system to form a rotating flow that stratifies the debris-laden air with the heaviest particles in the outermost orbits of the rotating flow.

One or more ejector ports 5 are provided in a separator chamber end section 32 of the precleaner housing 11 for ejecting particulate debris-laden air from the outermost orbits of the stratified rotating flow in the separator chamber 31 of the air precleaner 1. The volume of the debris-laden air may be compressed by an airflow management structure (12, 13, 29) within the air precleaner 1 as it moves through stationary vanes 13 to increase the air velocity and is rotated by the airflow management structure.

The airborne debris remains in the outermost orbits of the rotating air within the separator chamber 31 of the air precleaner 1 until it reaches the ejector port(s) 5 at the lower end of the separator chamber 31 where it is ejected back into the environment. The airflow that has been stripped of most of the debris, in the innermost orbits of the stratified rotating flow within the separator chamber 31, is drawn through the filter 7 by the pressure differential between the precleaner housing 11 and the outlet 3 (B") and flows out through the filter 7 and into an air filter internal passage 8. The filtered air then flows to the clean air outlet 3 of the air precleaner 1 and to a downstream device, such as an internal combustion engine or cab ventilation system, connected to the outlet 3.

Debris-laden air is reliably ejected because positive pressure is maintained inside the separator chamber 31 during operation. This is due to the fact that the amount of air pulled by the fan 4 into the air precleaner 1 through the inlet 2 is greater than the amount of air ejected through the ejector ports 5 or the clean air outlet 3. The pressure differential results in a constant positive pressure maintained inside the separator chamber 31. As a result, the heavy particulate matter separated in the separator chamber 31 can be ejected through the ejector port(s) 5 rather than collecting on the air filter 7.

Within the precleaner housing 11, the motor-driven fan 4 has a fan blade 9 mounted on a fan motor 28. The fan motor 28 can be a brushed motor or a brushless motor. Advantages of using a brushless motor include higher efficiency, lower susceptibility to mechanical wear, increased torque, and reduced noise. For the purpose of the following description, the fan motor 28 is brushless.

The fan blades 9 may be located below the air inlet screen 6 and along the flow path upstream of the airflow management structure to draw particulate debris-laden air into the inlet 2 and flow the debris-laden air along the flow path. The airflow management structure inside the precleaner housing 11 may include a manifold 12 (shown in FIGS. 4 and 5), the stationary vanes 13, and a shroud 29 (shown in FIG. 22) which are both located inside the separator chamber 31. Specifically, the manifold 12 and the shroud 29 are disposed on opposite axial ends of the separator chamber 31. The shroud 12 is configured to maintain centrifugal flow of the air inside the separator chamber 31 toward the walls of the separator chamber 31 forming the precleaner housing 11. The manifold 12 may taper outwardly downstream of the fan blade 9, leaving an outer annular passage with circumferentially spaced, angled, stationary vanes 13 of the airflow management structure connecting the manifold 12 to the precleaner housing 11.

The stationary vanes 13 may take different forms. In one embodiment, the stationary vanes 13 are formed integrally with the precleaner housing 11 and the manifold 12. In this case, the vanes 13 may be formed of a material similar to or the same as the material forming the precleaner housing 11 and the manifold 12.

Figure 3:
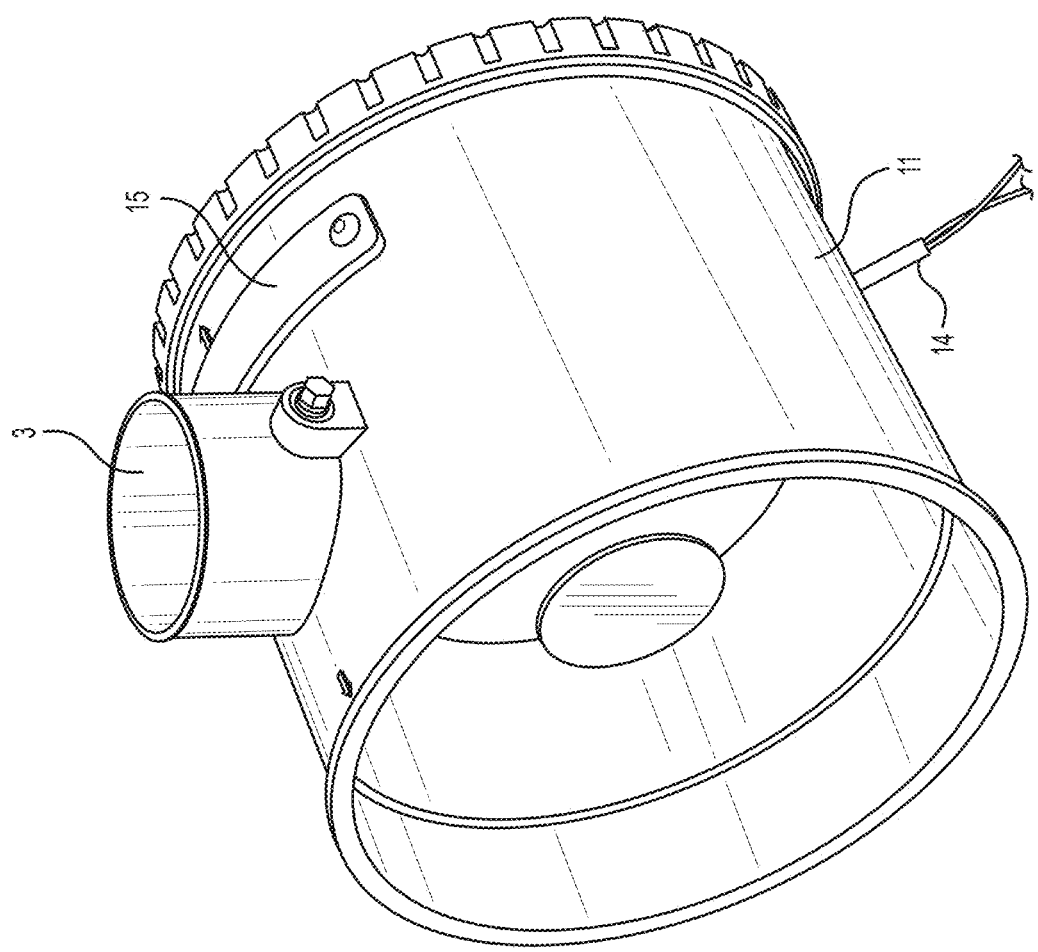
FIG. 3 is a first axial side perspective view of a portion of the precleaner housing.
Figure 5:
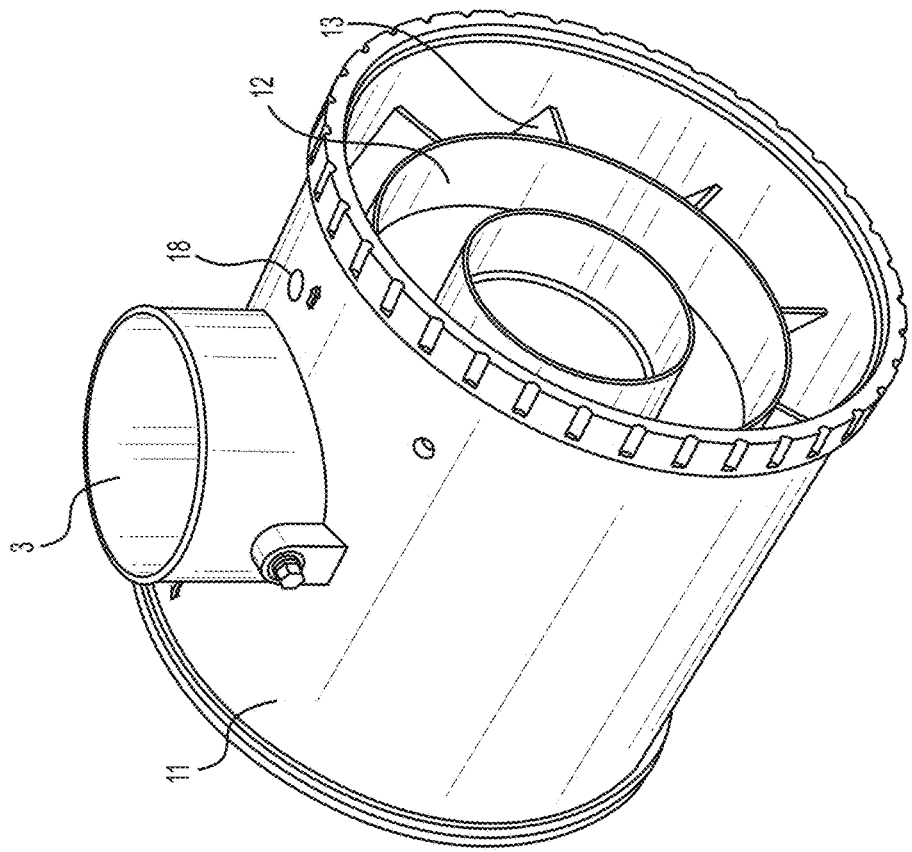
FIG. 5 is a second axial side perspective view of the portion of the precleaner housing with a modified outlet.
Figure 4:
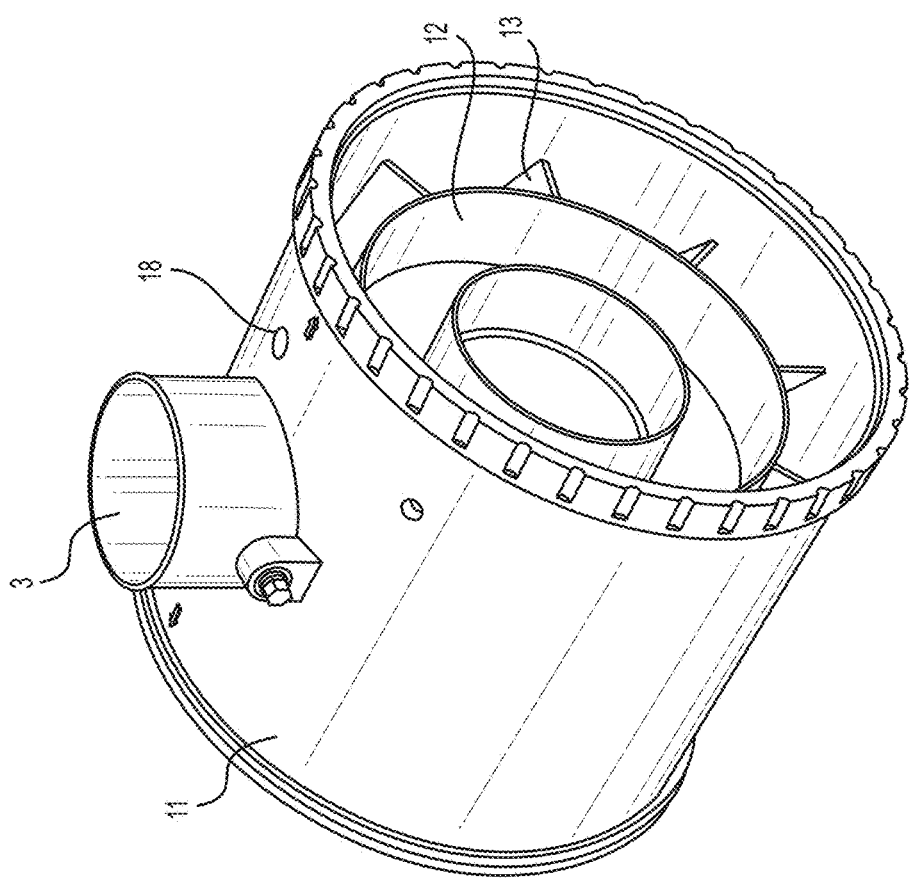
FIG. 4 is a second axial side perspective view of the portion of the precleaner housing.

As seen in FIGS. 3 to 5, the precleaner housing 11 may be configured to accommodate the installation of the RESPA control module 100 and an RCM antenna board 118 (described in detail below). In particular, holes may be provided in the housing 11 to accommodate a power cable 14 and a pressure ventilation tube rain cap 15 (described in detail below). The power cable 14 provides power to the RESPA control module 100. Notches (not shown) may be provided in the shroud 29 where the power cable 14 passes under the shroud 29 and connects to the RCM antenna board 118, and where power lead wires 116 and antenna wires 117 pass under the shroud 29 and connect to the RESPA control module 100. FIG. 4 is a view of one embodiment of the housing 11 having a three-inch diameter outlet 3. FIG. 5 is a view of another embodiment of the housing 11 having a four-inch diameter outlet 3. Of course, it should be understood that the diameter of the outlet 3 may vary as needed.

(2) Description of RESPA Control Module

Figure 6:
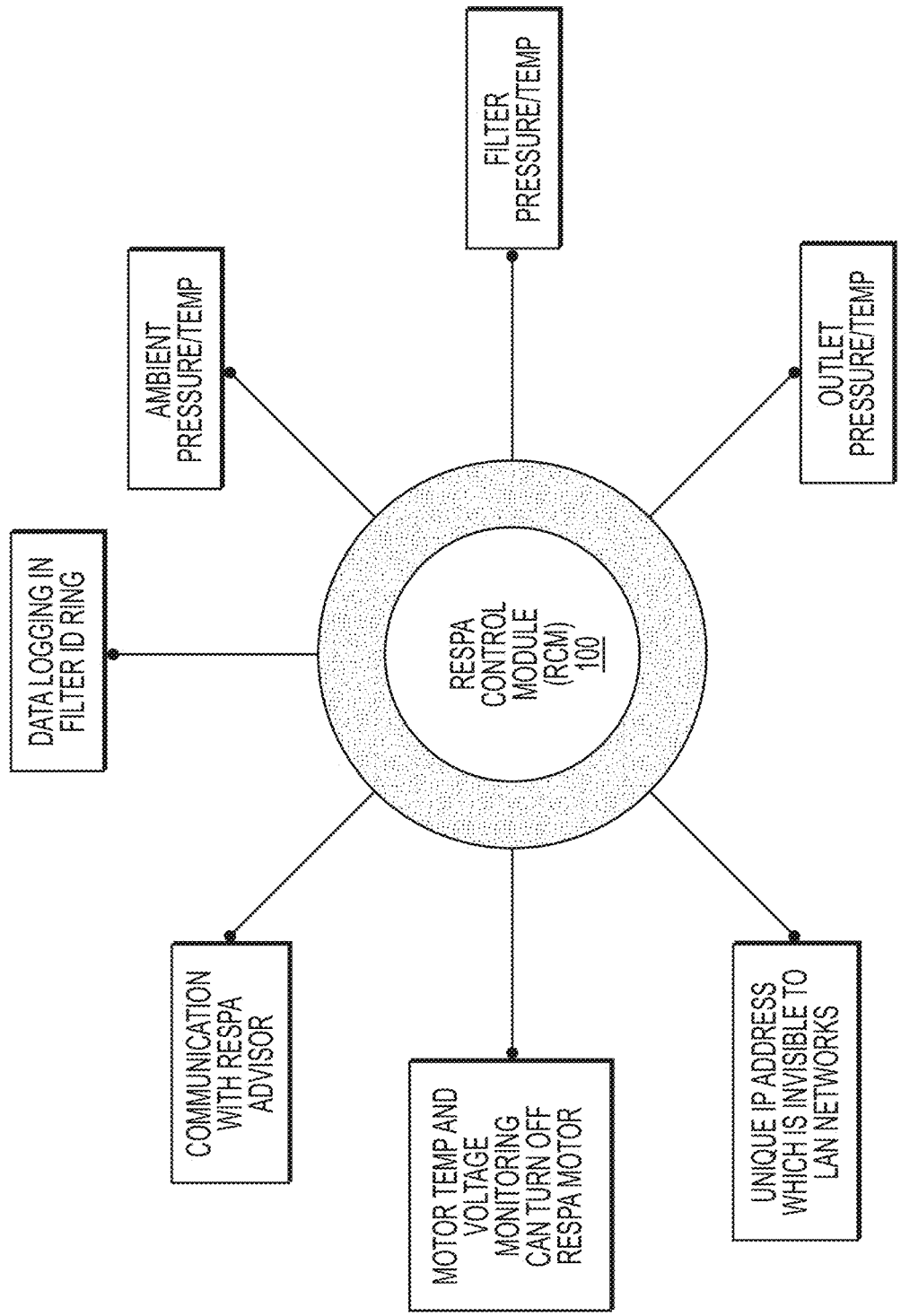
FIG. 6 is a diagram showing various functions and connections of a RESPA control module.
Figure 7:
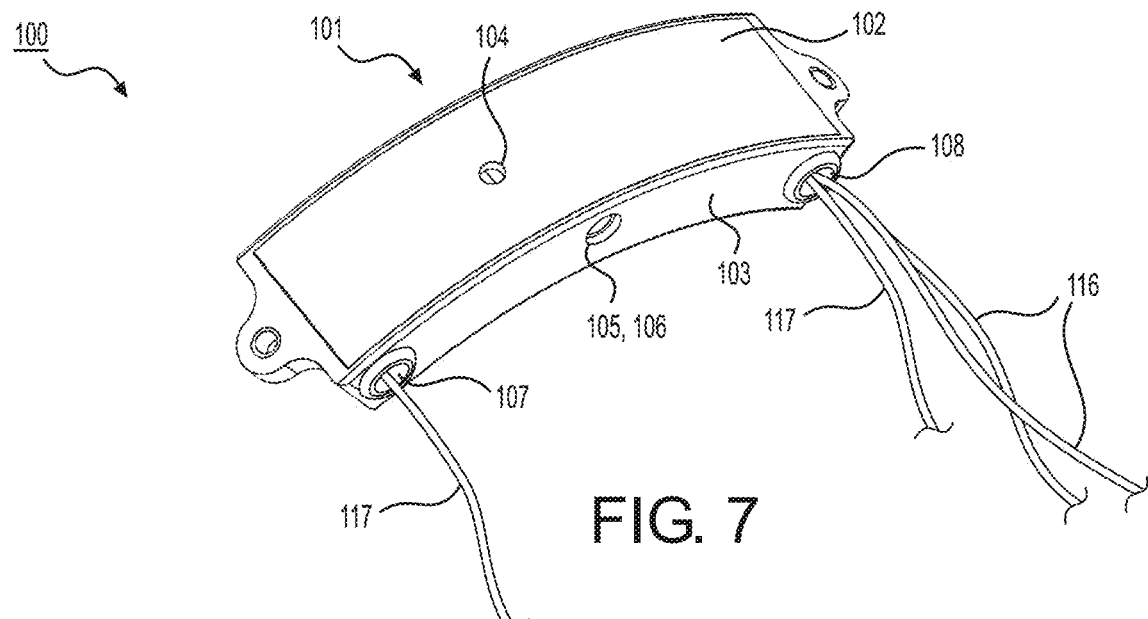
FIG. 7 is a perspective view of the RESPA control module.
Figure 8:
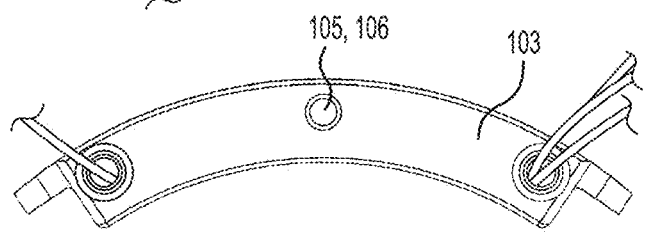
FIG. 8 is a side view of the RESPA control module.
Figure 9:
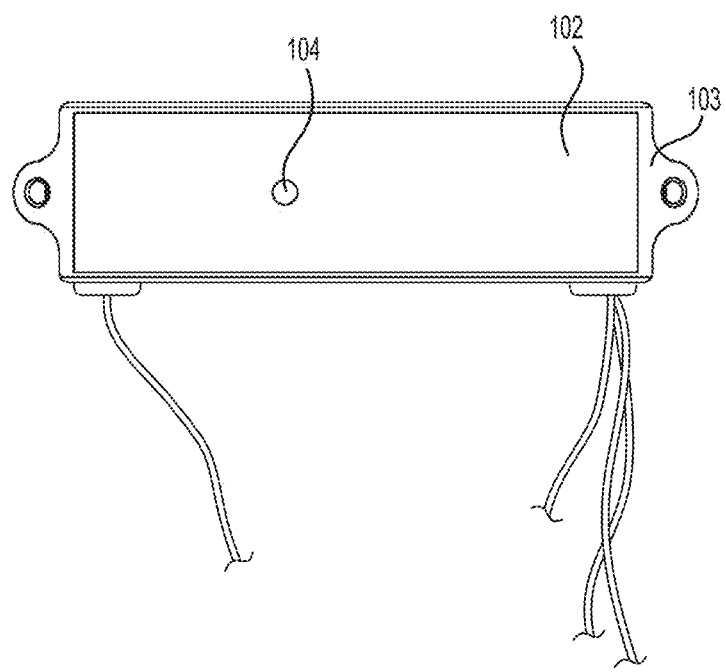
FIG. 9 is a top view of the RESPA control module.

The RESPA control module 100 (also called "RESPA® Control Module" or "RCM") may be permanently mounted within the air precleaner 1. The RCM 100 receives data from all sensors mounted in and around the precleaner housing 11, analyzes the data, and proactively changes the operation of the RESPA intake system. FIG. 6 shows various functions and connections of the RESPA control module 100. Of course, it will be understood that the functions and connections of the RESPA control module 100 are not limited to those shown in FIG. 6. The RESPA control module 100 may be connected to the advisor module 300 via a radio (or other suitable communication means) which is built into the RESPA control module 100. The RESPA control module 100 may be powered by the machine on which the air precleaner 1 is mounted, or may receive power from any other suitable power source.

Figure 10:
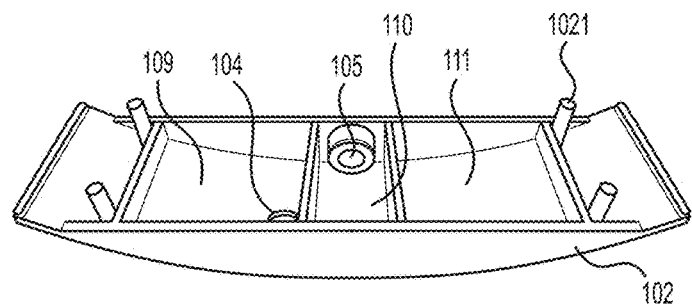
FIG. 10 is a perspective view of an inside of a module top.
Figure 11:
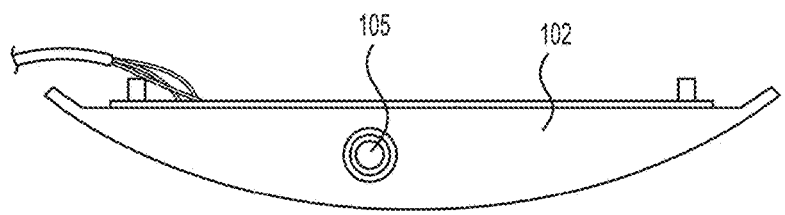
FIG. 11 is a side view of the module top.
Figure 12:
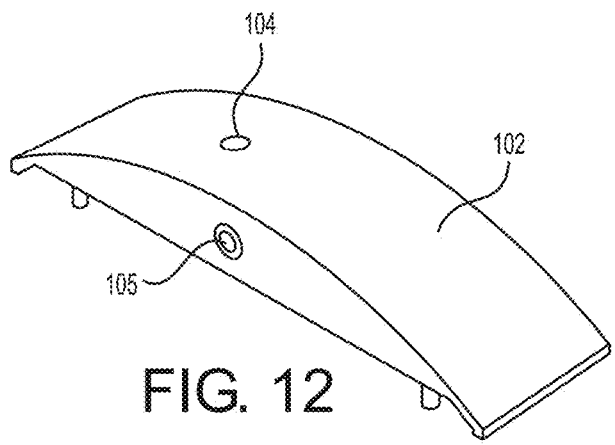
FIG. 12 is a perspective top view of the module top.
Figure 13:
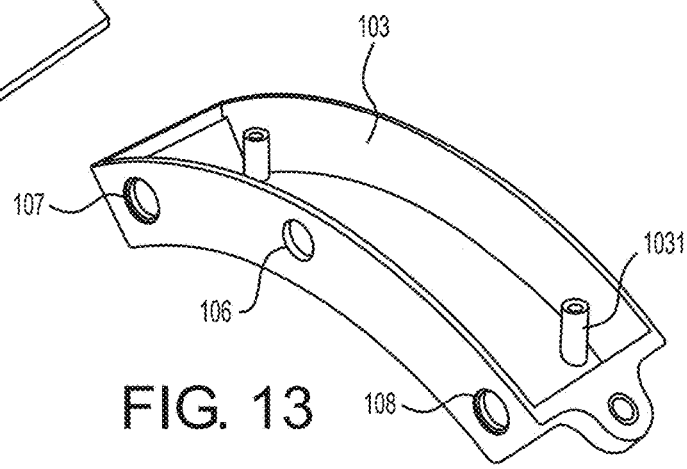
FIG. 13 is a perspective top view of a module base.

The RESPA control module 100 includes a module housing 101 formed of a module top 102 and a module base 103. The module housing 101 may be formed by, for example, polypropylene injection molding. FIGS. 7 to 9 and 15 show the module top 102 assembled to the module base 103. FIGS. 10 to 12 show the module top 102 separated from the module base 103, and FIG. 13 shows the module base 103 separated from the module top 102. As shown in FIGS. 7 to 13, the module top 102 is sized so as to fit inside the module base 103. The module top 102 may be provided with one or more male posts 1021 which fit with one or more female posts 1031 formed on the module base 103, thereby assembling the module top 102 to the module base 103.

As seen in FIG. 10, an internal area of the module top 102 is divided into three separate compartments: a first compartment 109, a second compartment 110 and a third compartment 111. Each compartment is sealed in an air-tight manner so as to be fluidly separated from the other compartments. As will be discussed in detail further below, each compartment houses a corresponding sensor.

Figure 15:
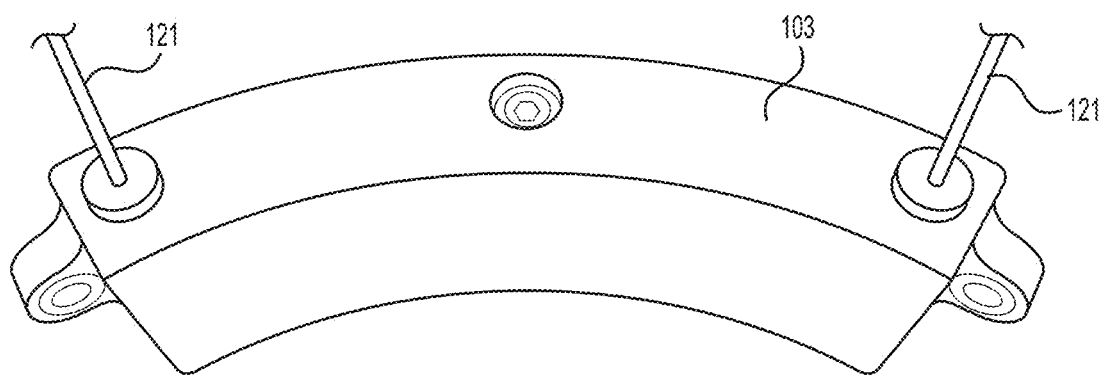
FIG. 15 is a bottom perspective view of the RESPA control module.

As seen in FIGS. 10 and 12, the module top 102 has a first hole 104 formed off-center on a top surface of the module top 102, and a second hole 105 formed at the center of a side surface of the module top 102. The first hole 104 communicates with the first compartment 109, and the second hole 105 communicates with the second compartment 110. An ambient pressure ventilation tube 17 (described in detail below) may be inserted into the first hole 104. An outlet pressure tube (not shown) may be inserted into the second hole 105. Specifically, the outlet pressure tube has a first end inserted into the second hole 105 and a second opposite end inserted into a hole formed in the outlet 3. Alternatively, a fastener 1051 (such as a brass screw) may be inserted into the second hole 105 as seen in FIG. 15 when the outlet pressure tube is not used.

As shown in FIG. 13, the module base 103 has a third hole 106, a fourth hole 107 and a fifth hole 108, all of which are formed on a side surface of the module base 103. The fourth hole 107 communicates with the first compartment 109, the third hole 106 communicates with both the second hole 105 and the second compartment 110, and the fifth hole 108 communicates with the third compartment 111. The first end of the outlet pressure tube (not shown) is inserted into both the third hole 106 and the second hold 105.

Figure 14:
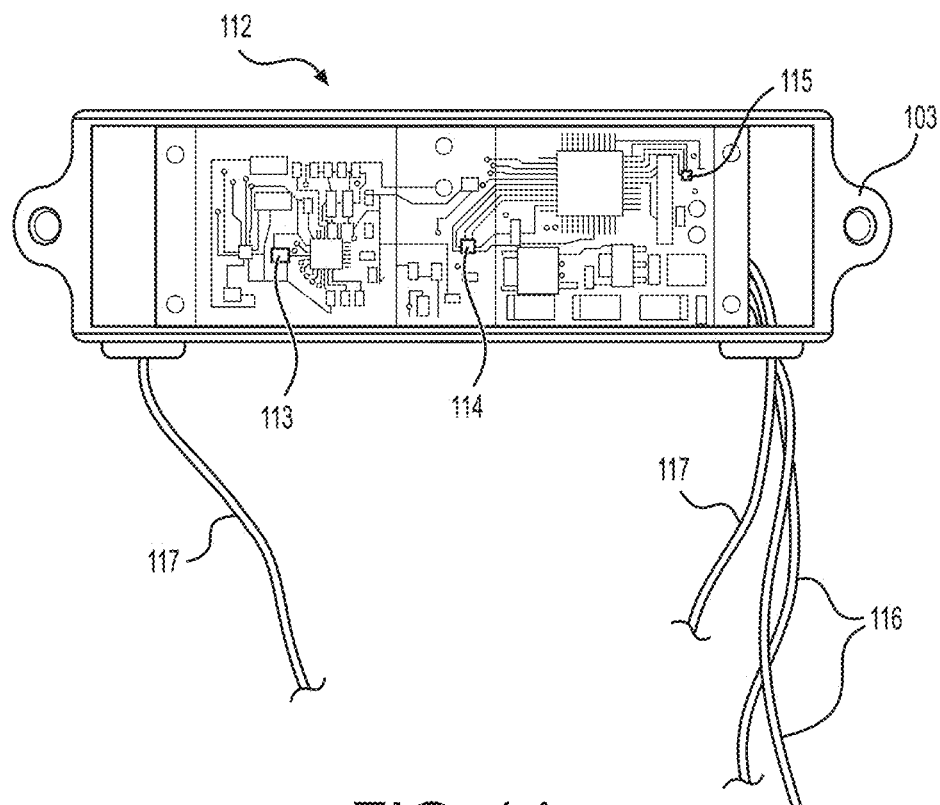
FIG. 14 is a top view showing the inside of the RESPA control module with a circuit board.
Figure 16:
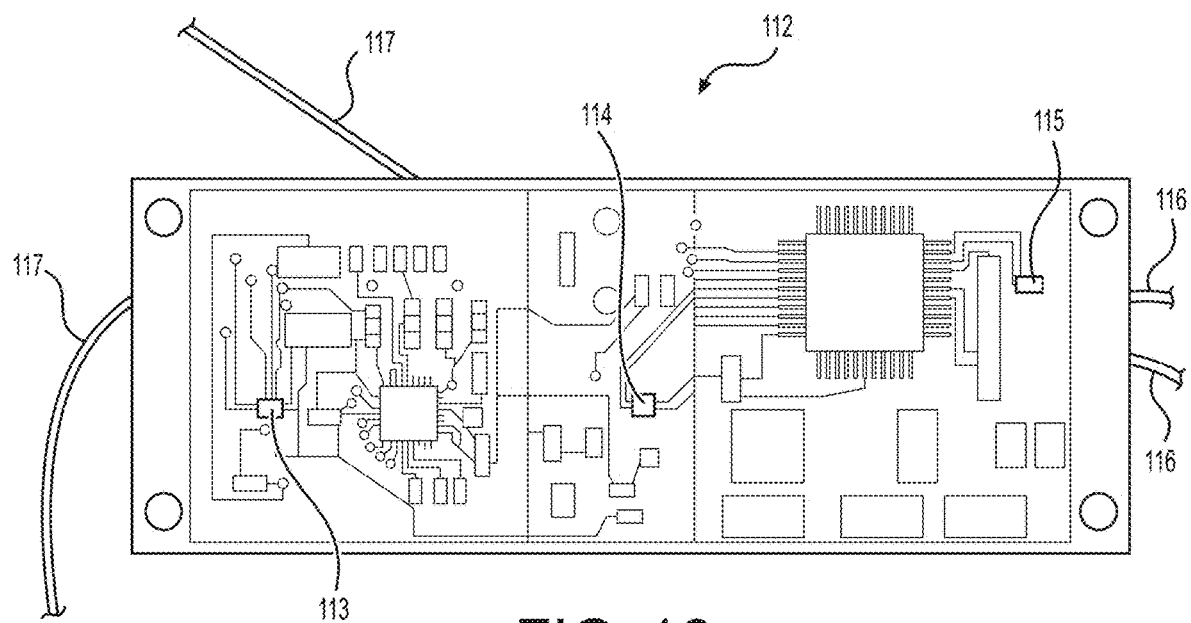
FIG. 16 is a front view of the circuit board.
Figure 17:
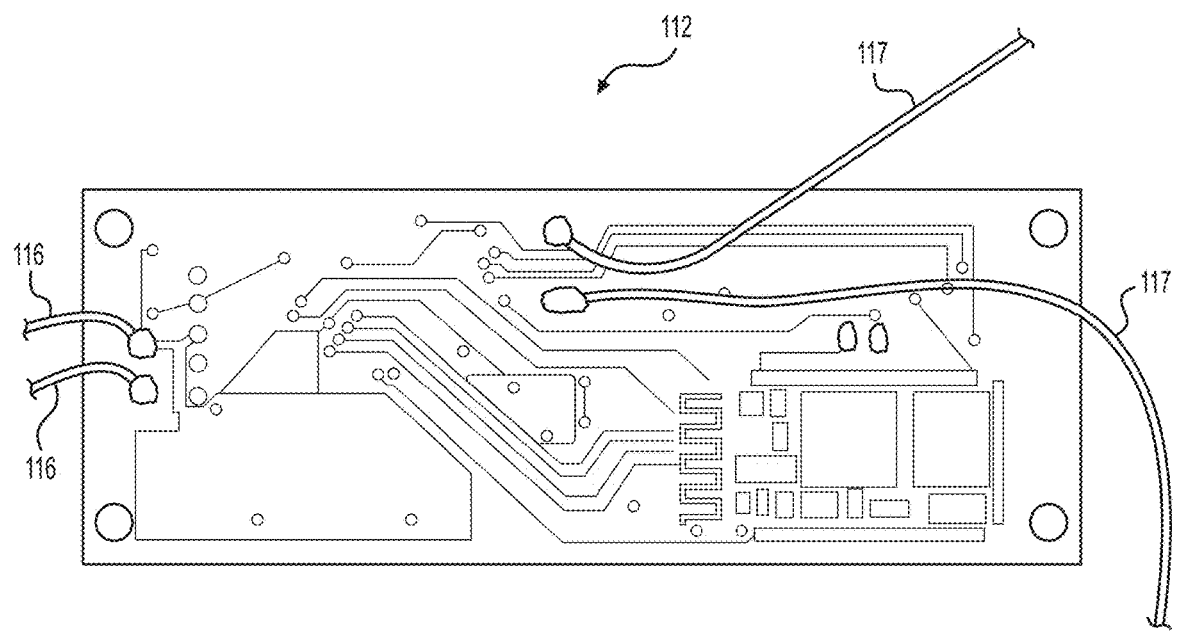
FIG. 17 is a rear view of the circuit board.

Inside the module housing 101, a circuit board 112 is disposed as shown in FIG. 14. FIG. 16 is a view showing a front surface of the circuit board 112, while FIG. 17 shows a rear surface of the circuit board 112. The circuit board 112 includes a microchip with a central processing unit (CPU) and a memory (e.g., RAM). The circuit board 112 is further provided with plural sensors. According to this embodiment, three sensors 113, 114 and 115 are included in the module housing. Of course, the number of sensors is not limited to three. The RESPA control module 100 can monitor one or more of the pressure, temperature, and humidity of ambient air using a first pressure sensor 113 disposed in the first compartment 109. Specifically, the first pressure sensor 113 communicates with the ambient air via the first hole 104 and the ambient pressure ventilation tube 17 discussed in detail further below. The RESPA control module 100 can further monitor one or more of the pressure, temperature, and humidity of air inside the precleaner housing 11 using a second pressure sensor 115 disposed in the third compartment 111. Specifically, the second pressure sensor 115 communicates with the air inside the precleaner housing 11 due to leakage of the air through mating surfaces of the module top 102 and the module base 103. In other words, because the module top 102 and the module base 103 are fitted together without any sealant at the mating surfaces, the air inside the precleaner housing 11 leaks to the inside of the third compartment 111, thereby reaching the second pressure sensor 115. The RESPA control module 100 can additionally monitor one or more of the pressure, temperature, and humidity of air flowing through the outlet 3 of the air precleaner 1 using a third pressure sensor 114 disposed in the second compartment 110. Specifically, the third pressure sensor 114 communicates with the clean (filtered) air flowing through the outlet 3 via the second hole 105, the third hole 106, the outlet pressure tube, and the hole formed in the outlet 3. Accordingly, the RESPA control module 100 can, for example, monitor one or more of the pressure, temperature and humidity of the ambient air, the air inside the precleaner housing 11, and the air at the outlet 3. It should be understood that, although certain sensors in this disclosure are referred to as "pressure sensors," they may be configured to detect and measure one or more of pressure, temperature, and humidity, as discussed above.

The circuit board 112 of the RESPA control module 100 is provided with the power lead wires 116 connected thereto for providing power to the RESPA control module 100 via the RCM antenna board 118 (described in detail below). In particular, the power lead wires exit through the fifth hole 108 of the module housing 101 for connection with the RCM antenna board 118. The circuit board 112 is also provided with the antenna wires 117 which exit through the fourth and fifth holes 107 and 108 of the module housing 101 for connection with the RCM antenna board 118. The power lead wires 116 and the antenna wires 117 may exit the module housing 101 as separate wires, as seen in FIGS. 7 to 9 and 14, or may be covered by a sheath 121 as shown in FIG. 15. As will be discussed below, the RCM antenna board 118 may be used to provide power to the RESPA control module 100. In addition, the circuit board 112 may have Bluetooth® capabilities, WiFi capabilities (e.g., 802.11 WiFi), and radio capabilities for radio transmission. The circuit board 112 may further have a high voltage protection circuit, electromagnetic interference (EMI) circuitry, and inner-board shielding.

The RESPA control module 100 has an integrated accelerometer which allows the sensors in the RESPA control module 100 (which can be sensitive to movement) to function accurately in high vibration environments such as a cab or an engine by measuring vibration and removing a vibration component from the sensor measurements. The accelerometer is integral with the pressure sensors 113, 114 and 115.

Figure 18:
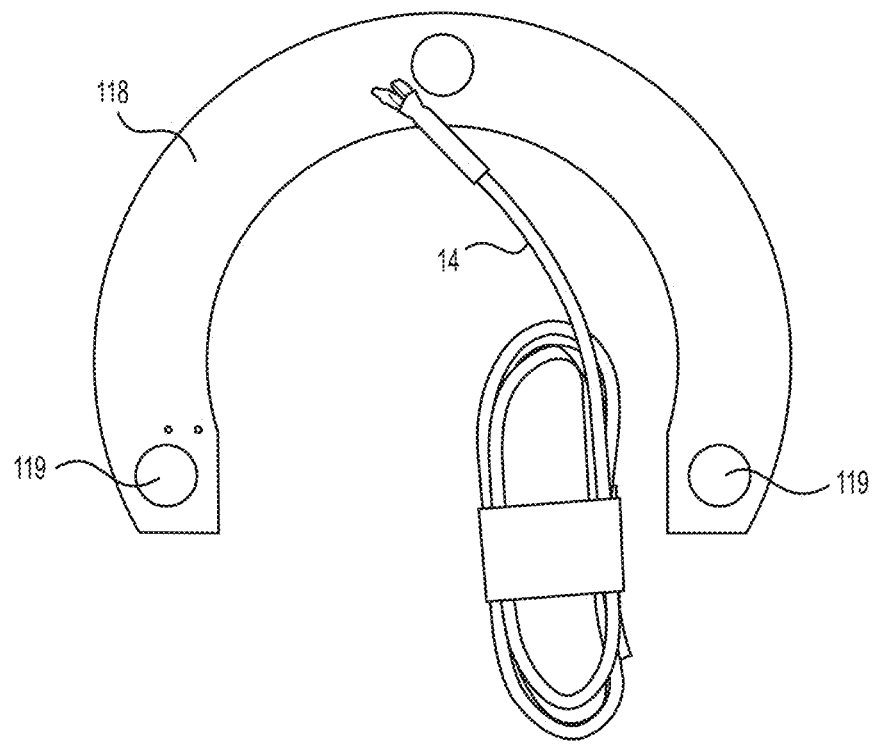
FIG. 18 is a rear view of an RCM antenna board.
Figure 19:
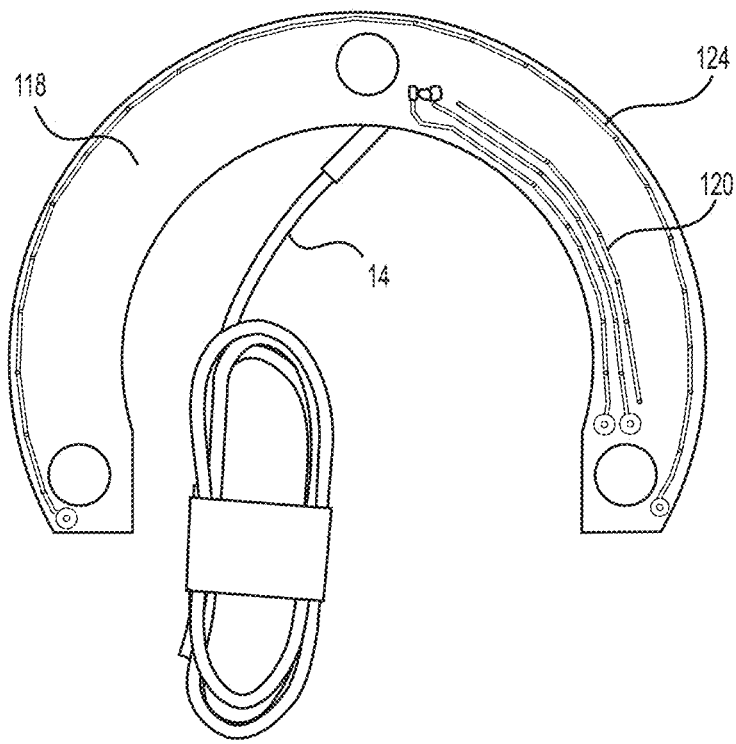
FIG. 19 is a front view of the RCM antenna board.
Figure 20:
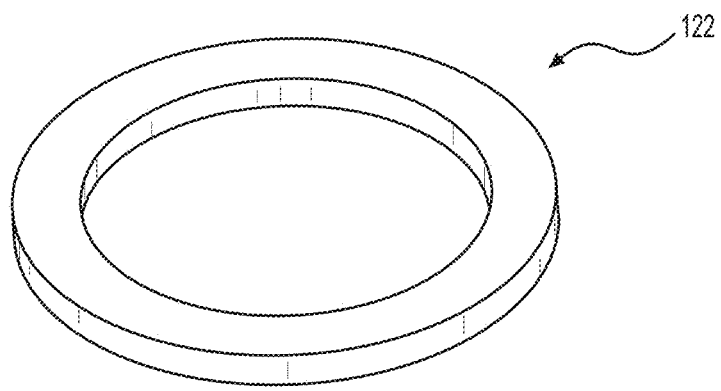
FIG. 20 is a perspective view of an antenna riser.
Figure 21:
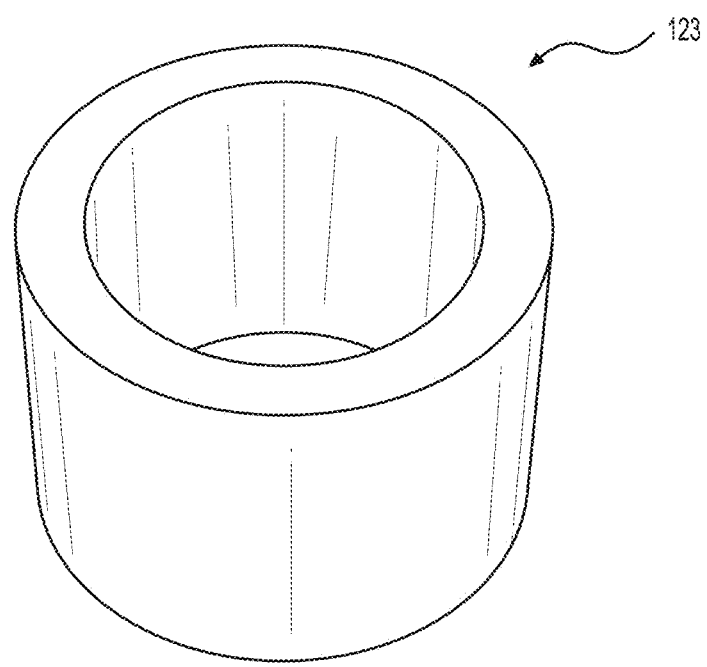
FIG. 21 is a perspective view of an antenna spacer.
Figure 22:
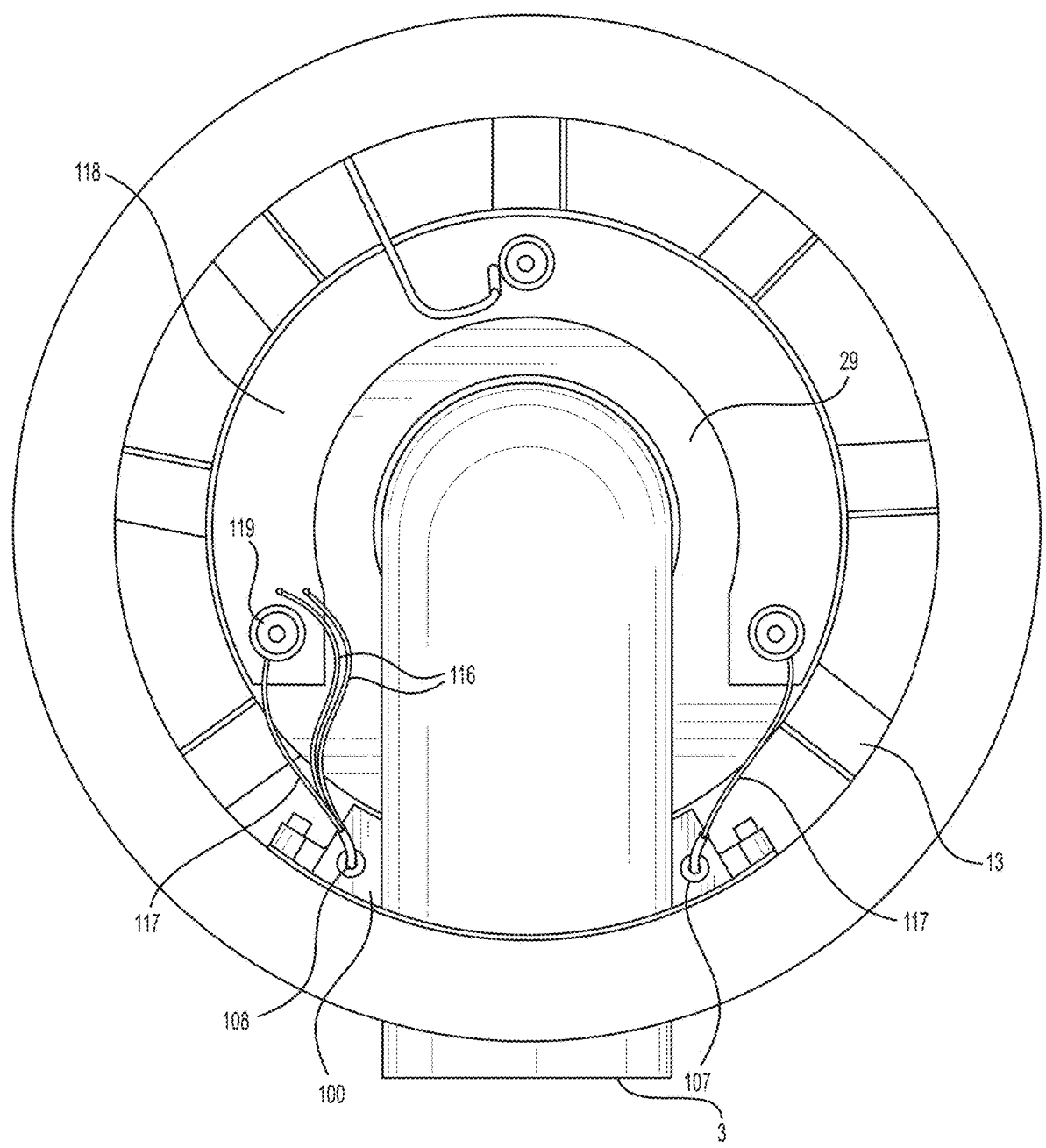
FIG. 22 is a first axial side view showing the inside of the portion of the precleaner housing with the RESPA control module and the RCM antenna board mounted.

The RESPA control module 100 communicates with and is connected to the RCM antenna board 118 disposed within the module housing and shown in FIGS. 18, 19 and 22. The microchip of the RESPA control module 100 can be powered through the power cable 14 and through the RCM antenna board 118, thus allowing recording and sending of data by the precleaner system without the need for any connected power source. As will be described further below, the RCM antenna board 118 provides power to the filter ID ring 200 as well by broadcasting an electrical field into the precleaner housing 11.

As seen in FIGS. 18 and 19, the RCM antenna board 118 may be made from a printed circuit board having solder points 119 for connecting the antenna wires 117 and the power lead wires 116 of the RESPA control module 100 to the RCM antenna board 118. The power cable 14 described above is shown in FIGS. 18 and 19 and may be a shielded four-lead wire designed to reduce electromagnetic emissions. The RCM antenna board 118 is additionally provided with power leads 120 and an antenna wire 24 made of, for example, copper. Power is provided to the RCM control module 100 from the power cable 14 through the power leads 120 and through the power lead wires 116. In other words, power is sent from the power cable 14, through the power leads 120, then through the power lead wires 116 to the RCM control module 100. Once the RCM control module 100 receives the power, the RCM control module 100 energizes the antenna wire 24 of the RCM antenna board 118, thereby causing the RCM antenna 118 to emit an electrical field as described below.

FIG. 22 is a view taken on a first axial side of the precleaner housing 11 along the longitudinal axis A-A. FIG. 22 shows the RCM antenna board 118 mounted in the precleaner housing 11. The RCM antenna board 118 may have a horseshoe shape, or substantially horseshoe shape, so as to be mounted on a surface of the manifold 12. In the mounted position seen in FIG. 22, the solder points 119 are positioned for connecting to the power lead wires 116 and the antenna wires 117 of the RESPA control module 100.

Figure 23:
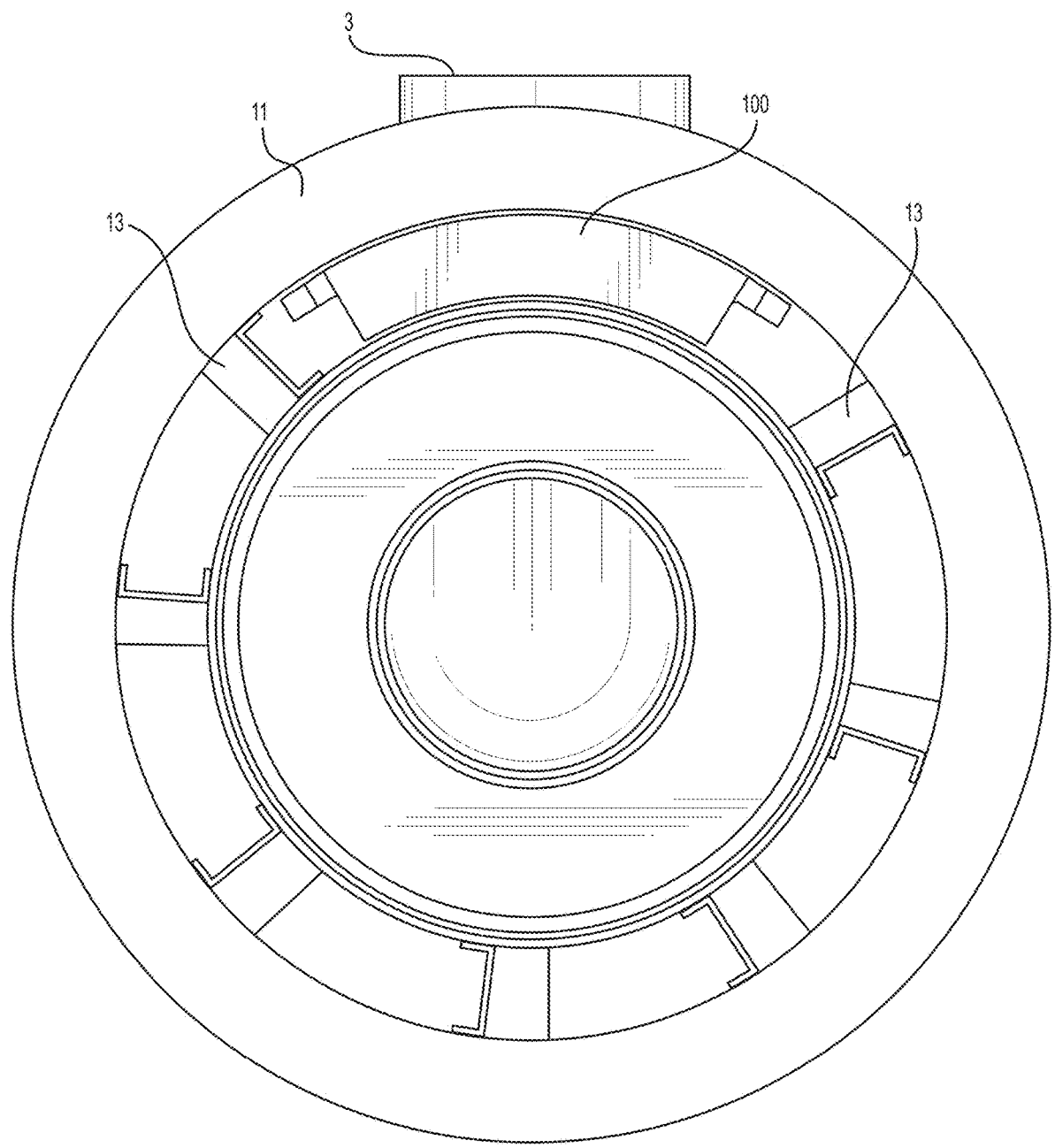
FIG. 23 is a second axial side view showing the inside of the portion of the precleaner housing with the RESPA control module mounted.

FIG. 23 is a view taken on a second axial side of the precleaner housing 11 along the longitudinal axis A-A. As seen in both FIGS. 22 and 23, the RESPA control module 100 is positioned inside the precleaner housing 11 between two of the stationary vanes 13 adjacent the outlet 3 of the air precleaner 1. The RCM antenna board 118 and the RESPA control module 100 are mounted to be positioned relative to each other, as shown in FIG. 22, such that the power lead wires 116 and the antenna wires 117 of the RESPA control module 100 may be connected to the solder points 119 of the RCM antenna board 118. In this way, the RCM antenna board 118 provides power (via the power lead wires 116) to, and also communicates (via the antenna wires 117) with, the RESPA control module 100.

As described above, the module housing 101 may include the module top 102 and the module base 103. The upper surface of the module top 102 may be shaped to match and fit the curve of the inner wall of the precleaner housing 11. The lower surface of the module base 103 may be shaped to match and fit the curve of the outer wall of the manifold 12. Thus, the RESPA control module 100 can be held within the precleaner housing 11 between two of the stationary vanes 13 by the stationary vanes 13, the outer wall of the manifold 12, and the inner wall of the precleaner housing 11. Of course, this is only one example of the shape the module housing 101 may take, and clearly the module housing 101 could have a different shape for mounting in a different orientation and position without inhibiting the functioning of the system.

Additionally, one or more antenna risers 122 may be provided between the RCM antenna board 118 and the manifold 12. The antenna riser 122 may be made of various materials, including but not limited to polylactic acid (PLA) rapid prototype plastic and injection-molded polypropylene. The antenna riser 122 acts as a spacer between the RCM antenna board 118 and the manifold 12. In addition, one or more antenna spacers 123 may be provided between the RCM antenna board 118 and the shroud 29. The antenna spacer 123 may be made of various materials, including but not limited to polylactic acid (PLA) rapid prototype plastic and injection-molded polypropylene. The antenna spacer 123 acts as a spacer between the RCM antenna board 118 and the shroud 29 and presses down on the RCM antenna board 118 to hold the RCM antenna board 118 in place. Thus, the antenna riser 122 and the antenna spacer 123 are positioned on opposite axial sides of the RCM antenna board 118.

As described above, the first, second and third pressure sensors 113, 115, 114 are positioned inside each respective compartment of the module housing 101 so as to accurately detect the pressure and other parameters of the airflow to which the sensors 113, 115 and 114 are designated, as shown in FIGS. 14 and 16. Specifically, the first pressure sensor 113 is positioned in the first compartment 109 to receive and monitor the pressure and other parameters of the ambient airflow. The second pressure sensor 115 is positioned in the third compartment 111 to receive and monitor the pressure and other parameters of the airflow inside the precleaner housing 11. The third pressure sensor 114 is positioned in the second compartment 110 to receive and monitor the pressure and other parameters of the airflow at the outlet 3 of the air precleaner 1.

These three pressure sensors 113, 115 and 114 provide real-time data regarding the temperature differential and pressure differential between the inlet 2 and the outlet 3 of the precleaner housing 11. This data allows for improvements in various areas such as power, fuel economy, and HVAC efficiency. Moreover, the pressure sensors 113, 115 and 114 allow for the airflow and other parameters to be continuously measured and output as data from the RESPA control module 100 to various connected devices, including the advisor module 300 (described below).

Figure 47:
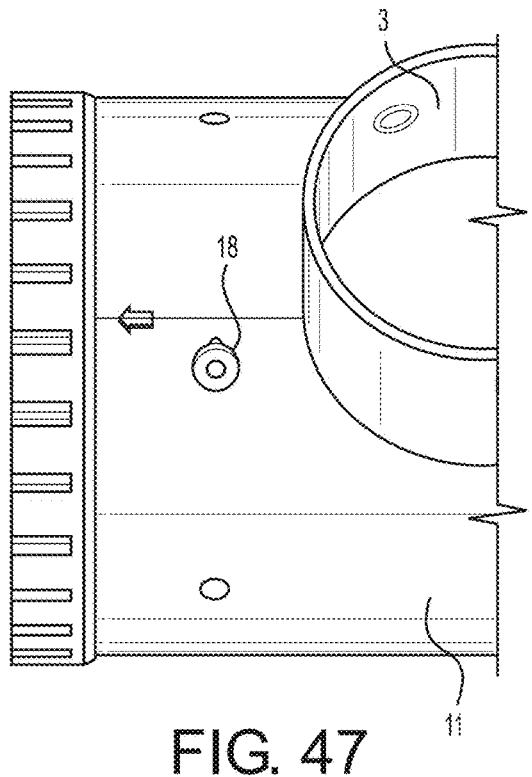
FIG. 47 is a view of a tube hole formed in the portion of the precleaner housing.
Figure 48:
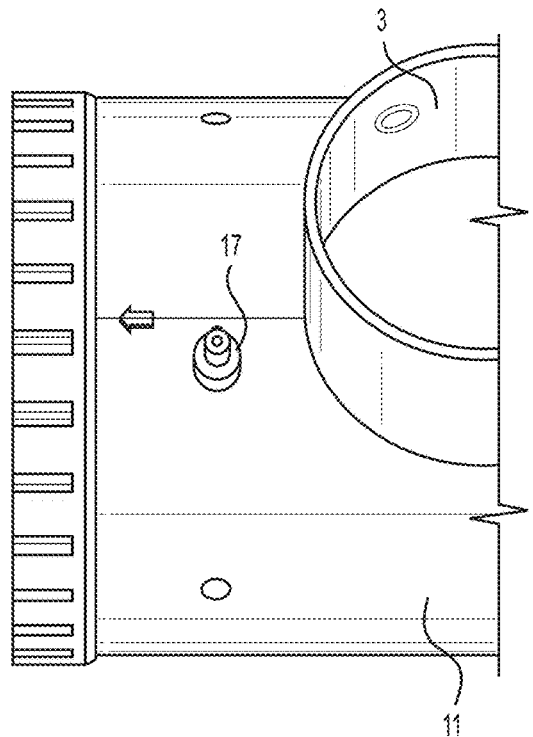
FIG. 48 is a view of an ambient pressure ventilation tube installed in the tube hole.
Figure 49:
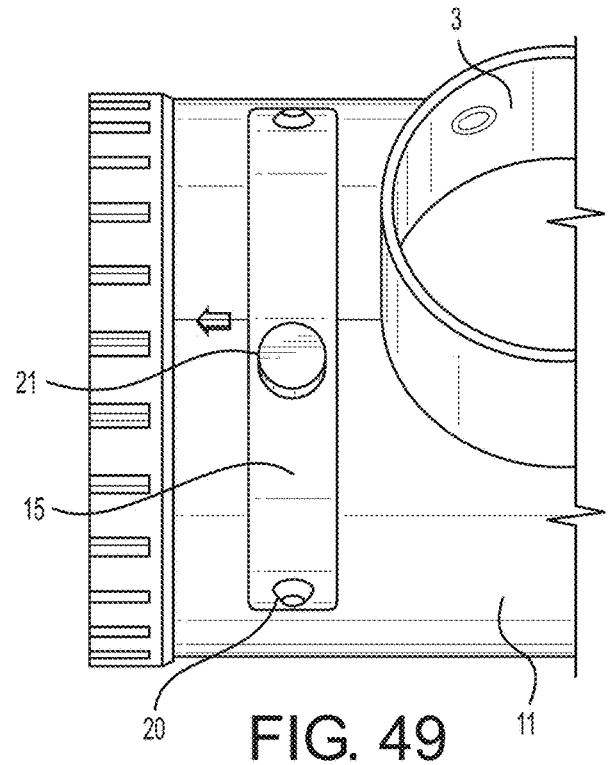
FIG. 49 is a view of a pressure ventilation tube rain cap installed over the ambient pressure ventilation tube.
Figure 50:
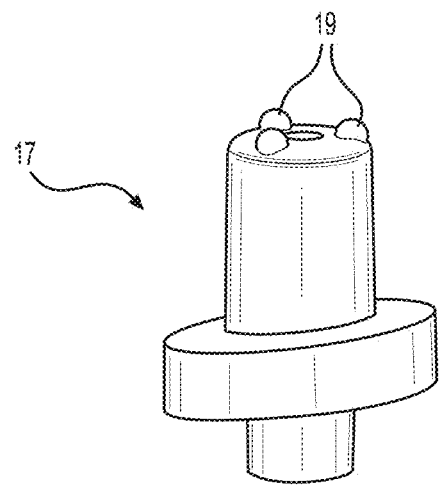
FIG. 50 is a perspective view of the ambient pressure ventilation tube.
Figure 51:
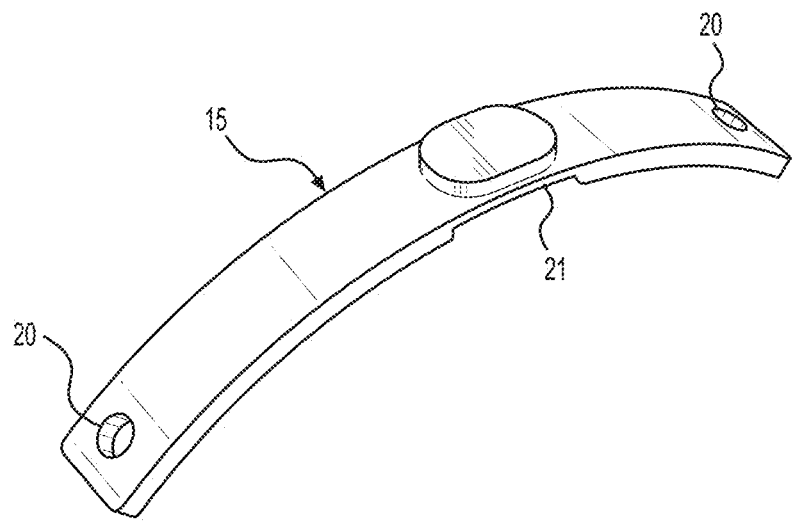
FIG. 51 is a perspective view of the pressure ventilation tube rain cap.

As described above, the first pressure sensor 113 disposed in the first compartment 109 communicates with the ambient air via the first hole 104. To facilitate this communication, the ambient pressure ventilation tube 17 (shown in FIG. 50) is inserted through the precleaner housing 11 via a tube hole 18 seen in FIGS. 47 and 48. A first end of the ambient pressure ventilation tube 17 protrudes from the precleaner housing 11, as seen in FIG. 48. A second opposite end of the ambient pressure ventilation tube 17 fits into the first hole 104. The pressure ventilation tube rain cap 15, shown in FIG. 51, is provided to cover the ambient pressure ventilation tube 17, as seen in FIG. 49. The pressure ventilation tube rain cap 15 has two attachment holes 20 for securing the pressure ventilation tube rain cap 15 to the precleaner housing 11 with, for example, fasteners. The pressure ventilation tube rain cap 15 is further provided with a raised section 21 arranged to rest atop the ambient pressure ventilation tube 17 without disrupting the pressure readings of the first pressure sensor 113. The raised section 21 allows water to flow under the raised section 21 and over the ambient pressure ventilation tube 17 without clogging the ambient pressure ventilation tube 17. In addition, as seen in FIG. 50, the ambient pressure ventilation tube 17 has one or more tube protrusions 19 formed at the first end of the ambient pressure ventilation tube 17 that protrudes from the precleaner housing 11. The tube protrusions 19 contact the raised section 21 of the pressure ventilation tube rain cap 15 so as to prevent the pressure ventilation tube rain cap 15 from sealing the ambient pressure ventilation tube 17, thereby avoiding the situation in which sealing of the ambient pressure ventilation tube 17 would result in the pressure failing to equalize between the ambient air and the air inside the precleaner housing 11.

In addition, the RESPA control module 100 may be configured to set up a local area network (LAN) to communicate with the motor and/or the air filter 7 of the air precleaner 1. An IP address may be assigned to the RESPA control module 100 so that the RESPA control module 100 can be accessed through a local wide area network (WAN).

Furthermore, the RESPA control module 100 may be accessed by a user terminal, such as a cellular phone application, to read the data obtained by the RESPA control module 100.

The RESPA control module 100 serves various functions, including providing power to the filter ID ring 200, logging data into the filter ID ring 200, reading data stored on the filter ID ring 200, sensing pressure and other airflow parameters, and relaying all of this data to the advisor module 300. The RESPA control module 100 regulates and controls all parameters of the air filter 7 and intake system, and communicates with the advisor module 300 to provide data and receive instructions. These functions will be described in greater detail below.

Figure 63:
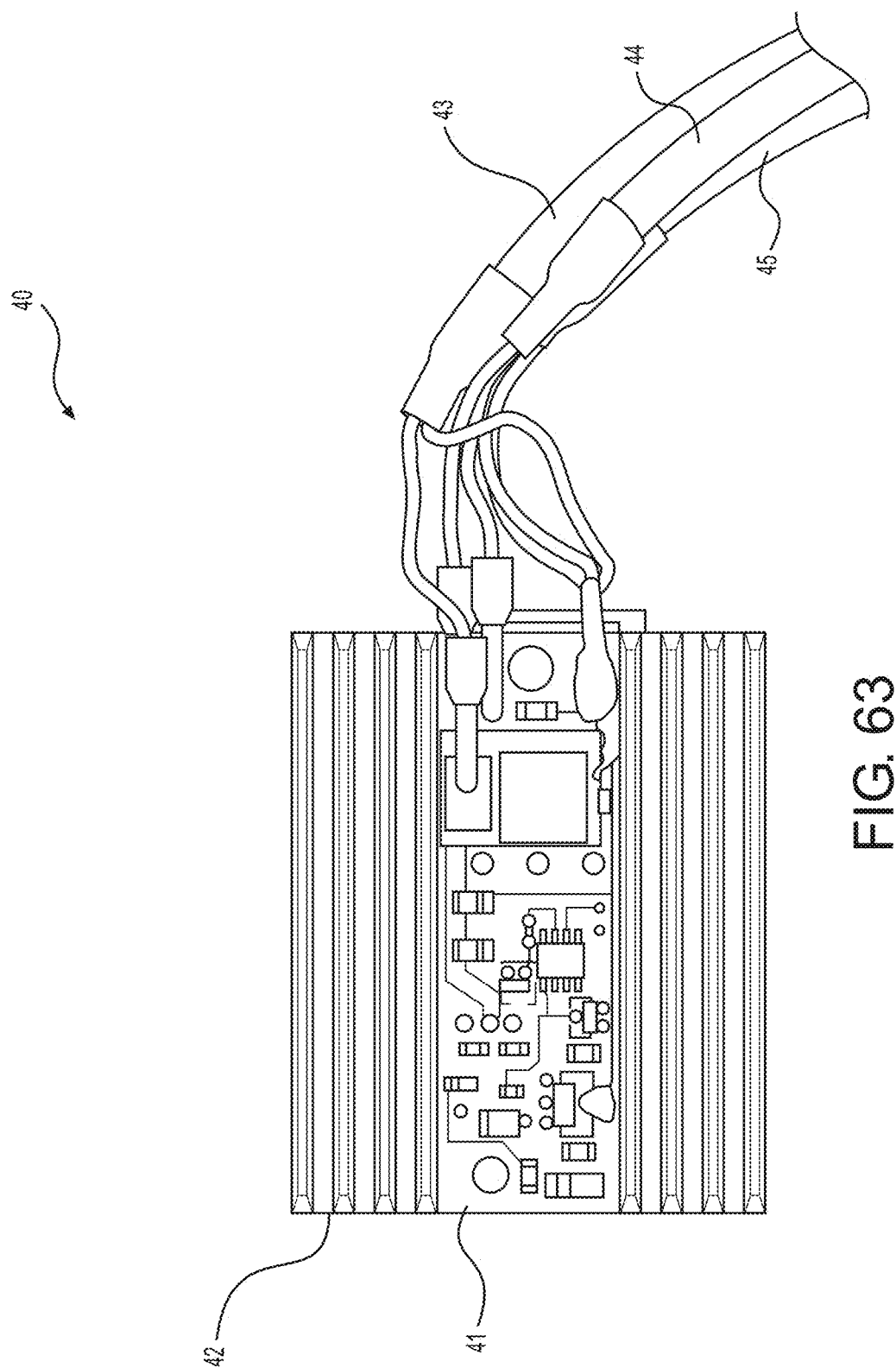
FIG. 63 is a top view of a motor control module.

The air quality monitoring and control system may further include a motor control module 40 as shown in FIG. 63. The motor control module 40 includes a circuit board 41 housed in a casing 42. The circuit board 41 includes resistors, diodes, capacitors, and regulators which relay voltage data to the RESPA control module 100 and prevent over-voltage in the motor 28. The casing 42 may be a heat sink. Three power leads are connected to the circuit board 41. Specifically, a power lead 43 connects the circuit board 41 to the cab operated by the operator, a power lead 44 connects the circuit board 41 to the motor 28, and a power lead 45 connects the circuit board 41 to the RESPA control module 100. The motor control module 40 has various advantageous capabilities, including EMI and EMF suppression via filters provided on the circuit board 41, motor over-voltage protection, motor speed control, motor voltage regulation, and data transfer to the RESPA control module 100 for data logging and external communication to the advisor module 300. The motor control module 40 may send and receive data to and from the RESPA control module 100, and to and from the fan motor 28. The motor control module 40 may determine the temperature of the fan motor 28 of the air precleaner 1 by monitoring motor voltage. When the motor voltage is excessively high or low, or when an unsuitable filter is being used, the motor control module 40 may be configured to turn off the motor 28. Also, the motor control module 40 may turn off the motor 28 or adjust the speed of the motor 28 in response to instructions from the RESPA control module 100. The motor control module 40 may automatically control the motor 28 or may control the motor 28 based on commands received from the RESPA control module 100.

The motor control module 40 may vary the motor speed based upon the needs of the cabin or engine to increase pressure or overcome a pressure drop on the filter 7.

The motor control module 40 may connect to the motor 28 directly to read and record the voltage running through the motor 28. The motor control module 40 may be programmed to turn the fan motor 28 off when there is over- or undervoltage, or when the motor 28 reaches a higher temperature, such as 70° C. The motor control module 40 may then turn the motor 28 on again when the motor 28 drops to a lower temperature, such as 50° C.

When programmed operating parameters are violated, the RESPA control module 100 may cause an alarm message to be sent to the advisor module 300. Alternatively or additionally, the data that is continuously streaming from the RESPA control module 100 and other sensors to the advisor module 300 may be analyzed by the advisor module 300, in response to which the advisor module 300 may make the determination to sound an alarm.

Figure 53:
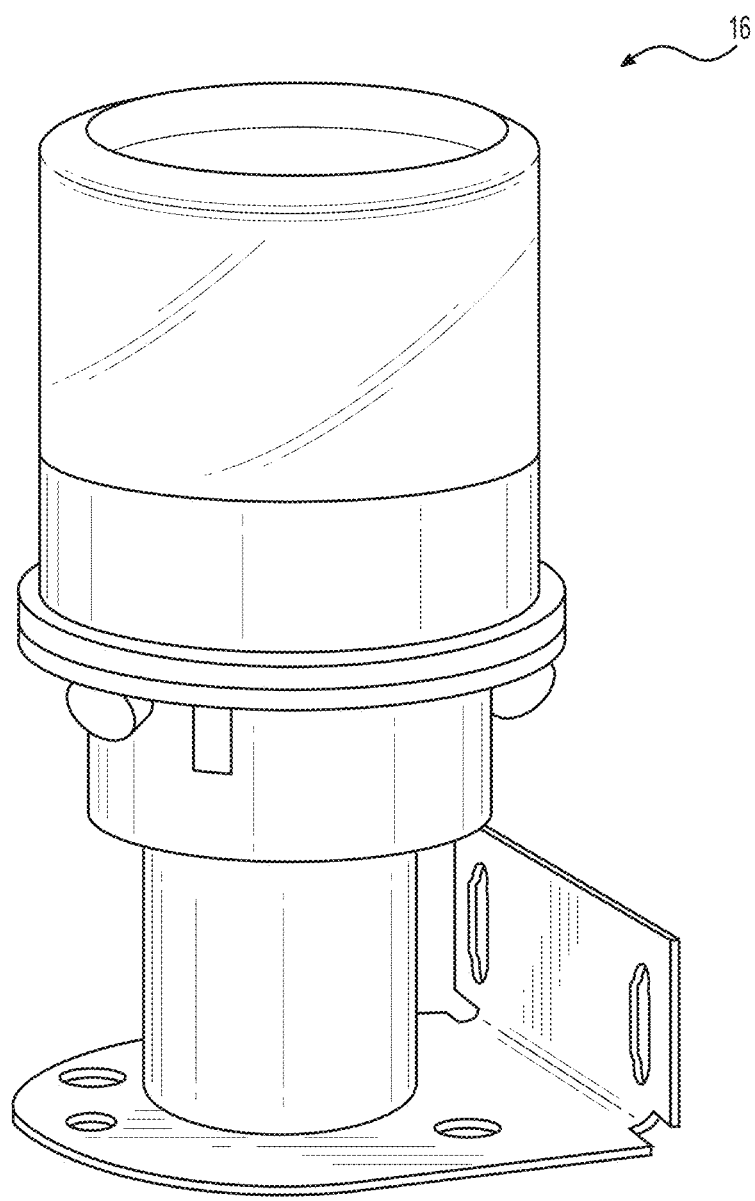
FIG. 53 is a perspective view of an operating condition lamp.

Alarm modes include but are not limited to visual, audible and/or haptic alarms from the advisor module 300 to the operator, a signal light on the top of the cab, and a text message or email sent to an appropriate person or system to notify of the alarm condition. As one example of the signal light, FIG. 53 shows an operating condition lamp 16. The operating condition lamp 16 may be an automatic three-color LED lamp controlled by the advisor module 300 using a suitable communication means such as WiFi. For example, the operating condition lamp 16 can notify the operator of an alarm condition using red light, a warning condition using yellow light, and a safe condition using green light.

The RESPA control module 100 is configured to communicate with multiple sensors in the system. Specifically, the RESPA control module 100 may communicate with up to 255 sensors simultaneously.

Also, the RESPA control module 100 may be programmed from the advisor module 300 or through another control means, such as a cellular phone application. The RESPA control module 100 may operate as a slave to the advisor module 300 or independently of the advisor module 300. The RESPA control module 100 may operate independently of all devices including the advisor module 300.

The RESPA control module 100 may be configured to automatically sync with the advisor module 300, the filter ID ring 200, the brushless motor 28, and/or a cellular phone application.

The RESPA control module 100 is configured to communicate continuously with the advisor module 300 to provide data such as the type of filter 7 being used, the pressure drop on the filter 7 (determining when the filter 7 needs to be changed), and the airflow into the cabin using the outlet diameter, outlet pressure, and the "K" Factor to continuously calculate outlet airflow.

(3) Description of Filter ID Ring

Figure 24:
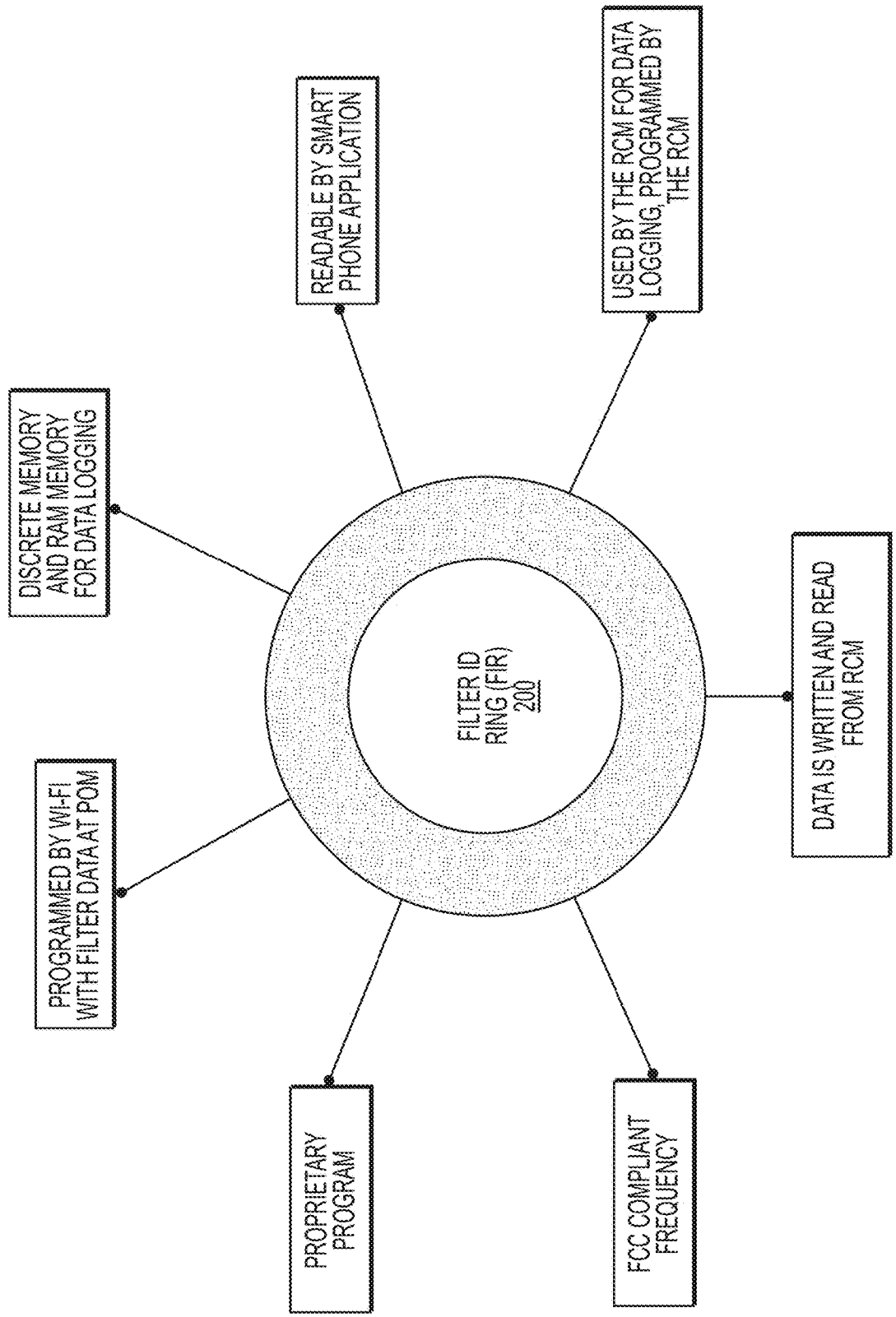
FIG. 24 is a diagram showing various functions and connections of a filter ID ring.

The filter ID ring 200 (also called "filter identification component") is an inert filter ring having a specific shape to fit to the outer circumference of the air filter 7. The circular configuration allows the filter 7 to be mounted within the precleaner housing 11 in any orientation and still achieve the same level of functionality. The filter ID ring 200 is configured to communicate with the RESPA control module 100. FIG. 24 shows various functions and connections of the filter ID ring 200. Of course, it will be understood that the functions and connections of the filter ID ring 200 are not limited to those shown in FIG. 24. The filter ID ring 200 is not limited to the shape of a ring and may be provided in other shapes and configurations. For example, in an alternative embodiment, the filter ID ring 200 may be provided as a computer chip directly mounted into the filter 7. In yet another alternative embodiment, the filter ID ring 200 may be integrated (embedded) in the body of the filter 7 at the point of manufacture (POM) of the filter 7. The following discussion will focus on the embodiment of the ring-shaped filter ID ring 200.

The filter ID ring 200 may be attached (e.g., glued or molded) to the air filter 7 such that, when the air filter 7 is mounted inside the precleaner housing 11, the filter ID ring 200 is sufficiently close to the RESPA control module 100 to receive the appropriate frequency for the RCM antenna board 118 to provide the filter ID ring 200 with power to operate and communicate. In other words, the filter ID ring 200 may be powered by an electrical field broadcast by the RCM antenna board 118 into precleaner housing 11. Communication may also occur via this electrical field. In the absence of the RESPA control module 100 and the RCM antenna board 118, the filter ID ring 200 is inert.

One exemplary embodiment of the filter ID ring 200 is shown in FIG. 25. The filter ID ring 200 is formed of an antenna wire 201 and a printed circuit board 202 having two solder pads 203. The antenna wire 201 may be, for example, a copper wire enclosed by an antenna wire cover 205 made of, for example, polypropylene. A first end of the antenna wire 201 is connected to the printed circuit board 202 at one of the solder pads 203, while a second end of the antenna wire 201 is connected to the printed circuit board 202 at the other of the solder pads 203. The printed circuit board 202 may additionally include an RFID chip 204 and one or more resistors and capacitors. The RFID chip 204 has a memory which stores information about the air filter 7 to which the filter ID ring 200 is attached. The memory may include discrete memory and/or RAM memory, with the amount of memory being customizable. The filter ID ring 200 stores manufacturing information such as the serial number, manufacture date, usage, and part number of the air filter 7. The filter ID ring 200 may be programmed wirelessly with filter data at the point of manufacture.

Figure 28:
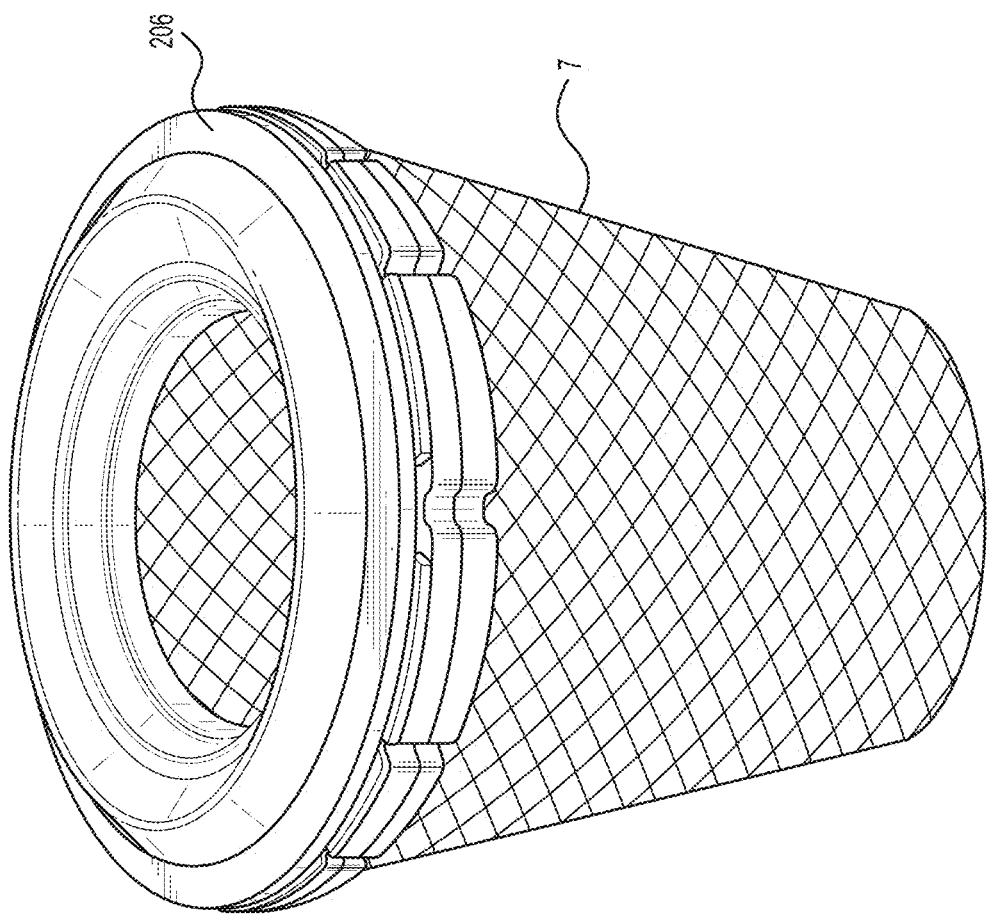
FIG. 28 is a perspective view showing a filter with the molded ring body and filter ID ring mounted thereto.

The filter ID ring 200 may be directly attached to the air filter 7 such that the filter ID ring 200 wraps around the circumference of the air filter 7. Alternatively, as shown in FIGS. 26 and 27, the filter ID ring 200 may be encased in a molded ring body 206. The filter ID ring 200 may be wrapped in one or more loops within the molded ring body 206, depending on the required frequency and power. In other words, different numbers of loops will provide different frequencies and power. FIG. 26 shows a front surface of the molded ring body 206 on which the filter ID ring 200 is mounted, and FIG. 27 shows the front surface of the molded ring body 206 without the filter ID ring 200 mounted thereto. The molded ring body 206 may be formed by, for example, plastic polypropylene injection. The molded ring body 206 is provided with one or more grooves 207 which tightly grip the antenna wire cover 205 and the printed circuit board 202. The molded ring body 206 having the filter ID ring 200 mounted therein is configured to be directly attached to the air filter 7 such that the molded ring body 206 wraps around the circumference of the air filter 7, as shown in FIG. 28. A rear surface and a side surface of the molded ring body 206 are seen in FIG. 28, such that the antenna wire 201 is facing downward in FIG. 28. Alternatively, the molded ring body 206 may be flipped such that the antenna wire 201 is facing upward in FIG. 28, with an additional cover member (not shown) covering the front surface of the molded ring body 206.

Figure 29:
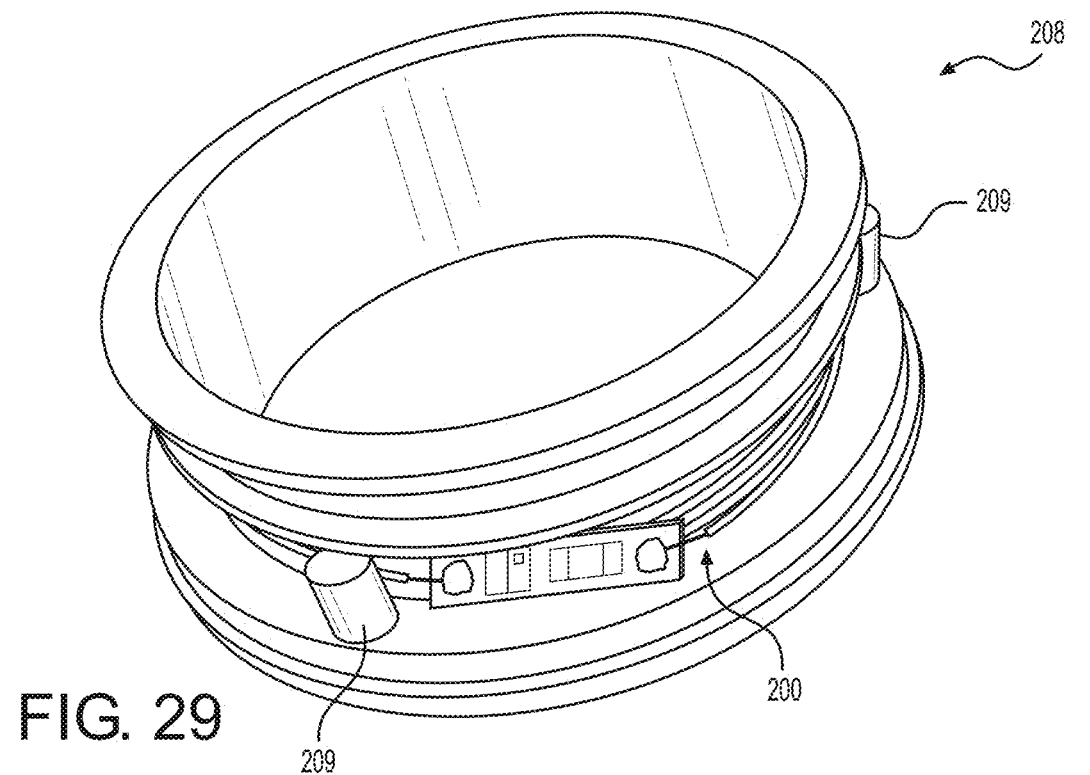
FIG. 29 is a perspective view showing another modified embodiment with the filter ID ring in a ring housing.
Figure 30:
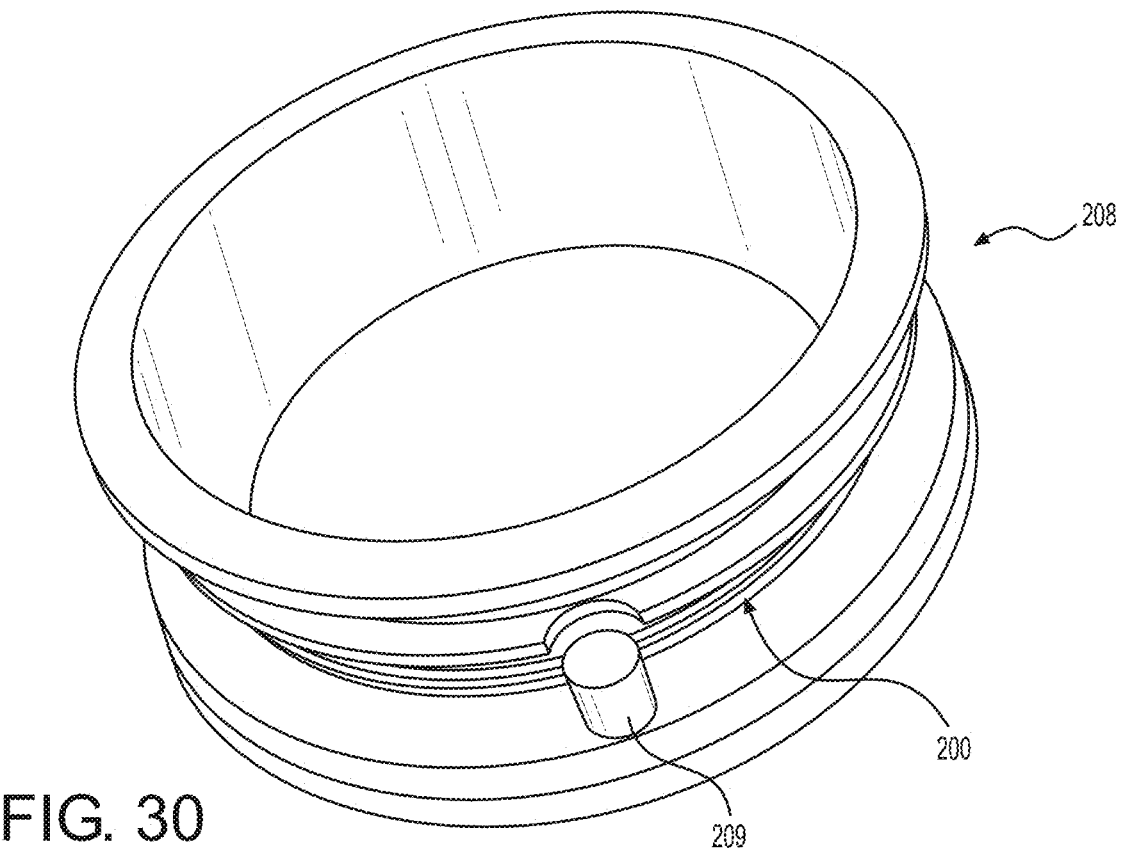
FIG. 30 is a perspective view showing the filter ID ring in the ring housing rotated from the position shown in FIG. 29.

As an alternative to the molded ring body 206, the filter ID ring 200 may be housed in a ring housing 208 as shown in FIGS. 29 and 30. The ring housing 208 may be, for example, prototype polylactic acid plastic or polypropylene injection molded. The ring housing 208 is shaped to fit into the throat of the filter cap of the air filter 7. As seen in FIGS. 29 and 30, the filter ID ring 200 is wrapped around the ring housing 208 and is secured by a plurality of restraining posts 209. The filter ID ring 200 may be wrapped in one or more loops around the ring housing 208, depending on the required frequency and power. In the example shown in FIGS. 29 and 30, the ring housing 208 has three restraining posts 209, but the number of restraining posts 209 may be more or less than three. The restraining posts 209 are arranged and configured to restrain the filter ID ring 200 such that wire tension of the antenna wire 201 is maintained.

The filter ID ring 200 may be mounted within the precleaner housing in any orientation as long as the filter ID ring 200 is mounted at a location sufficiently proximate to the RESPA control module 100 such that the RCM antenna board 118 and the antenna wire 201 are continuously communicating with each other through the electrical field broadcast by the RCM antenna board 118. The specific orientation of the filter ID ring 200 relative to the RESPA control module 100 within the precleaner housing 11 ensures efficient communication between the filter ID ring 200 and the RESPA control module 100. The antenna wire 201 is tuned to the frequency of the antenna wire 124 of the RCM antenna board 118 to allow for communication between the RESPA control module 100 and the filter ID ring 200 inside the precleaner housing 11. The electrical field is broadcast by the RCM antenna board 118 into the precleaner housing 11, and the antenna wire 201 of the filter ID ring 200 picks of the electrical field and directs the energy to the RFID chip 204 of the filter ID ring 200. As a result, power can be provided from the RESPA control module 100 (the RCM antenna board 118) to the filter ID ring 200, data can be logged into the filter ID ring 200 from the RESPA control module 100, and data stored on the filter ID ring 200 can be read by the RESPA control module 100. Energizing of the RFID chip 204 of the filter ID ring 200 is continuous as long as the RFID chip 204 is disposed within the energy field created within the precleaner housing 11 by the RCM antenna board 118.

Additionally, during operation the RESPA control module 100 may continuously read and write data from and to the filter ID ring 200. Two-way communication between the RESPA control module 100 and the filter ID ring 200 allows for continuous data storage and retrieval. As discussed above, the RESPA control module 100 may communicate with the filter ID ring 200 using the electrical field created by the RCM antenna board 118. The electrical field provides electrical current to the filter ID ring 200, and also allows for the two-way communication between the RESPA control module 100 and the filter ID ring 200.

The RESPA control module 100 continuously logs data to the filter ID ring 200. This data may include, but is not limited to, one or more of filter pressure, ambient pressure, outlet airflow, motor voltage and temperature, ambient temperature and humidity, precleaner housing temperature and humidity, and precleaner housing outlet temperature and humidity.

The filter ID ring 200 may permanently record and continuously update the usage of the air filter 7 and notify the advisor module 300 when the air filter 7 has reached the end of its life (e.g., the air filter 7 has been used for a predetermined number of hours, or the air filter 7 has become too restrictive). The filter ID ring 200 effectively results in a self-aware filter 7 that self-records and permanently stores all significant events and data points during the life of the filter 7. As a result, there is no need for physically inspecting the filter 7 to determine the real-time status of the filter 7.

The filter ID ring 200 may also be accessed by a user terminal, such as a cellular phone application, to read the data stored in the filter ID ring 200.

(4) Description of Advisor Module

Figure 31:
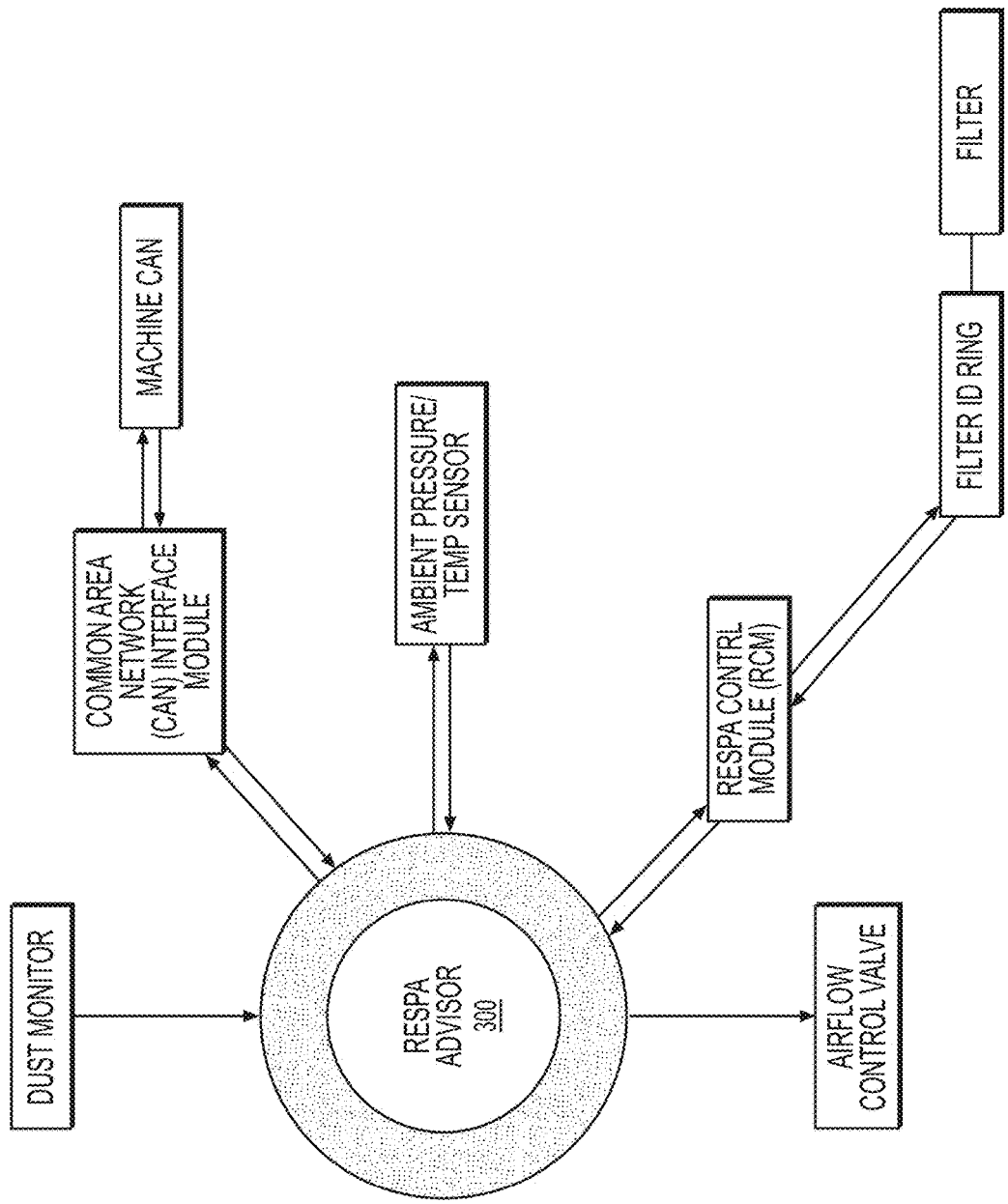
FIG. 31 is a diagram showing various functions and connections of an advisor module.

The advisor module 300 (also called "RESPA® Advisor") may be a wireless device that uses a radio signal to communicate with the RESPA control module 100, which in turn is communicating with the filter ID ring 200. The advisor module 300 may have both radio and cellular communication capabilities. The advisor module 300 may also piggyback on local WiFi networks without logging into the networks. FIG. 31 shows various functions and connections of the advisor module 300. Of course, it will be understood that the functions and connections of the advisor module 300 are not limited to those shown in FIG. 31.

Figure 32:
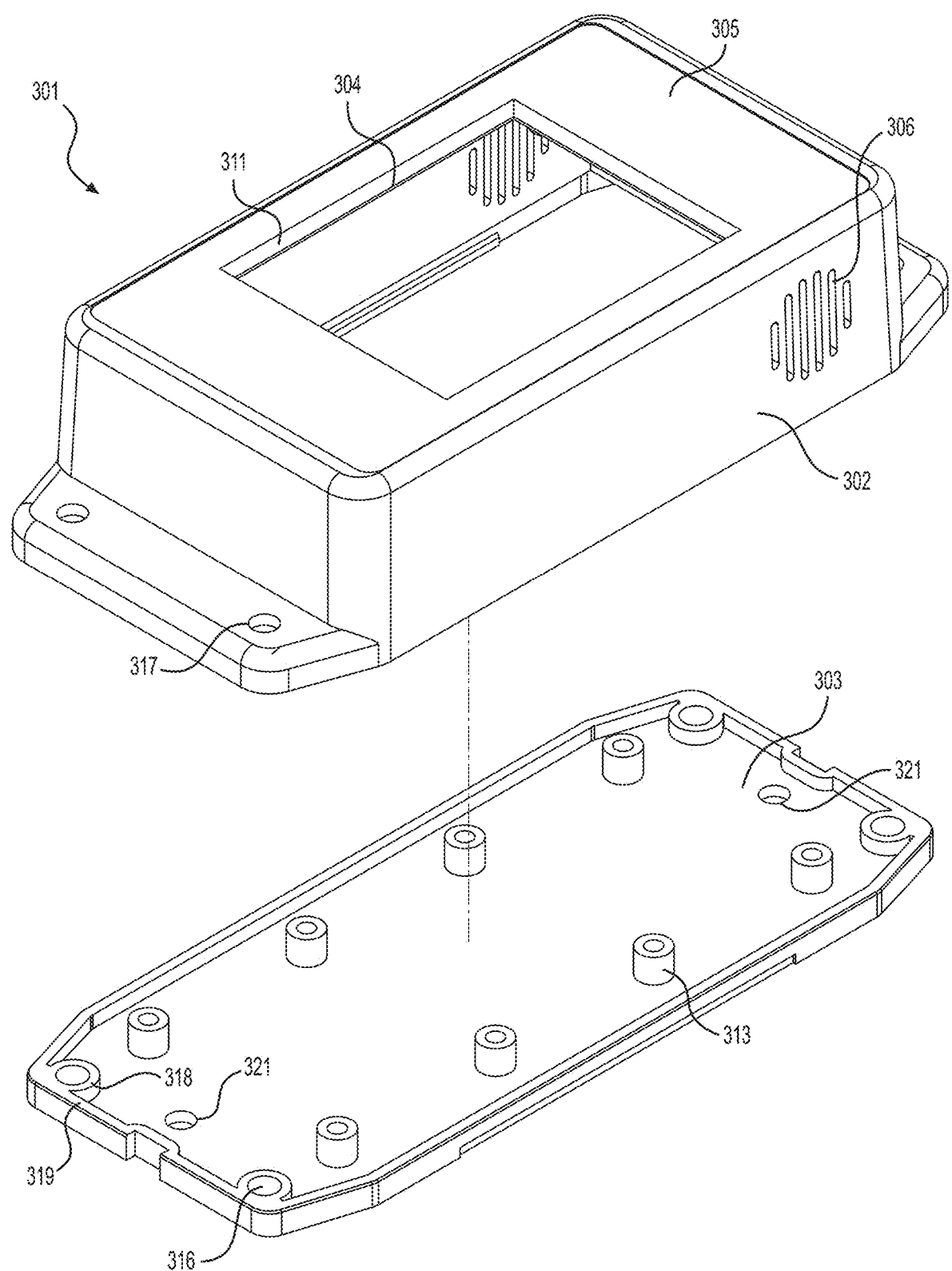
FIG. 32 is a top perspective view showing an advisor housing.
Figure 33A:
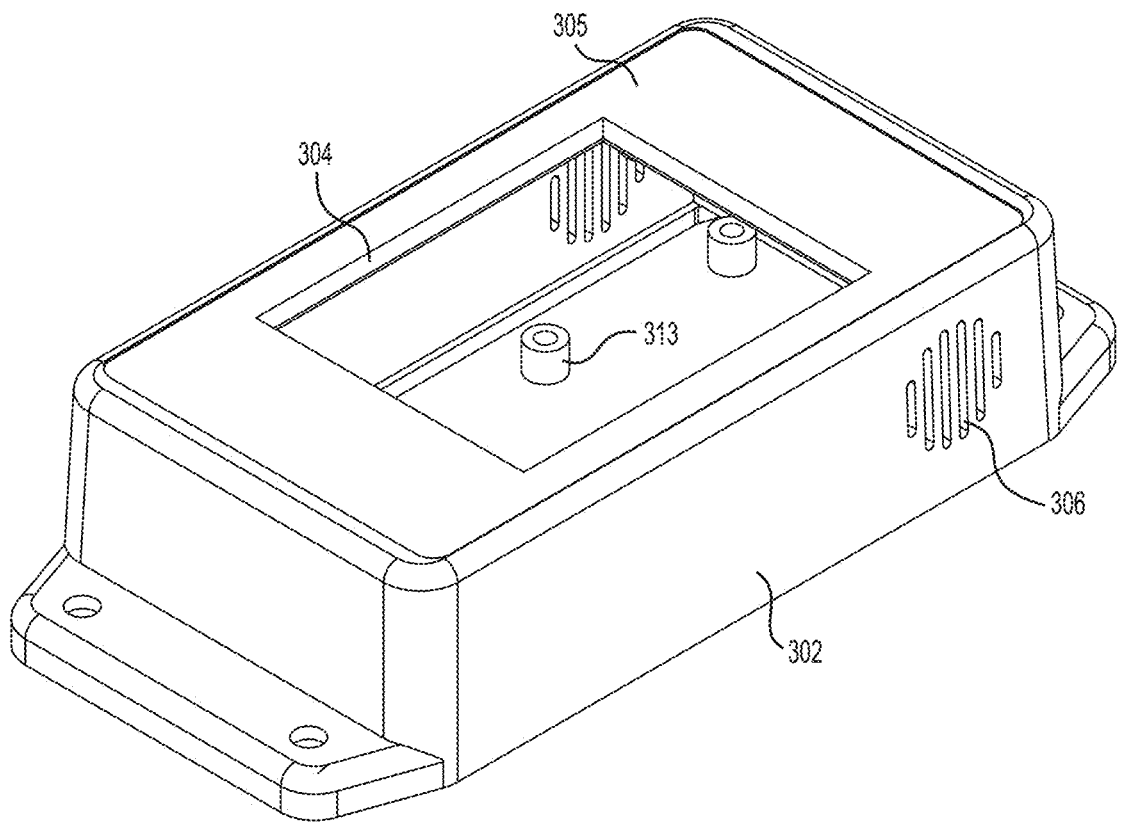
FIGS. 33A and 33B are additional views showing the advisor housing.
Figure 33B:
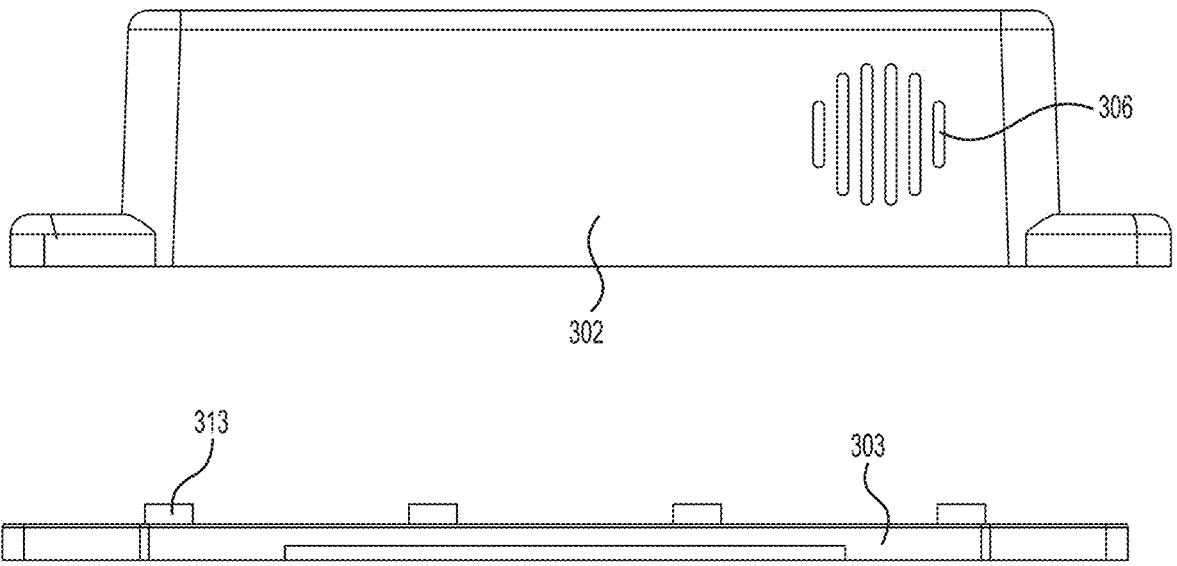

FIGS. 32 to 38 provide various views of the components of the advisor module 300. As seen in FIG. 32, the advisor module 300 is provided with an advisor housing 301. The advisor housing 301 may be formed of, for example, injection-molded acrylonitrile butadiene styrene (ABS) plastic. The advisor housing 301 includes an advisor top 302 and an advisor base 303. The advisor top 302 and the advisor base 303 are assembled by a snap-together configuration. The snap-together configuration is formed by two snap holes 321 formed in the advisor base 303 and two snap posts 322 formed in the advisor top 302.

Figure 34:
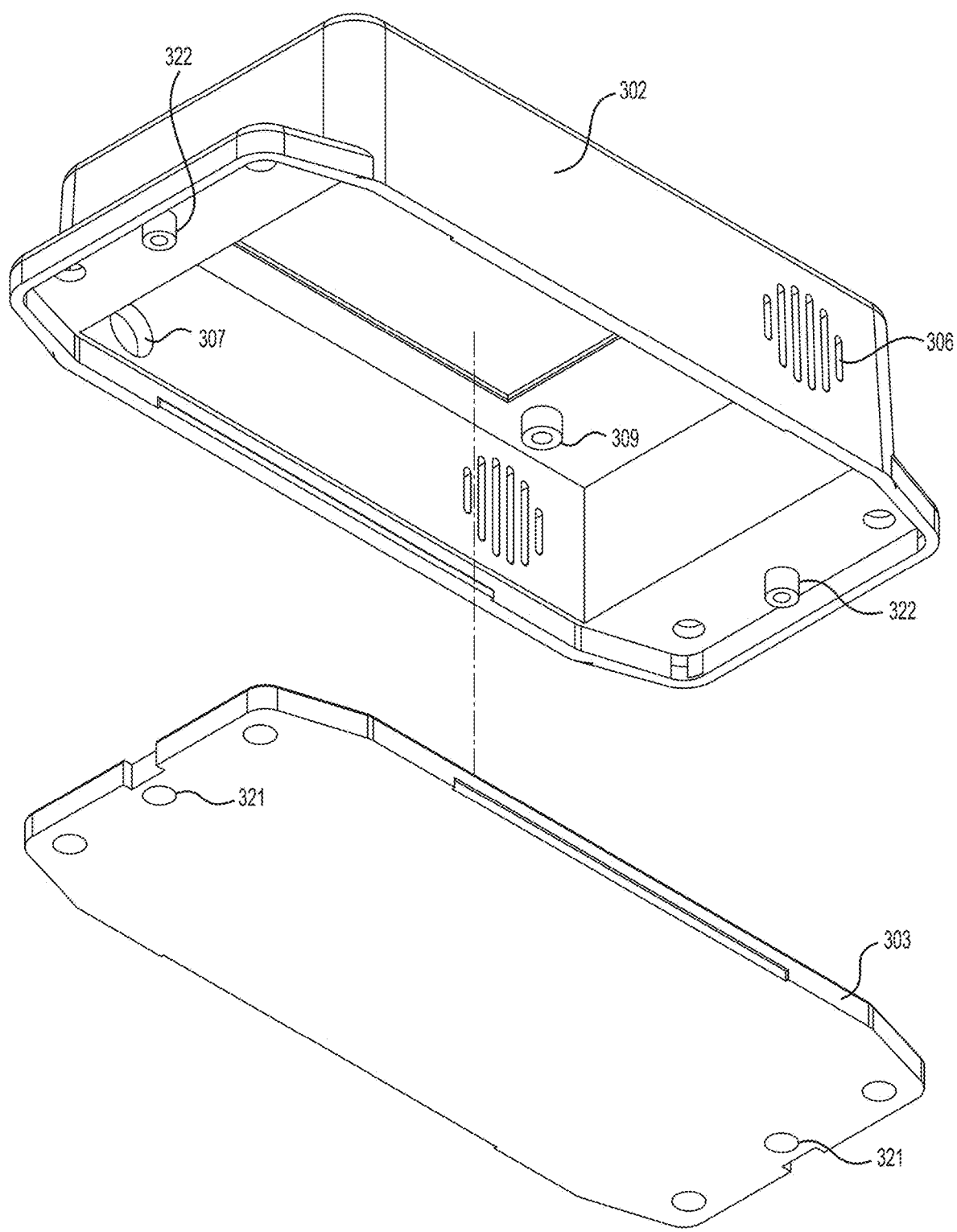
FIG. 34 is a bottom perspective view showing the advisor housing.
Figure 37:
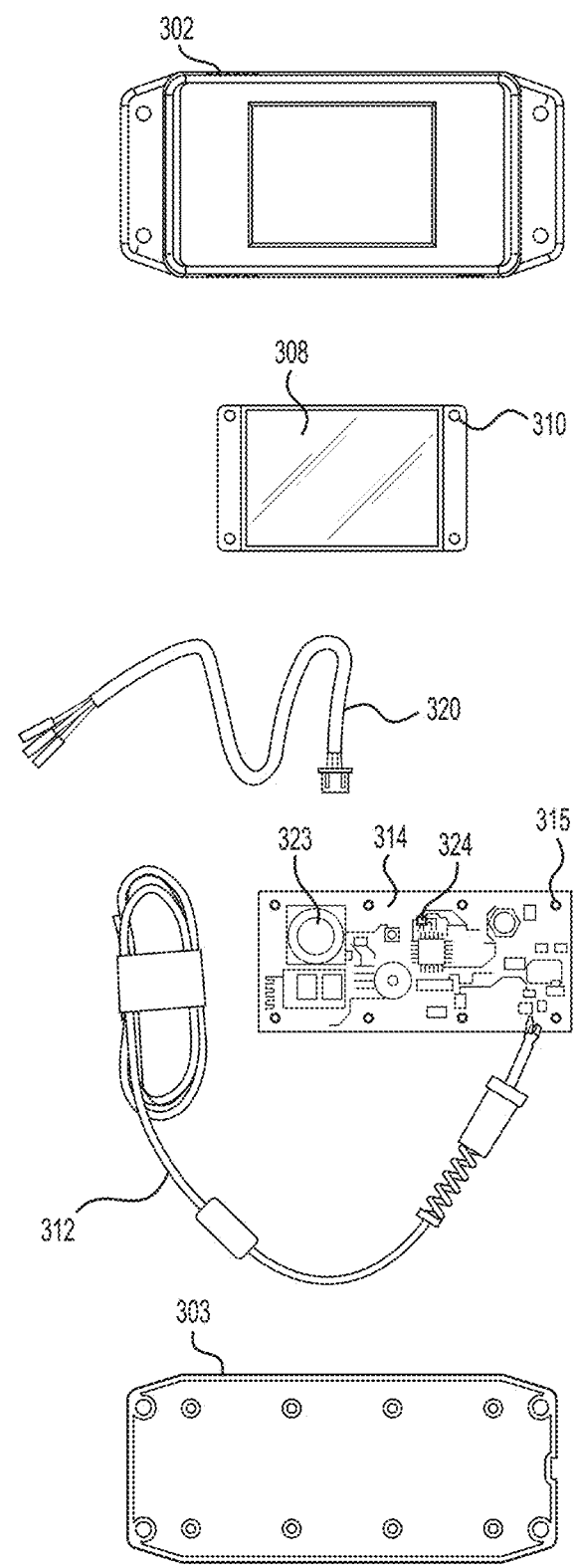
FIG. 37 is a view of the components forming the advisor module including a front view of the printed circuit board of the advisor module.

The advisor top 302 includes a display screen mounting portion 304, a recessed portion 305, one or more air vents 306, and a power cable hole 307. The display screen mounting portion 304 is configured to hold a display screen 308 which may be, for example, a touch screen by which a user may operate the advisor module 300. FIG. 37 shows an example of the display screen 308. The display screen mounting portion 304 further has a chamfered area 311 to allow access to the outer areas of the display screen 308. As seen in FIG. 34, the advisor top 302 has display mounting posts 309 formed on an inner surface of the advisor top 302. Although only the one display mounting post 309 is seen in FIG. 34, the advisor top 302 has four display mounting posts 309 arranged around the display screen mounting portion 304, the four display mounting posts 309 corresponding to four display screen holes 310 shown in FIG. 37.

The recessed portion 305 is recessed from the upper-most outer periphery of the advisor top 302 so as to provide an area for mounting, for example, a sticker or other indicia. The one or more air vents 306 may be provided on one or more sides of the advisor top 302. The air vents 306 ensure proper functioning of a multi-gas sensor 323 (discussed below). The power cable hole 307, shown in FIGS. 34 and 36C, allows a power cable 312 to pass therethrough to provide power to the advisor module 300. The power cable 312 extends from the advisor module as seen in FIGS. 36A and 36B. The power cable 312 may be a shielded four-lead wire designed to reduce electromagnetic emissions.

Figure 38:
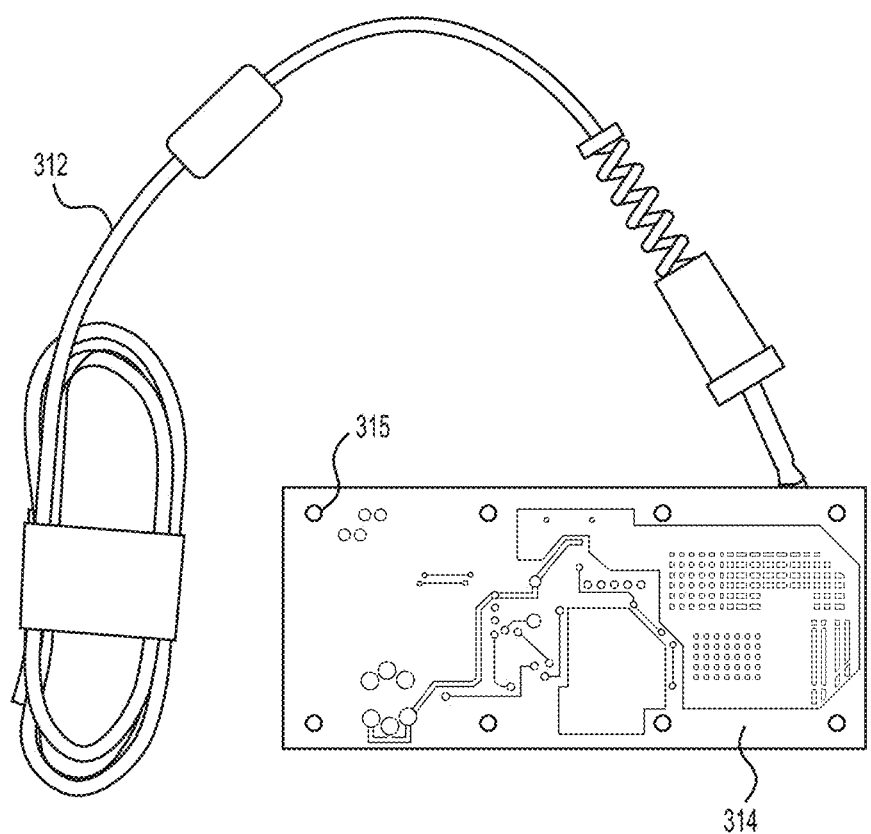
FIG. 38 is a rear view of the printed circuit board of the advisor module.
Figure 39A:
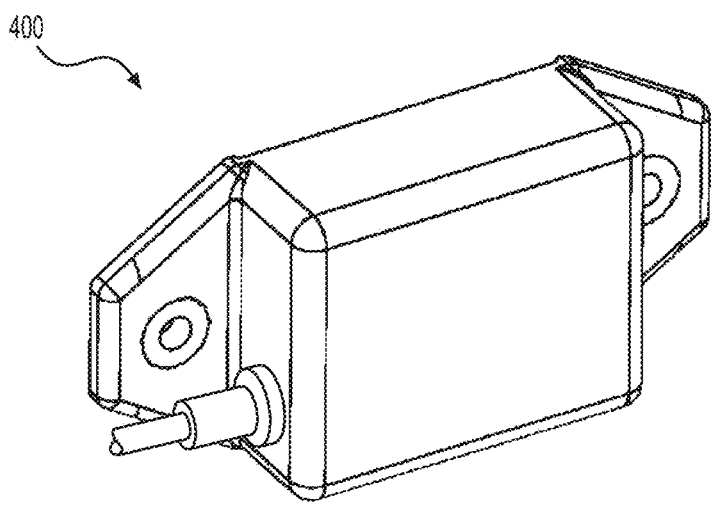
FIGS. 39A to 39C are views showing an ambient pressure sensor (APS).
Figure 39B:
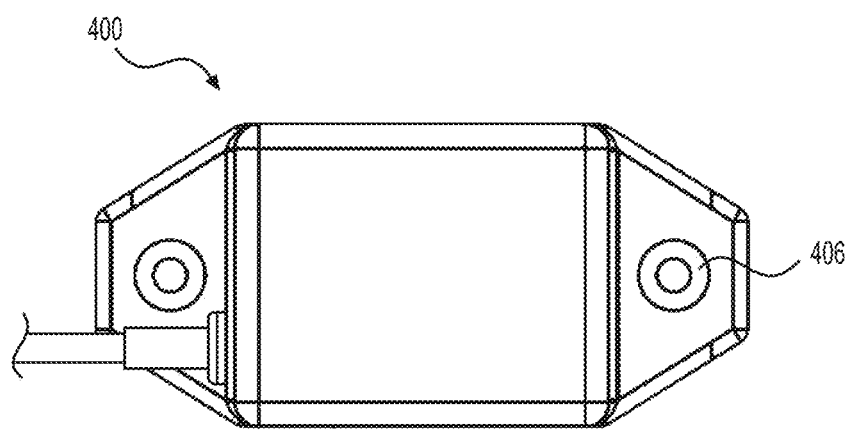
Figure 39C:
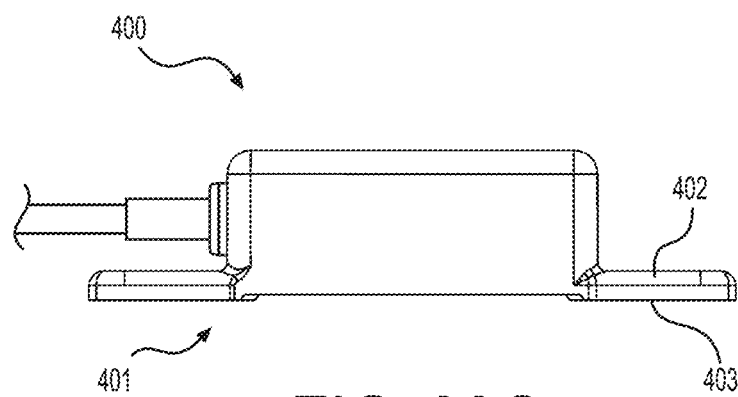
Figure 40A:
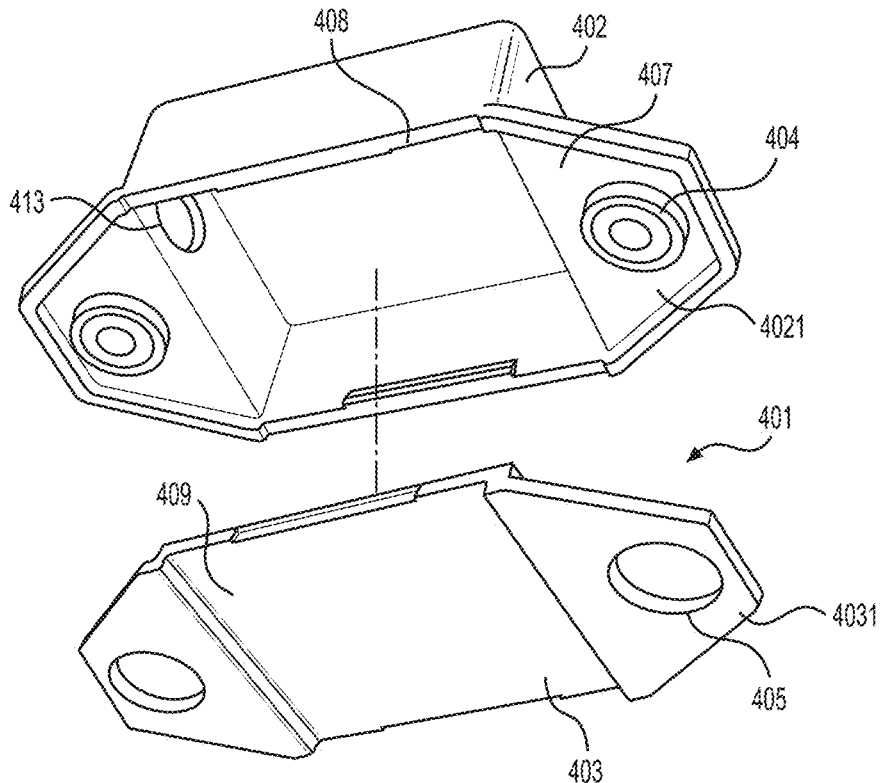
FIGS. 40A and 40B are perspective views of an APS housing.
Figure 40B:
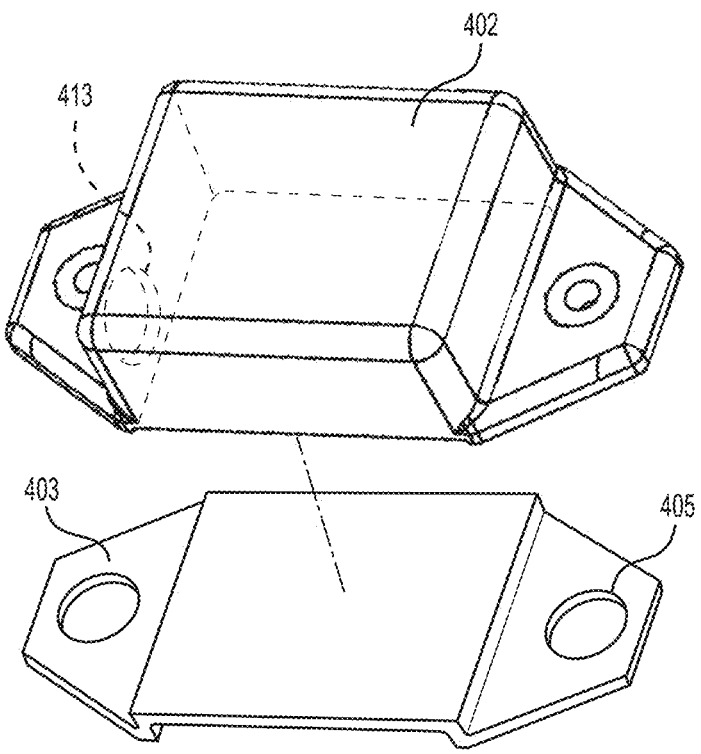
Figure 41A:
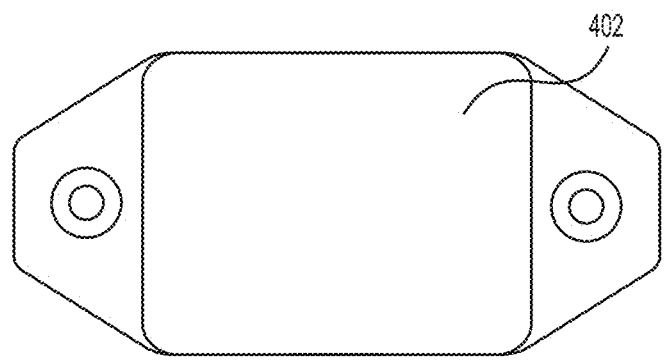
FIGS. 41A to 41C are additional views of the APS housing.
Figure 41B:
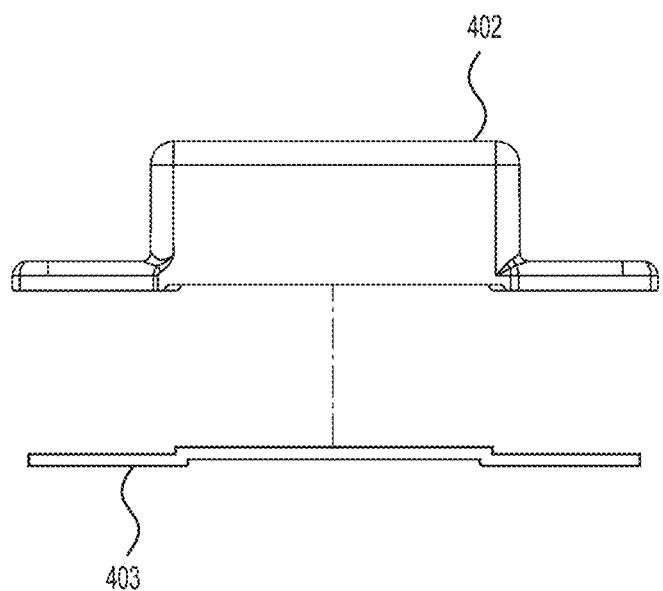
Figure 41C:
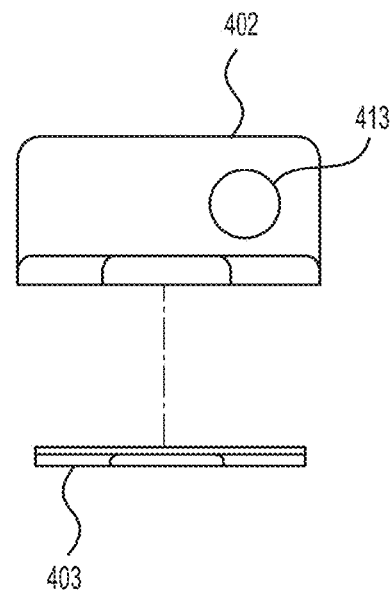

As shown in FIG. 32, the advisor base 303 includes a plurality of mounting bosses 313 for mounting a printed circuit board 314 (shown in FIGS. 37 and 38). In the embodiment shown in FIG. 32, the plurality of mounting bosses 313 includes eight mounting bosses 313. The mounting bosses 313 correspond to circuit board holes 315 shown in FIGS. 37 and 38. The mounting bosses 313 and the circuit board holes 315 are configured to receive fasteners (e.g., screws) for securely mounting the printed circuit board 314 to the advisor base 303. The mounting bosses 313 are provided with a predetermined thickness to reduce the transfer of vibration to the printed circuit board 314. The advisor base 303 additionally is provided with a plurality of base mounting holes 316. The base mounting holes 316 mate with top mounting holes 317 formed in the advisor top 302, and fasteners (e.g., screws) are inserted through the base mounting holes 316 and the top mounting holes 317 to allow mounting of the advisor module 300 to a surface (e.g., a wall). The base mounting holes 316 are formed by enlarged rings 318 and strengthening ribs 319 for compression during assembly.

FIG. 37 shows a front view of the printed circuit board 314, while FIG. 38 shows a rear view thereof. The printed circuit board 314 is provided with a plurality of sensors including, but not limited to, the multi-gas sensor 323 and a pressure sensor 324. The printed circuit board 314 includes a microchip with a CPU and a memory (e.g., RAM). In addition, the printed circuit board 314 may have Bluetooth® capabilities, WiFi capabilities (e.g., 802.11 WiFi), and radio capabilities for radio transmission. The printed circuit board 314 may further have a high voltage protection circuit, electromagnetic interference (EMI) circuitry, and innerboard shielding. As discussed above, the power cable 312 is connected to the printed circuit board 314 to provide power thereto (e.g., 3.3 volt power supply or 5 volt power supply). The printed circuit board 314 may also have a haptic notification device, such as a beeper, to notify of, for example, warning situations.

Moreover, the advisor module 300 may function as a local area network router. Thus, the advisor module 300 can facilitate a local network for the sensors and communicate through proprietary radio communication protocol invisible to local WiFi networks.

The advisor module 300 may automatically sync with any wireless sensor located within radio range of the advisor module 300. For example, the advisor module 300 can sync with the sensors (including those of the RESPA control module 100) of multiple air precleaners 1. Specifically, the advisor module 300 can communicate with up to 255 sensors simultaneously. The advisor module 300 can also monitor cab filter performance and engine filter performance simultaneously.

The sensors which are read and controlled by the advisor module 300 may include sensors (such as the first pressure sensor 113, the second pressure sensor 115, and the third pressure sensor 114) detecting one or more of temperature, pressure, and humidity of the air inside the precleaner housing 11, the air at the outlet 3, or the ambient air; sensors detecting outlet airflow cubic feet per minute (CFM); sensors detecting fan motor temperature and voltage; sensors detecting gas type and gas concentration, and sensors detecting mass particle concentration.

The advisor module 300 may be configured to automatically organize the data received from multiple sensors. For instance, if multiple ambient pressure sensors are within range, the advisor module 300 may automatically average the ambient pressure readings to give a more accurate reading.

The display screen 308 may display data such as filter type, filter hours used, pressure differential, $CO_2$ concentration, and other parameters in real time. The advisor module 300 may also report this data to the Internet via radio, SMS text, WiFi, general packet radio service (GPRS), or other suitable communication means.

As described above, the display screen 308 may optionally include a human machine interface (HMI), such as a touch screen. However, the HMI is not essential.

As described above, the advisor module 300 may also have multiple sensors disposed on the printed circuit board 314 in the advisor housing 301. In addition to the multi-gas sensor 323 and the pressure sensor 324, these sensors may include an integrated accelerometer allowing for accurate pressure readings in high vibratory environments, and a temperature and humidity sensor. The advisor module 300 may further include a real-time clock.

The advisor module 300 may be accessed and reprogrammed remotely for data downloads or firmware updates using a communication means such as GPRS. The advisor module 300 may receive sensor updates via, for example, text messages.

As discussed above, the advisor module 300 may be configured to automatically sync with nearby sensors. Predetermined algorithms may prioritize the data received from the sensors in order to produce the safest possible cab environment. Specifically, the advisor module 300 may use the sensors to monitor within the cab $CO_2$ and other poisonous gas concentrations, respirable dust concentrations, fresh air intake, and cab air leakage. As will be discussed further below, the advisor module 300 may be configured to stop all air from entering the cab and fill the cab with clean air free of poisonous gas.

The air quality monitoring and control system may further include one or more additional ambient pressure sensors (also referred to as "APS") 400, in addition to those provided in the advisor module 300. FIGS. 39A to 45 show one exemplary embodiment of an ambient pressure sensor 400. The ambient pressure sensor 400 may be mounted on the outside of the cab. The ambient pressure sensor 400 may wirelessly connect to and communicate with the advisor module 300 to provide data on the ambient pressure. As discussed above, the advisor module 300 may automatically average a plurality of ambient pressure readings from distinct sensors to give a more accurate reading. With the provision of the ambient pressure sensor 400 on the outside of the cab, the advisor module 300 can subtract the internal cab pressure from the ambient pressure to determine the pressure difference. The advisor module 300 can then display the pressure difference on the display screen 308 and/or transmit information on the pressure difference to an external device, the Internet, and so on. With the provision of the ambient pressure sensor 400, the advisor module 300 can determine the pressure difference without the need for ambient pressure readings of the RESPA control module 100. In other words, in one embodiment the advisor module 300 and the ambient pressure sensor 400 function together without the provision of the RESPA control module 100.

As seen in FIGS. 39A to 45, the ambient pressure sensor 400 includes an APS housing 401. The APS housing 401 is formed of an APS top 402 and an APS base 403. The APS top 402 and the APS base 403 are assembled in a snap-together arrangement. The APS top 402 and the APS base 403 may be formed of, for example, a nylon material. The APS top 402 has outer flanges 4021 with top mounting holes 404 for mating with base mounting holes 405 formed in outer flanges 4031 of the APS base 403. The top mounting holes 404 may be provided with inserts 406 (e.g., brass inserts) which function as compression limiters when the APS top 402 and the APS base 403 are assembled further using fasteners (e.g., screws) inserted through the top mounting holes 404 and the base mounting holes 405. As shown in FIG. 40A, the APS top 402 is provided with chamfered corners 407 and strengthening ridges 408 for improved stability. The APS base 403 has a central portion disposed between the outer flanges 4031, with the central portion being a recessed surface 409 that projects from the outer flanges 4031 toward and into the APS top 402. The recessed surface 409 allows for rapid pressure change within the APS housing 401.

Figure 42:
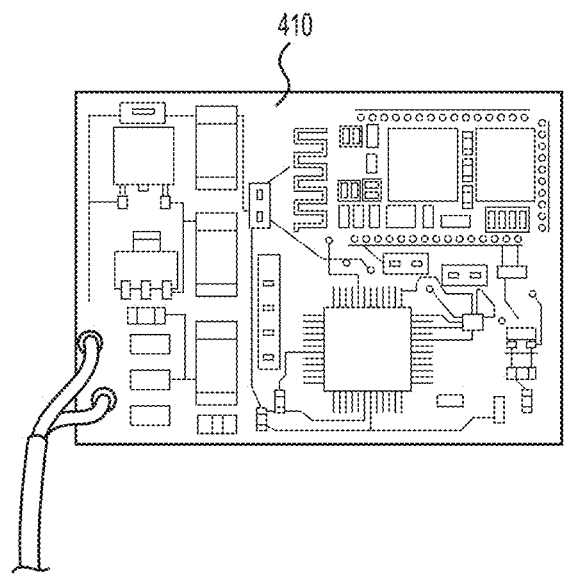
FIG. 42 is a front view of a printed circuit board used with the ambient pressure sensor and other devices.
Figure 43:
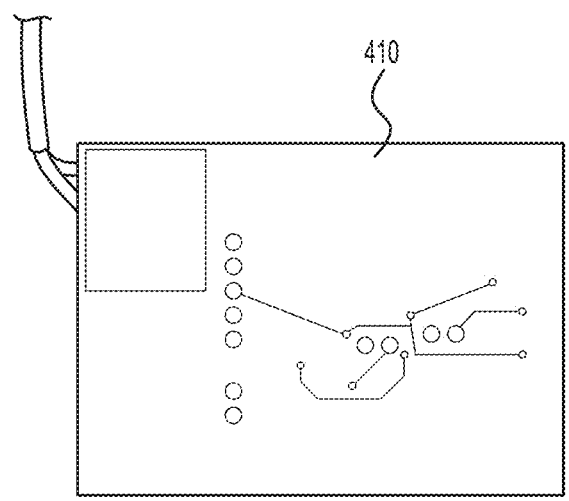
FIG. 43 is a rear view of the printed circuit board.
Figure 44:
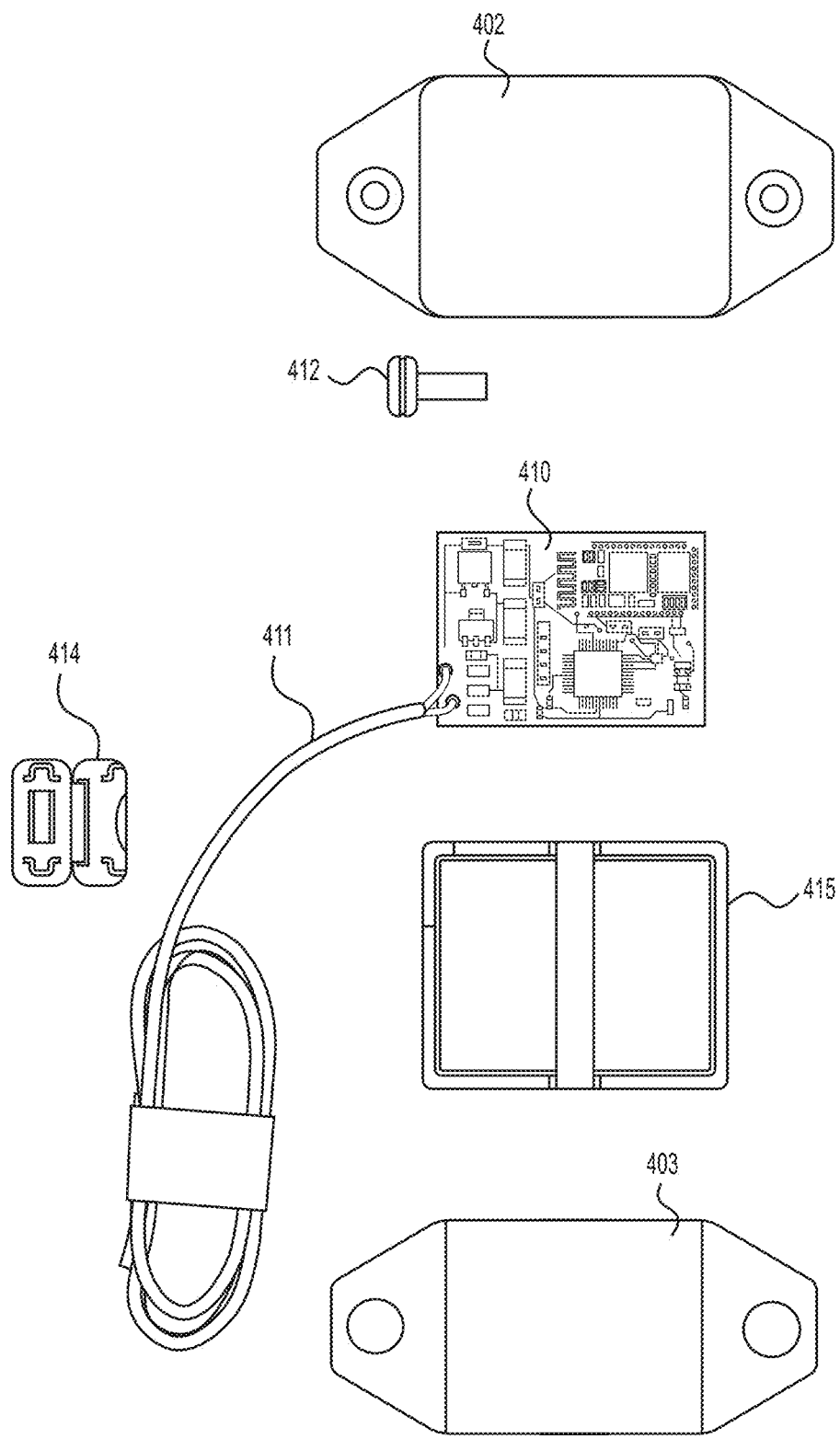
FIG. 44 is a view of the components forming the ambient pressure sensor.
Figure 45:
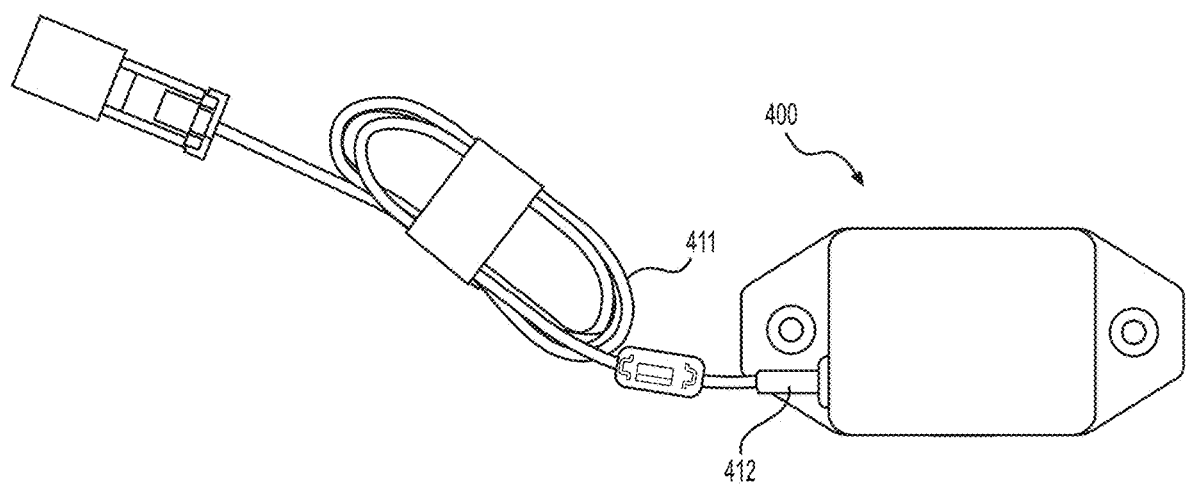
FIG. 45 is a view of the components forming the ambient pressure sensor in an assembled stated.

The ambient pressure sensor 400 further includes a printed circuit board 410, as seen in FIGS. 42 to 44. The printed circuit board 410 includes a pressure sensor configured to sense ambient pressure. The printed circuit board 410 further includes a microchip with a CPU and a memory (e.g., RAM). In addition, the printed circuit board 410 may have Bluetooth® capabilities, WiFi capabilities (e.g., 802.11 WiFi), and radio capabilities for radio transmission. The printed circuit board 410 may further have a high voltage protection circuit, electromagnetic interference (EMI) circuitry, and inner-board shielding. A power cable 411 is connected to the printed circuit board 410 to provide power thereto (e.g., 3.3 volt power supply or 5 volt power supply). As shown in FIGS. 44 and 45, the power cable 411 is connected to the printed circuit board 410 via a cable connector 412 installed in a power cable hole 413 formed in the APS top 402. The power cable 411 may also be provided with a ferrite 414 configured to reduce EMI emissions from the power cable 411.

Figure 46:
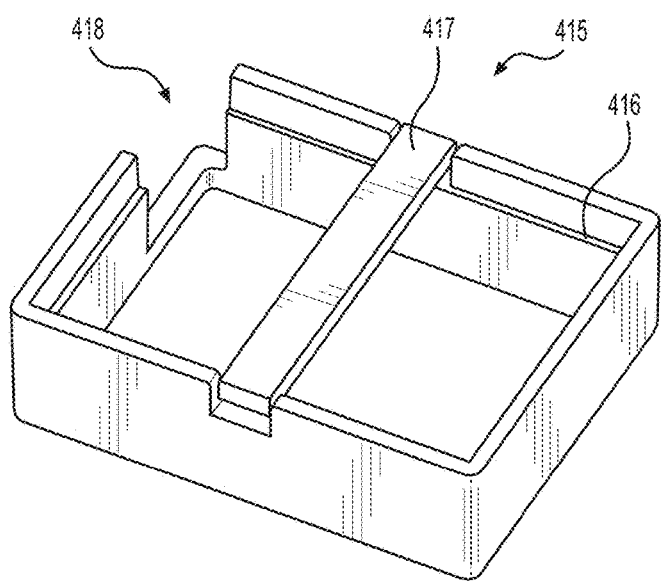
FIG. 46 is a view of an APS gasket.

As seen in FIGS. 44 and 46, the ambient pressure sensor 400 is further provided with an APS gasket 415. The APS gasket 415 is a member made of, for example, nylon and is inserted into the APS housing 401. The APS gasket 415 is provided to securely hold the printed circuit board 410 and reduce the transfer of vibration to the printed circuit board 410. As seen in FIG. 46, the APS gasket 415 includes a ledge 416, a strap 417, and a cutout 418. The printed circuit board 410 is placed on the ledge 416 and is held tightly by the ledge 416 and the inner walls of the APS gasket 415. The strap 417 extends above the printed circuit board 410 to ensure that the printed circuit board 410 does not move upward off of the ledge 416. The cutout 418 is provided to allow for the power cable 411 to pass through the APS gasket 415 for connection with the printed circuit board 410.

The printed circuit board 410 serves as a universal communication module which may be used in a variety of locations outside of the ambient pressure sensor 400 and is not limited to use in association with the ambient pressure sensor 400. In other words, the printed circuit board 410 may be used with devices even in the absence of the ambient pressure sensor 400. For example, in the embodiment discussed above in which the RESPA control module 100 provides ambient pressure readings to the advisor module 300, there may be no need for the separate ambient pressure sensor 400 on the outside of the cab. In that case, there may be one or a plurality of printed circuit boards 410 used inside the cab to control communication between various devices and the advisor module 300. One such arrangement will be discussed further below with respect to a dust monitor 600.

Figure 52:
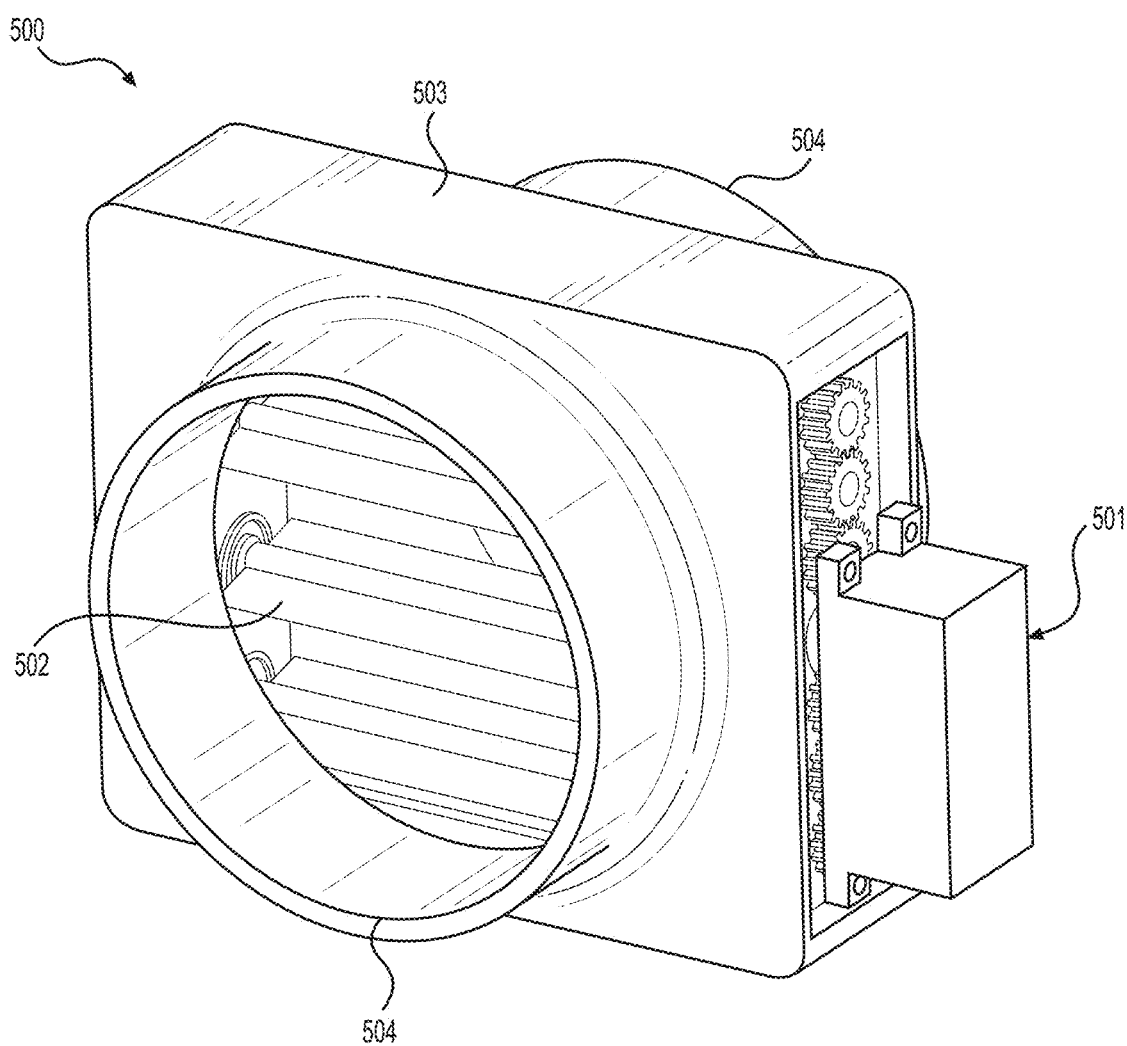
FIG. 52 a perspective view of one embodiment of an airflow control valve.

The air quality monitoring and control system may further include one or more airflow control valves 500. For example, a first airflow control valve 500 may control airflow entering the cab, and a second airflow control valve 500 may control airflow exiting the cab, thereby functioning as a pressure release valve for the cab. FIG. 52 shows one exemplary embodiment of the airflow control valve 500. The airflow control valve 500 may be made of, for example, polylactic acid plastic or injection-molded polypropylene. The airflow control valve 500 may include a servo motor 501 to control the positions of louvers 502 provided to the airflow control valve 500. The louvers 502 are disposed in a valve housing 503 having first and second axial openings 504. The airflow control valve 500 may be WiFi-enabled and controlled directly by the advisor module 300. Specifically, a unique algorithm may be used by the advisor module 300 to monitor all cab parameters and adjust the flow of fresh air via the precleaner 1 and the first airflow control valve 500, and adjust cab leakage via the second airflow control valve 500, to maintain optimal operator protection. For example, the RESPA control module 100 measures the airflow exiting the outlet 3 and reports the airflow measurement to the advisor module 300. Then, the advisor module 300 adjusts the airflow control valves 500 by adjusting the positions of the louvers 502, to maintain a predetermined fresh air intake airflow. The airflow control valves 500 are controlled in this way by the advisor module 300 to allow more fresh air to enter the cab, thereby creating sufficient and consistent internal cab pressure while diluting harmful gas (e.g., $CO_2$) concentrations. In this way, the air quality monitoring and control system continuously monitors and controls the cab pressure, fresh air intake, gas (e.g., $CO_2$) levels, and cab leakage to produce the safest air quality and highest HVAC operating efficiency.

Each filter 7 will have a specific airflow limit. For example, a carbon filter has an airflow limit of 50 cfm, while a MERV16 filter has an airflow limit of 130 cfm. The RESPA control module 100 may read the filter ID ring 200 to determine the airflow limit associated with the particular filter 7 being used. The RESPA control module 100 may then provide this information to the advisor module 300, based on which the advisor module 300 may adjust the variables in the algorithm used to control the airflow amount by controlling the first airflow control valve 500.

A first modified airflow control valve 500' is shown in FIGS. 56 to 59. The first modified airflow control valve 500' may be made of, for example, polylactic acid plastic or injection-molded polypropylene. The first modified airflow control valve 500' may include a servo motor 501' to control the position of a valve disk 502' provided to the first modified airflow control valve 500'. The valve disk 502' is disposed in a valve housing 503' having first and second axial openings 504'. The valve disk 502' is attached to a dowel 505'. The dowel 505' may be made of, for example, polylactic acid plastic or injection-molded polypropylene. The dowel 505' extends across the diameter of the valve housing 503'. A first end of the dowel 505' is connected to a bearing 506' allowing free rotation of the dowel 505'. A second opposite end of the dowel 505' is connected to the servo motor 501' such that the servo motor 501' may control the position of the valve disk 502' by rotating the dowel 505', thereby adjusting the airflow. The first modified airflow control valve 500' may be WiFi-enabled and controlled directly by the advisor module 300 in a manner similar to the airflow control valve 500 described above.

Figure 60:
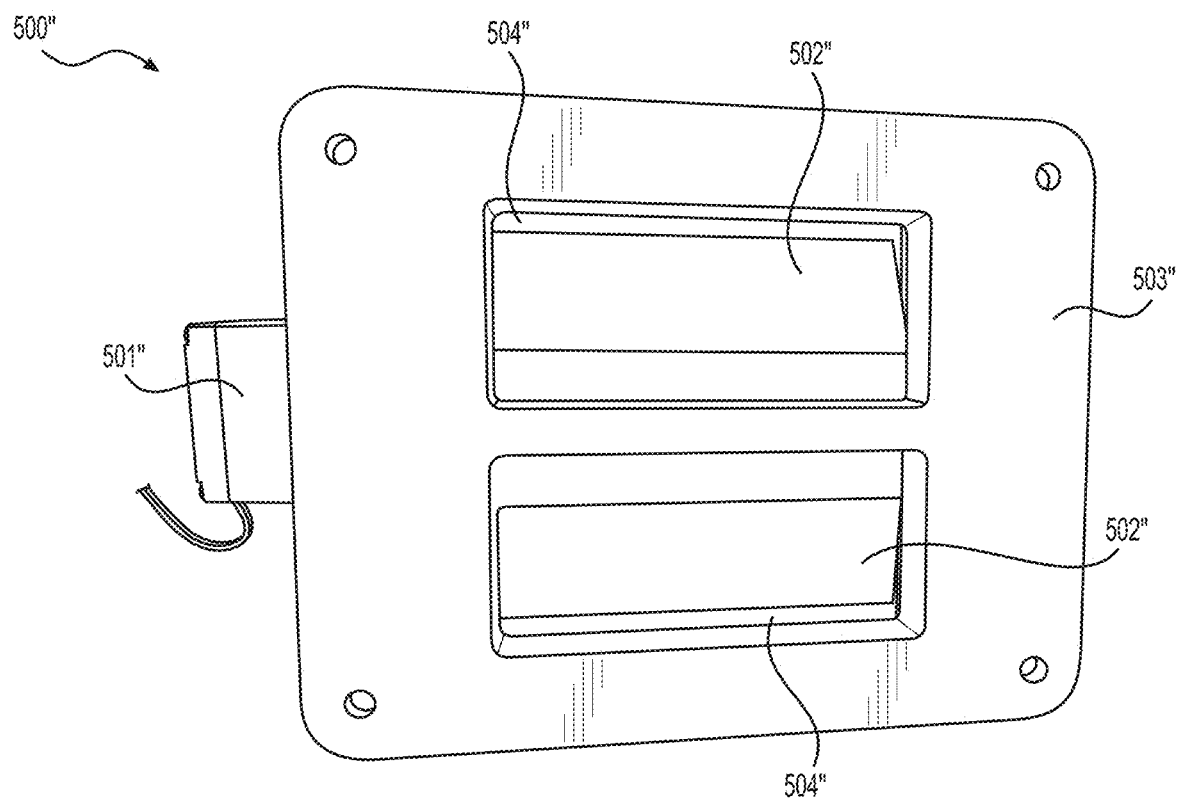
FIG. 60 is a rear view of another modified embodiment of the airflow control valve.
Figure 61:
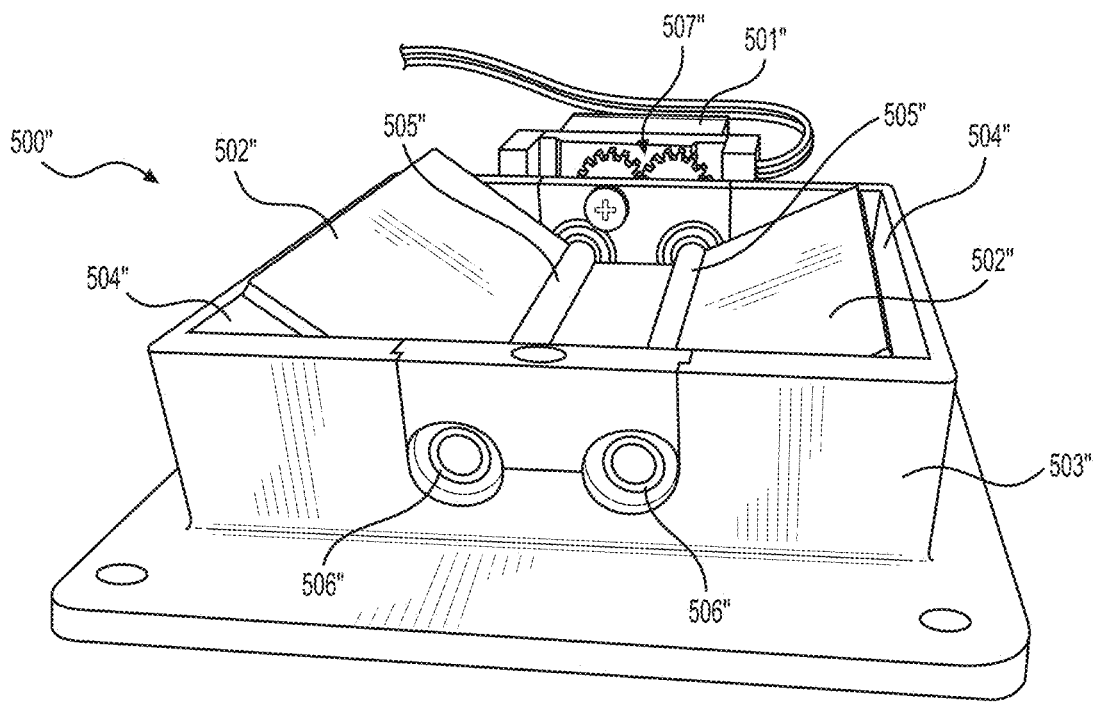
FIG. 61 is a side perspective view of the other modified embodiment of the airflow control valve.
Figure 62:
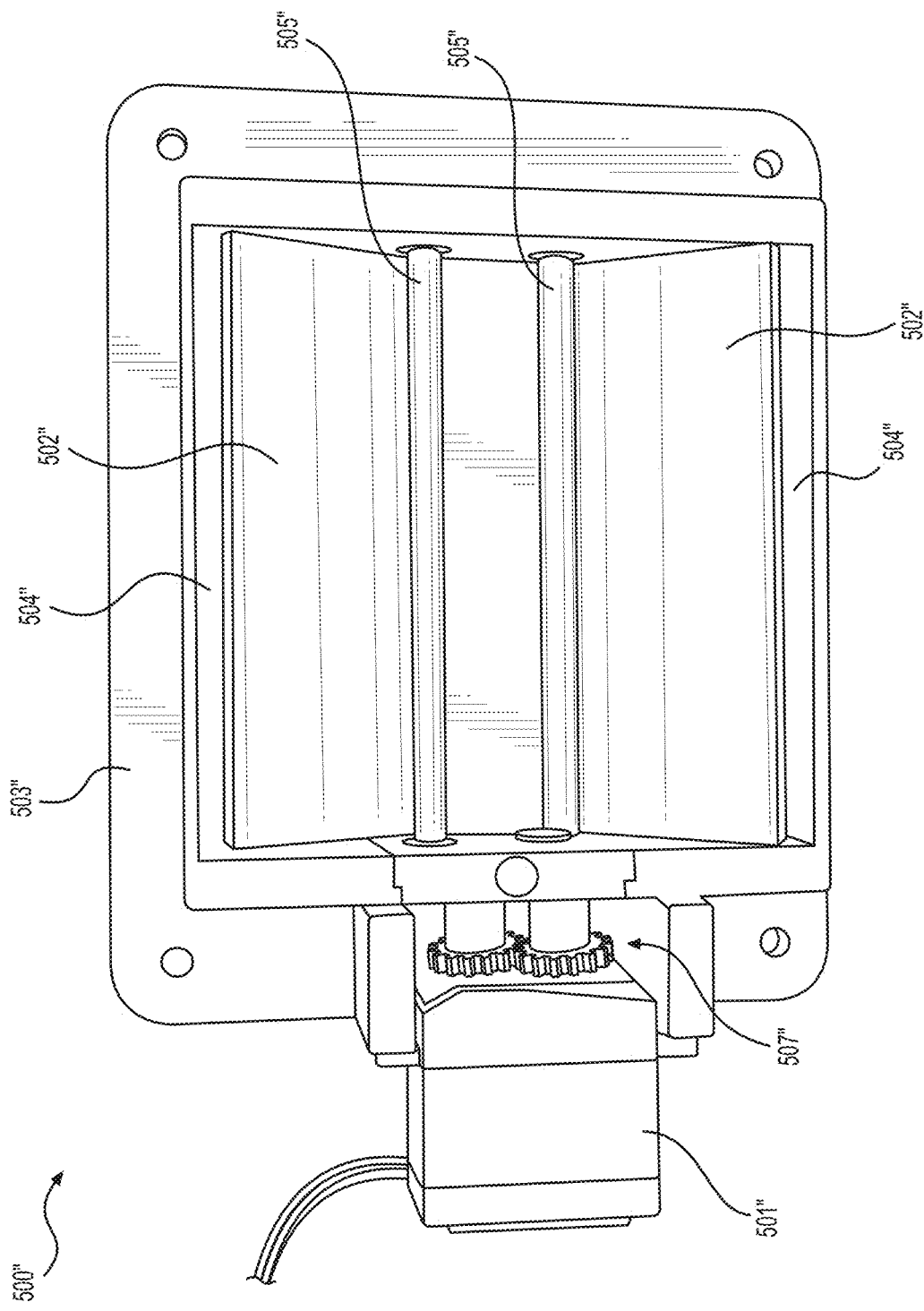
FIG. 62 is a front view of the other modified embodiment of the airflow control valve.

A second modified airflow control valve 500" is shown in FIGS. 60 to 62. The second modified airflow control valve 500" may be made of, for example, polylactic acid plastic or injection-molded polypropylene. The second modified airflow control valve 500" may include a servo motor 501" to control the positions of two valve veins 502" provided to the second modified airflow control valve 500". The valve veins 502" are disposed in a valve housing 503" having first and second valve openings 504". The valve veins 502" are each attached to a respective dowel 505". The dowels 505" may be made of, for example, polylactic acid plastic or injection-molded polypropylene. The dowels 505" extend across the width of the valve openings 504". A first end of each dowel 505" is connected to a bearing 506" allowing free rotation of the dowel 505". A second opposite end of each dowel 505" is connected to the servo motor 501" via a gear assembly 507" which is connected to the servo motor 501" such that the servo motor 501" may control the positions of the valve veins 502" by rotating the respective dowels 505", thereby adjusting the airflow. The second modified airflow control valve 500" may be WiFi-enabled and controlled directly by the advisor module 300 in a manner similar to the airflow control valve 500 described above.

Figure 54:
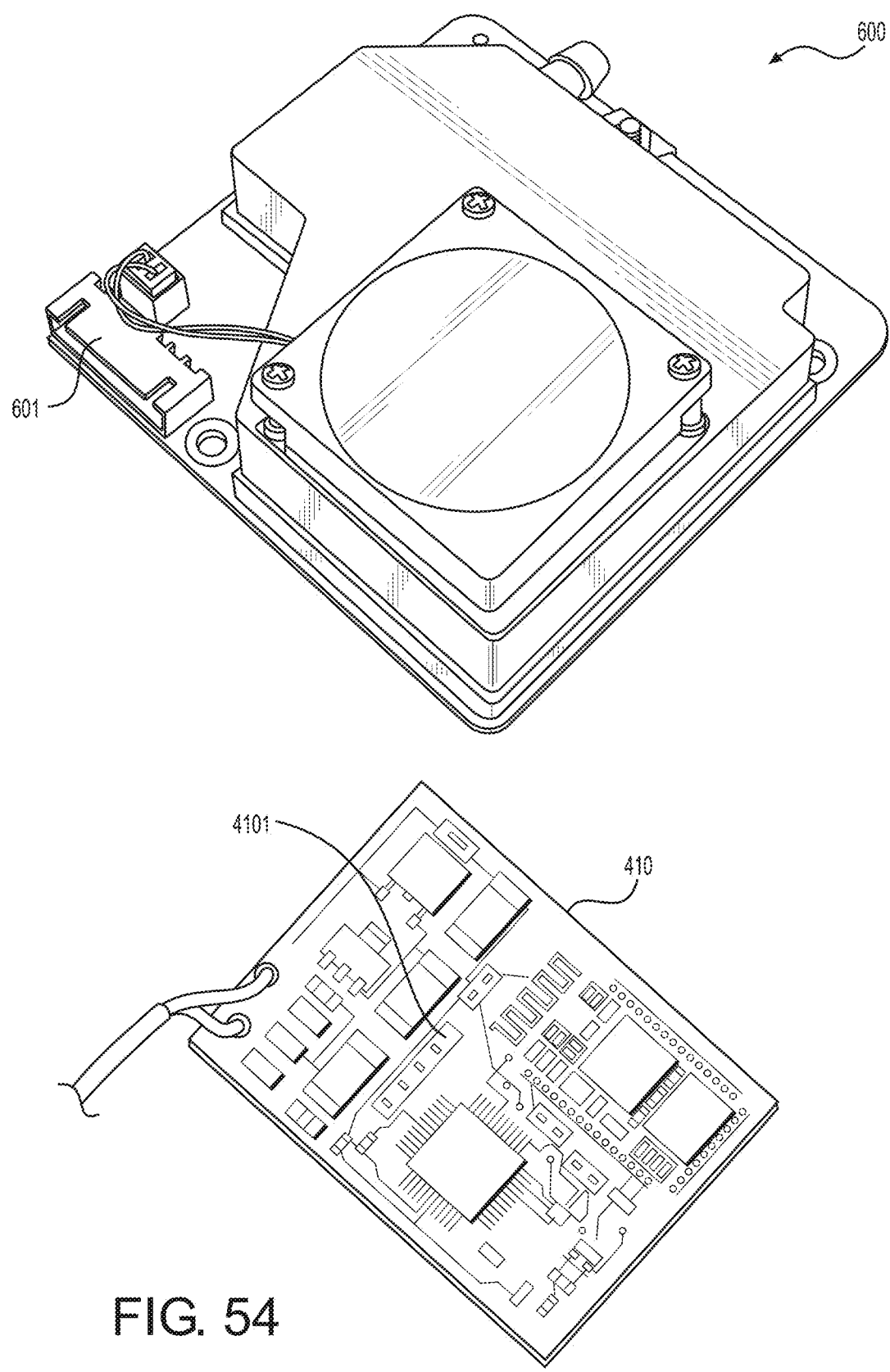
FIG. 54 is a perspective view of a dust monitor with the printed circuit board of FIG. 42.

The air quality monitoring and control system may further include the dust monitor 600 as seen in FIG. 54. The dust monitor 600 may be installed in a mixing plenum 22 (described below), inside a housing (not shown) which houses both the dust monitor 600 and the printed circuit board 410. The housing may be mounted on a vibration-reducing gasket similar to the APS gasket 415 to improve sensor readings from the dust monitor 600. The dust monitor 600 is connected to the printed circuit board 410. Specifically, as shown in FIG. 54, the dust monitor 600 has a plug 601 which connects to an outlet 4101 formed on the printed circuit board 410. The printed circuit board 410 serves as a universal communication module and controls communication between the dust monitor 600 and the advisor module 300. As a result, dust concentration readings from the dust monitor are transmitted to the advisor module 300 via the printed circuit board 410. In addition, the printed circuit board 410 powers the dust monitor 600 with power provided to the printed circuit board 410 by the power cable 411.

Figure 55:
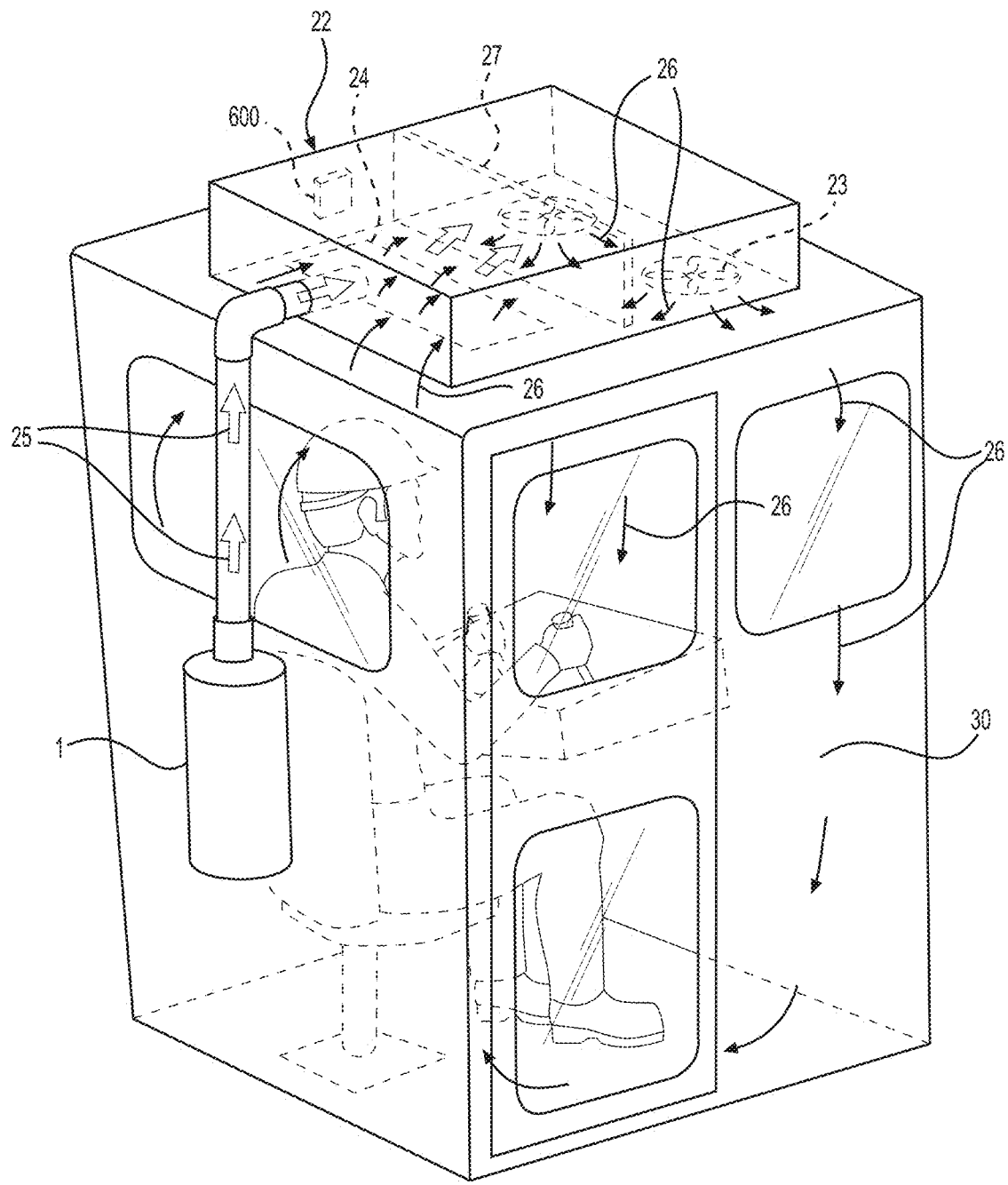
FIG. 55 is a perspective view of a cab using the cab air quality system.
Figure 57:
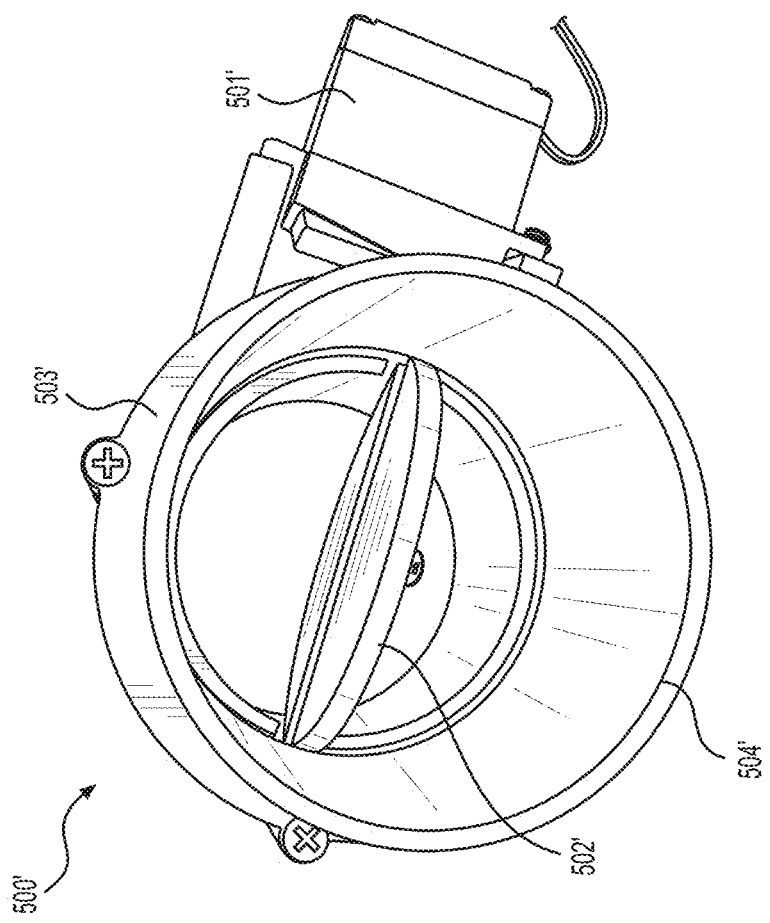
FIG. 57 is a top perspective view showing the modified embodiment of the airflow control valve with the valve disk in a second position.
Figure 56:
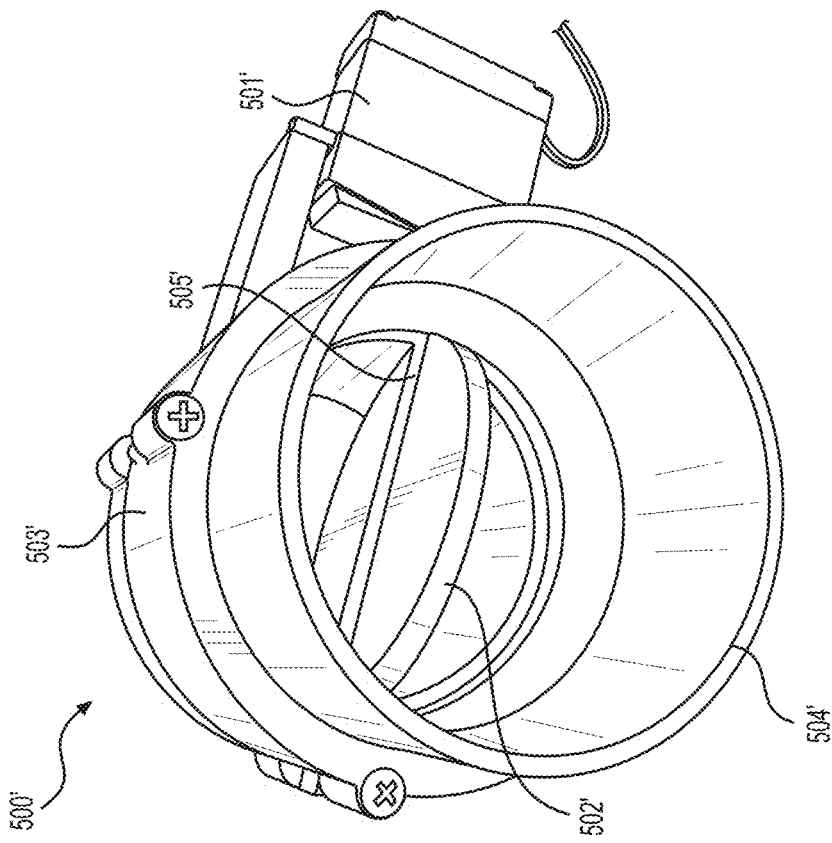
FIG. 56 is a top perspective view showing a modified embodiment of the airflow control valve with a valve disk in a first position.
Figure 59:
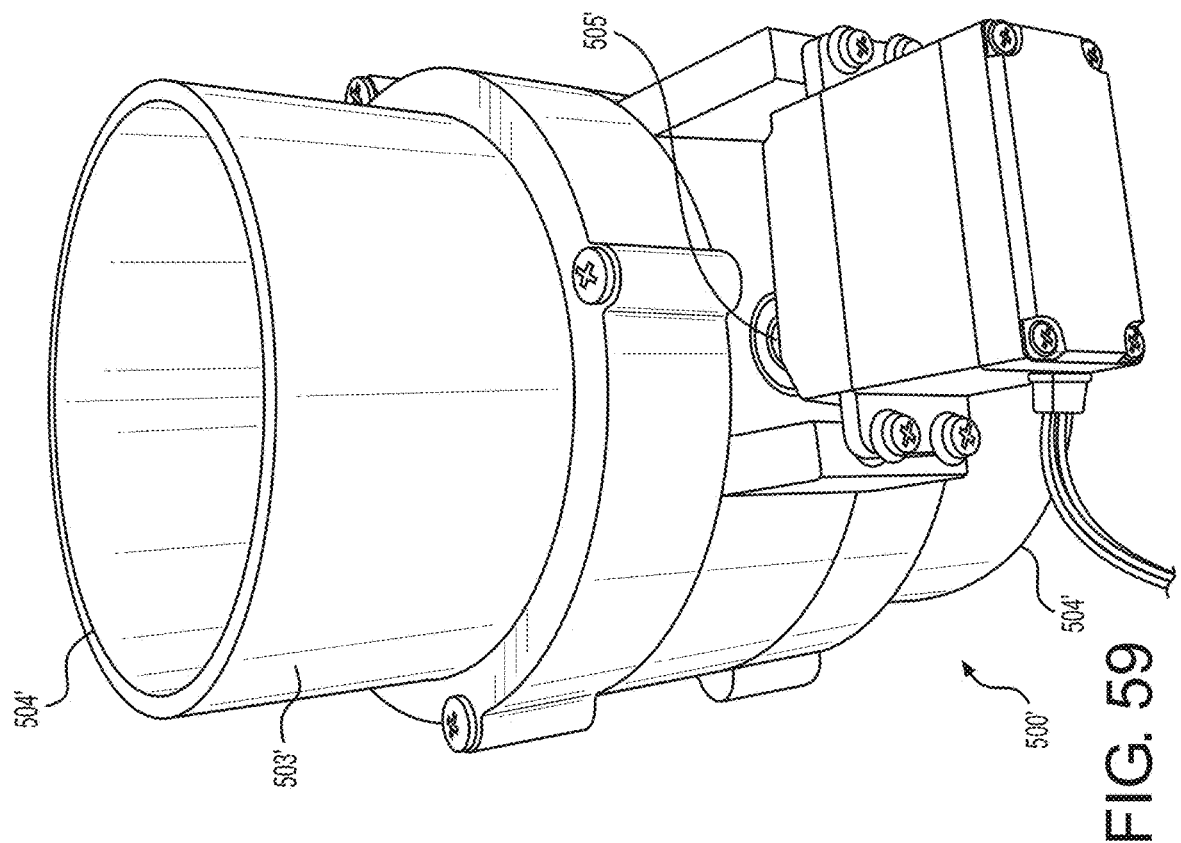
FIG. 59 is a side perspective view showing the modified embodiment of the airflow control valve rotated from the view in FIG. 58.
Figure 58:
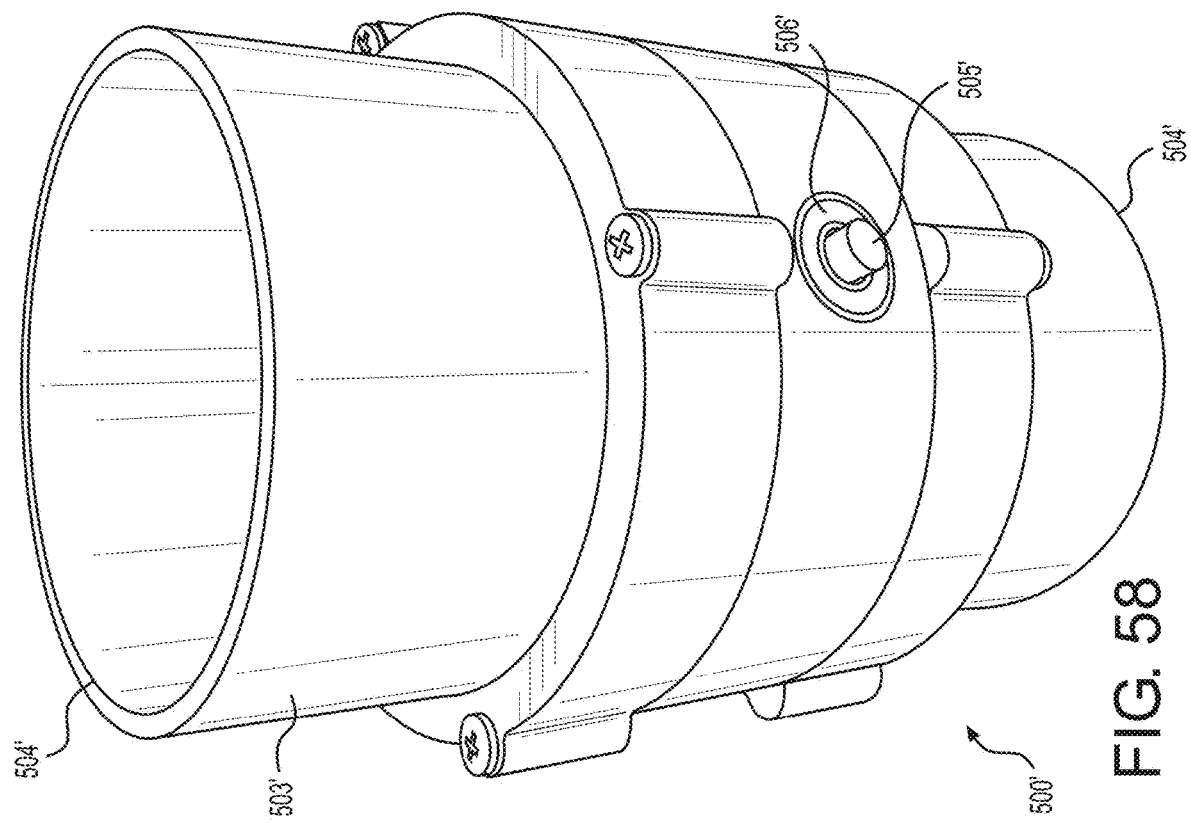
FIG. 58 is a side perspective view showing the modified embodiment of the airflow control valve.

The dust monitor 600 monitors the dust so as to give real-time gravimetric dust measurements to the advisor module 300 via the printed circuit board 410. Current dust monitors in the related art are not designed to be permanently installed in operator cabs, subject to field abuse and particulate overloading, but instead are lab-style instruments requiring careful and regular calibration. Such current dust monitors tend to fail when exposed to a high dust concentration in a short period of time. The dust monitor 600 disclosed herein overcomes the above problems. In particular, the dust monitor 600 is configured to be mounted inside the mixing plenum 22 within the duct work of the HVAC system as shown in FIG. 55. This mounting location allows monitoring of the quality of air at the head zone of the cab operator. The mounting location also ensures the accuracy of the dust readings and the longevity of the dust monitor 600. As seen in FIG. 55, the cab has an internal environment 30 in which the cab operator sits. Intake air is sent from the precleaner 1 to the mixing plenum 22 of the HVAC system, then through the evaporator core 27, then through the fans 23 and into the cab internal environment 30. The air then becomes recirculation air 26 which flows around the operator and again into the mixing plenum 22 through the vent 24. The dust monitor 600 is advantageously mounted in the mixing plenum 22 because the mixing plenum is the cleanest location in the cab. Moreover, the mounting location ensures that any breaches in fresh or recirculation filters and/or the intake air system will be immediately identified by the dust monitor 600 due to the increased dust readings, thereby providing real-time data and notification of system degradation. The dust monitor 600 may be integrated through communication with the RESPA control module 100 and the advisor module 300, thereby providing robust and timely gravimetric dust monitoring within the same compact, proactive, comprehensive cab air quality system.

The advisor module 300 may be configured to notify the appropriate parties as to alarm conditions in the cab by one or more of the following notification means: sending a notification (e.g., by text message or email), activating an audible, visual or haptic alarm on the advisor module 300, and activating an alarm light and/or an audible alarm signal on top of the cab. Other notification means are also conceivable. These notifications may be performed by the advisor module 300 simultaneously with the monitoring and control of air in the cab discussed above.

The advisor module 300 may automatically and autonomously maintain safe and consistent pressure and $CO_2$ levels within the cab by receiving the data from the sensors and automatically controlling the air environment within the cab based on the data from the sensors.

Traditional air precleaner housings absorb heat which is passed downstream. The embodiments disclosed herein can reduce heat transmission by utilizing the swirling tornadic airflow within the precleaner housing 11 to move the heated air, which comes off of the precleaner housing wall, out of the precleaner housing 11 via the ejection port(s) 5 on the filter cap. This unique feature performs two important functions: it removes particles from the airflow ejecting them back into the environment, and it simultaneously removes heat from the precleaner housing 11. The net result is that the air going into the engine is much closer to the ambient air temperature.

The advisor module 300 may also provide important testing and validation functions. The advisor module 300 can perform continuous, real-time, in-use testing of various parameters including the airflow through the system, the filter load and filter life, self-cleaning attributes of the filter 7, the types and quantities of gases passing through the system, the temperature differential of the ambient air and the system outlet air, and performance of the motor in the precleaner 1. The advisor module 300 can further test other parameters related to the air quality within the cab and the devices which affect the air quality.

(5) Description of Monitoring and Control Processes

At the outset, when the air quality monitoring and control system is being established, with the filter ID ring 200 attached (e.g., glued) to the air filter, the air filter may be placed inside the precleaner housing such that the filter ID ring 200 is adjacent the RESPA control module 100 which is pre-installed between two stationary vanes 13 of the air precleaner 1. The RESPA control module 100 and the filter ID ring 200 will then automatically sync with each other using the RCM antenna board 118 as discussed above. The RESPA control module 100 will also automatically sync with the advisor module 300.

Upon automatically syncing with the filter ID ring 200, the RESPA control module 100 may read the information pre-logged into the filter ID ring 200 and relay this information to the advisor module 300. As discussed above, this information may include the usage of the air filter 7, based on which the RESPA control module 100 and/or the advisor module 300 may set a clock for determining expiration of the life of the air filter 7. In the absence of detecting a filter ID ring 200, the system can output a warning and/or shut down.

During operation within an active cab, the advisor module 300 may continuously monitor all parameters related to the environment within the cab, including pressurization and gas concentration, using the data which the advisor module 300 automatically receives from the various sensors of the system and automatically analyzes.

The advisor module 300 may then automatically take action to control the cab environment. For example, if the advisor module 300 determines that the pressurization state or the concentration of a certain gas (e.g., $CO_2$) inside the cab is not optimal, the advisor module 300 may control the airflow control valve 500 to release air from the cab. The advisor module 300 may also issue a command to the RESPA control module 100 to change the speed of the brushless fan motor 28 of the air precleaner 1. In this manner, the advisor module 300 is configured to constantly monitor and adjust the cab environment to provide an optimal and safe environment for the cab operator.

On the other hand, if the advisor module 300 determines that the atmosphere outside of the cab is dangerous or otherwise problematic, the advisor module 300 may control the airflow control valve 500 and the air precleaner 1 (by way of the RESPA control module 100) to prevent outside air from coming into the cab.

The advisor module 300 may also emit various forms of alarms (audible, visual, haptic) indicative of harmful gas concentration, expiration of filter life, and other notifications which should be provided to the operator, owner and/or manager of the cab.

(6) Advantageous Effects

The air quality monitoring and control system according to the exemplary embodiments discussed above provides numerous advantages, including but not limited to the following.

Based on the communication between the RESPA control module 100, the filter ID ring 200, the advisor module 300, and the other sensors of the system, the system provides continuous real-time monitoring of the cab environment. As a result, the system promotes the health and safety of the operator as well as the health of the surrounding environment.

The air quality monitoring and control system continuously and automatically maintains the desired environment within the cab by analyzing the data from the various sensors and automatically adjusting the devices of the system to modify the cab environment when necessary. As a result, it is not necessary for the operator or other party to actively monitor and adjust the environment.

The advisor module 300 provides continuous data output and notification to the operator and/or an external manager so that all parties involved may be notified of the status of the cab environment. Thus, the flow of information is more rapid and seamless, and it is not necessary for the operator or manager to examine and try to determine the status of the cab environment.

By interacting with the RESPA control module 100 and the other sensors, the advisor module 300 is able to control airflow, air quality, air temperature, pressure drop on the filter 7, temperature differential between outside and inside the air precleaner 1, filter life, and other parameters to ensure that the desired cab environment is achieved and maintained. This control by the advisor module 300 of the engine intake system also results in improved engine performance and fuel economy.

As needed, the advisor module 300 may control the airflow control valve 500 and the fan motor 28 of the air precleaner 1 to seal and purge the internal cab environment, stabilize pressure in the cab, and maintain appropriate gas concentrations, thereby ensuring the health and safety of the operator.

The RESPA control module 100 continuously measures and reports the pressure and other parameters of three distinct airflows within the air precleaner 1. Based on these different measurements, the advisor module 300 is able to better detect and control the cab environment.

Integrated accelerometers provided to the sensors of both the RESPA control module 100 and the advisor module 300 allow the application of algorithms which allow the RESPA control module 100 and the advisor module 300 to function accurately in high vibration environments. Therefore, the deterioration of measurement and sensory data due to high vibration environments can be suppressed.

Based on the readings from the sensors, the motor control module 40 will turn off the fan motor 28 or adjust the speed of the fan motor 28 to increase pressure or overcome a pressure drop on the filter 7. Thus, like the advisor module 300, the RESPA control module 100 automatically responds to unfavorable environmental conditions, taking steps to return the cab to the desired environment.

When programmed operating parameters are violated, the RESPA control module 100 may cause an alarm message to be sent to the advisor module 300, or the advisor module 300 may make the determination to output an alarm. As such, the operator and other parties involved can be automatically notified of problems and dangers associated with the cab environment. These notifications may be performed by the advisor module 300 simultaneously with the monitoring and control of air in the cab.

The RESPA control module 100 controls the RCM antenna board 118 to broadcast an electrical field inside the precleaner housing 11. This electrical field provides power to the filter ID ring 200 and creates a two-way communication channel between the RESPA control module 100 and the filter ID ring 200, allowing for continuous communication between the RESPA control module 100 and the filter ID ring 200. Accordingly, no additional power source is necessary for the filter ID ring 200, and no additional communication means is necessary between the RESPA control module 100 and the filter ID ring 200.

Currently, radial filter configurations allow for a filter to be placed in a precleaner housing in any orientation from 0 to 360 degrees. However, current RFID technologies require that the tag reader be placed within proximity of the RFID tag of the filter, and further requires that the RFID tag receive electrical power. This presents the problem that, when the filter is placed in certain orientations within the precleaner housing, the tag reader may not be able to read the RFID tag, and furthermore the RFID tag cannot be plugged into a power source. The RESPA control module 100 and filter ID ring 200 disclosed herein overcome these problems by ensuring communication between the RESPA control module 100 and filter ID ring 200 regardless of the filter orientation within the precleaner housing 11. Moreover, the electrical field broadcast by the RCM antenna board 118 of the RESPA control module 100 energizes the microchip of the filter ID ring 200, thereby removing the need for the filter ID ring 200 to be plugged into a power source.

An additional problem presented by current filter technologies is that filters typically have a metal protective screen and/or other metal content which effectively acts as a Faraday cage, obstructing the low-power RFID signal and rendering the RFID tag inaccessible to the tag reader. The RESPA control module 100 and filter ID ring 200 disclosed herein overcome this problem by having a specific orientation and position relative to each other within the precleaner housing 11, ensuring consistent and efficient communication via the antenna wire 124 and the antenna wire 201 using the electrical field broadcast by the RCM antenna board 118. This communication is thus not obstructed by any element acting as a Faraday cage.

The RESPA control module 100 continuously logs data to the filter ID ring 200, maintaining a constantly updated history of filter usage. This constant, real-time logging of data by the RESPA control module 100 in the filter ID ring 200, in combination with the data prestored in the filter ID ring 200 at the point of manufacture, will ensure that the filter 7 is not used beyond its predetermined life. Even if moved from one vehicle to another, a tampered-with or previously-used filter can be identified, and its use can be restricted or prevented.

Both the advisor module 300 and the RESPA control module 100 are able to communicate with up to 255 sensors simultaneously. As a result, the advisor module 300 is able to receive and automatically analyze various sensory data indicative of various parameters inside and outside the cab, thereby improving the determinations made by the advisor module 300 and the actions taken by the advisor module 300 to ensure optimal cab environment.

The advisor module 300 is configured to automatically sync with nearby sensors and use their data to automatically implement changes to the operator environment. Thus, the disclosed system offers an immediate response to potential threats within the cab environment.

The advisor module 300 may provide the display screen 308 on which data such as filter type, filter hours used, pressure differential, $CO_2$ concentration, and other parameters are displayed in real time. As a result, the operator is able to better understand and analyze the cab environment.

The advisor module 300 may use the sensors to monitor within the cab the $CO_2$ concentrations, respirable dust concentrations, fresh air intake, cab air leakage, and poisonous gas concentrations. Then, in response, the advisor module 300 can stop all air from entering the cab and fill the cab with clean air free of poisonous gas. Thus, the advisor module 300 automatically and autonomously maintains safe and consistent pressure and $CO_2$ levels within the cab by receiving the data from the sensors and automatically controlling the air environment within the cab based on the data from the sensors.

Important testing and validation functions are also performed by the advisor module 300. Continuous, real-time, in-use testing of various parameters including the airflow through the system, the filter load and filter life, self-cleaning attributes of the filter 7, the types and quantities of gases passing through the system, the temperature differential of the ambient air and the system outlet air, and performance of the motor 28 in the air precleaner 1 improves the monitoring of the cab environment and the ability for the operator and others to make improvements and modifications to the environment or the cab itself.

The disclosed air quality monitoring and control system comprehensively protects the operator from potential threats to air quality within the cab.

Exemplary embodiments of the present invention have been described above. It should be noted that the above exemplary embodiments are merely examples and the present invention is not limited to the detailed embodiments. It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by this disclosure.

What is claimed is:

1. An air quality system for a cabin, the air quality system comprising:
   an air precleaner having a precleaner housing and a filter disposed inside the precleaner housing;
   a filter identification component positioned within the precleaner housing at a first position, the filter identification component being mounted on the filter;
   a control module positioned within the precleaner housing at a second position and being configured to:
   emit an electrical field; and
   communicate with the filter identification component via the emitted electrical field;
   an advisor module disposed outside of the precleaner housing and configured to communicate with the control module to obtain from the control module both control module data and filter identification component data; and
   a dust monitor disposed in the cabin, wherein the advisor module is configured to communicate with the dust monitor to receive a dust measurement.

2. The air quality system according to claim 1, wherein:
   the control module has a first antenna;
   the filter identification component has a second antenna;
   the control module emits the electrical field via the first antenna; and
   the control module communicates with the filter identification component by exchanging data between the first and second antennas.

3. The air quality system according to claim 2, wherein:
   the first antenna is disposed at a third position different from the second position.

4. The air quality system according to claim 2, wherein:
   the second antenna is tuned to a frequency of the first antenna.

5. The air quality system according to claim 1, further comprising:
   a plurality of sensors, the control module receiving and analyzing data from the plurality of sensors.

6. The air quality system according to claim 1, wherein:
   the control module comprises:
   a module housing;
   a plurality of sensors, the plurality of sensors being housed within the module housing, the plurality of sensors being configured to measure at least one of pressure, temperature, and humidity of at least one of ambient air outside the precleaner housing, intake air inside the precleaner housing upstream of the filter, and outlet air at an outlet of the precleaner housing downstream of the filter; and
   a first antenna, the first antenna being disposed outside of the module housing.

7. The air quality system according to claim 6, wherein:
   the module housing includes a plurality of compartments, each of the compartments housing a respective one of the plurality of sensors.

8. The air quality system according to claim 7, wherein:
   a first sensor of the plurality of sensors is disposed in a first compartment of the plurality of compartments;

the module housing has a first hole communicating with the first compartment; and a first tube is disposed within the first hole to communicate between the first sensor and one of the ambient air and the outlet air.

9. The air quality system according to claim 6, wherein:
the filter identification component includes a second antenna, a microchip, and one or more capacitors; and
the control module:
  emits the electrical field via the first antenna; and
  communicates with the filter identification component by exchanging data between the first and second antennas.

10. The air quality system according to claim 9, wherein:
the data is transmitted from the control module to the filter identification component and is recorded in the filter identification component.

11. The air quality system according to claim 10, wherein:
the data includes filter data indicating usage of the filter and identification of the filter, and the filter data is recorded in the filter identification component.

12. The air quality system according to claim 9, wherein:
the data is transmitted from the filter identification component to the control module; and
the control module outputs the data to one or more external devices.

13. The air quality system according to claim 8, wherein:
the electrical field emitted by the first antenna provides electric power to the filter identification component.

14. The air quality system according to claim 1, wherein:
the control module continuously reads and writes data from and to the filter identification component via the electrical field.

15. The air quality system according to claim 1, wherein:
the advisor module includes a plurality of sensors configured to measure at least one of gas concentration and pressure.

16. The air quality system according to claim 1, further comprising:
an airflow control valve configured to control airflow into and/or out of the air quality system, wherein
the advisor module is configured to control the airflow control valve based on an airflow measurement transmitted to the advisor module from the control module, and
the advisor module is configured to control the airflow control valve based on the dust measurement.

17. The air quality system according to claim 16, further comprising:
a pressure sensor configured to sense pressure; wherein
the advisor module is configured to:
  communicate with the pressure sensor to obtain pressure data; and
  control the airflow control valve based on the pressure data transmitted to the advisor module from the pressure sensor.

18. An air quality system monitoring method for a cabin, the method comprising:
providing an air precleaner outside a cab operated by an operator, the air precleaner having a precleaner housing and a filter disposed inside the precleaner housing;
providing a filter identification component positioned within the precleaner housing at a first position, the filter identification component being mounted on the filter;
providing a control module positioned within the precleaner housing at a second position;
providing, by the control module, an electrical field emitted within the precleaner housing, the control module communicating with the filter identification component via the emitted electrical field;
providing an advisor module disposed outside of the precleaner housing, the advisor module being configured to communicate with the control module to obtain from the control module both control module data and filter identification component data;
providing a dust monitor disposed in the cabin, wherein the advisor module is configured to communicate with the dust monitor to receive a dust measurement; and
adjusting the air quality system based on the control module data and the filter identification component data.

* * * * *